United States Patent
Biester et al.

(10) Patent No.: US 7,615,893 B2
(45) Date of Patent: Nov. 10, 2009

(54) ELECTRIC CONTROL AND SUPPLY SYSTEM

(75) Inventors: Klaus Biester, Wienhausen (DE); Peter Kunow, Berlin (DE); Norbert Lenz, Celle (DE)

(73) Assignee: Cameron International Corporation, Houston, TX (US)

( * ) Notice: Subject to any disclaimer, the term of this patent is extended or adjusted under 35 U.S.C. 154(b) by 115 days.

(21) Appl. No.: 10/836,559

(22) Filed: Apr. 30, 2004

(65) Prior Publication Data

US 2005/0029476 A1 Feb. 10, 2005

Related U.S. Application Data

(63) Continuation-in-part of application No. 10/489,584, filed on Aug. 5, 2004, now Pat. No. 7,433,214, and a continuation-in-part of application No. 10/489,583, filed on Aug. 5, 2004, now Pat. No. 7,453,170, and a continuation-in-part of application No. 10/489,573, filed on Aug. 5, 2004, and a continuation-in-part of application No. 10/489,533, filed on Aug. 5, 2004, and a continuation-in-part of application No. 10/415,419, filed on Oct. 1, 2003, now Pat. No. 7,172,169, and a continuation-in-part of application No. 10/415,418, filed on Sep. 4, 2003, and a continuation-in-part of application No. 10/415,511, filed on Sep. 3, 2003, now Pat. No. 7,007,922, and a continuation-in-part of application No. 10/415,696, filed on Sep. 2, 2003, now Pat. No. 6,978,979, and a continuation-in-part of application No. 10/467,112, filed on Aug. 5, 2003, now Pat. No. 7,048,004, and a continuation-in-part of application No. 10/415,510, filed on Jul. 21, 2003, and a continuation-in-part of application No. 10/276,201, filed on May 8, 2003, now Pat. No. 7,231,842, and a continuation-in-part of application No. 10/344,921, filed on Feb. 18, 2003, now Pat. No. 6,898,968, and a continuation-in-part of application No. 10/276,204, filed on Nov. 12, 2002, now Pat. No. 6,899,171.

(30) Foreign Application Priority Data

Jul. 17, 2003 (DE) .............................. 203 11 033 U

(51) Int. Cl.
*H02J 3/00* (2006.01)
*H02J 5/00* (2006.01)
(52) U.S. Cl. .......................................................... 307/82
(58) Field of Classification Search .................... 307/82
See application file for complete search history.

(56) References Cited

U.S. PATENT DOCUMENTS 1,979,425 A 11/1934 Van Der Woude .......... 310/112

(Continued)

FOREIGN PATENT DOCUMENTS

DE 4 92 021 1/1930

(Continued)

OTHER PUBLICATIONS

Chr. Rohrbach: *Handbuch Für elektrisches Messen mechanischer Grössen*: 1967, VdI—Verlag, Dusseldorf (DE) XP002156890 (pp. 448-449).

(Continued)

*Primary Examiner*—Albert W Paladini
*Assistant Examiner*—Hal I Kaplan
(74) *Attorney, Agent, or Firm*—Conley Rose, P.C.

(57) ABSTRACT

A system supplies electrical power to a remote electrical device. The system includes an AC/DC voltage converter coupled to the AC voltage source for converting an AC voltage from the AC voltage source to a high DC voltage output at a first location. The AC/DC voltage converter comprises a plurality of AC/DC voltage converter components which, on the input side thereof, are connected in parallel with the AC voltage source and which, on the output side thereof, are connected serially to an electric conductor. The electric conductor extends to a plurality of voltage converters at a remote location having inputs connected serially to the electrical conductor and having outputs providing an appropriate voltage to the electrical device, the plurality of voltage converters converting the high DC voltage to either a lower DC voltage or an alternating voyage without a cooling mechanism that would otherwise be needed when less than the plurality of voltage converters are implemented to convert the high DC voltage to the lower DC voltage or alternating voltage.

6 Claims, 26 Drawing Sheets

U.S. PATENT DOCUMENTS

| | | | |
|---|---|---|---|
| 2,119,534 A | 6/1938 | Gerber | 137/596 |
| 2,387,800 A | 10/1945 | Leland et al. | 318/14 |
| 2,645,450 A | 7/1953 | Chessman | 137/625.68 |
| 2,953,344 A | 9/1960 | Yancey | 251/58 |
| 3,089,509 A | 5/1963 | Collins | 137/454.6 |
| 3,275,737 A | 9/1966 | Caller | 174/89 |
| 3,324,741 A | 6/1967 | Anderson | 74/625 |
| 3,353,594 A | 11/1967 | Lewis | |
| 3,411,576 A * | 11/1968 | Taylor, Jr. | 166/363 |
| 3,429,341 A | 2/1969 | Soching | 137/625.68 |
| 3,452,776 A | 7/1969 | Chenoweth | 137/454.6 |
| 3,738,183 A | 6/1973 | Ball, Jr. et al. | 74/89.29 |
| 3,771,918 A | 11/1973 | Winter | 417/266 |
| 3,782,653 A | 1/1974 | Scott | 242/413.4 |
| 3,887,898 A | 6/1975 | Jones | 367/25 |
| 3,980,808 A | 9/1976 | Kikuchi et al. | 174/110 SR |
| 4,062,057 A | 12/1977 | Perkins et al. | 363/71 |
| 4,124,884 A | 11/1978 | Episcopo | 363/21.08 |
| 4,179,944 A | 12/1979 | Conner | 74/89.26 |
| 4,256,065 A | 3/1981 | Hirt | 123/90.11 |
| 4,290,101 A | 9/1981 | Hergenhan | 363/65 |
| 4,295,552 A | 10/1981 | Erlach | 192/81 C |
| 4,346,728 A | 8/1982 | Sulzer | 137/243.6 |
| 4,350,322 A | 9/1982 | Mueller | 251/229 |
| 4,363,975 A | 12/1982 | Beattie | 307/150 |
| 4,423,747 A | 1/1984 | Heiser et al. | 137/85 |
| 4,436,280 A * | 3/1984 | Geisow | 251/229 |
| 4,500,832 A | 2/1985 | Mickiewicz | 323/340 |
| 4,521,642 A | 6/1985 | Vives | 174/70 S |
| 4,533,987 A | 8/1985 | Tomofuji et al. | 363/36 |
| 4,548,383 A | 10/1985 | Wölfges | 251/29 |
| 4,565,213 A | 1/1986 | Giebeler | 137/494 |
| 4,617,501 A | 10/1986 | Smith | 318/459 |
| 4,636,934 A * | 1/1987 | Schwendemann et al. | 700/3 |
| 4,639,714 A | 1/1987 | Crowe | 375/259 |
| 4,725,039 A | 2/1988 | Kolchinsky | 251/129.08 |
| 4,745,815 A | 5/1988 | Klopfenstein | 74/89.25 |
| 4,771,982 A * | 9/1988 | Bodine et al. | 251/129.1 |
| 4,788,448 A | 11/1988 | Crowe | |
| 4,814,963 A | 3/1989 | Petersen | 363/20 |
| 4,814,965 A | 3/1989 | Peterson | |
| 4,844,554 A | 7/1989 | Rojeck | 303/22.7 |
| 4,920,811 A | 5/1990 | Hopper | 74/2 |
| 4,981,173 A * | 1/1991 | Perkins et al. | 166/66.7 |
| 5,031,088 A | 7/1991 | Tanaka | 363/71 |
| 5,038,622 A | 8/1991 | Tijmann | 73/862.393 |
| 5,055,991 A | 10/1991 | Carroll et al. | |
| 5,105,351 A | 4/1992 | Harada et al. | 363/65 |
| 5,138,249 A | 8/1992 | Capel | |
| 5,168,422 A | 12/1992 | Duncan | |
| 5,195,721 A | 3/1993 | Akkerman | 251/129.13 |
| 5,210,519 A | 5/1993 | Moore | |
| 5,230,033 A * | 7/1993 | Soodak | 385/105 |
| 5,285,563 A | 2/1994 | Nove et al. | |
| 5,297,015 A | 3/1994 | Miyazaki et al. | |
| 5,301,096 A | 4/1994 | Klontz et al. | |
| 5,311,419 A | 5/1994 | Shires | 363/65 |
| 5,418,707 A | 5/1995 | Shimer et al. | |
| 5,489,897 A | 2/1996 | Inoue | |
| 5,508,903 A | 4/1996 | Alexandrov | 363/16 |
| 5,563,780 A | 10/1996 | Goad | 363/780 |
| 5,572,182 A | 11/1996 | De Pinho Filho et al. | 340/855.4 |
| 5,573,032 A | 11/1996 | Lenz et al. | 137/486 |
| 5,610,452 A | 3/1997 | Shimer et al. | 307/89 |
| 5,629,844 A | 5/1997 | Krichtafovitch et al. | 363/65 |
| 5,649,451 A | 7/1997 | Ruland | 74/89.3 |
| 5,682,303 A | 10/1997 | Goad | |
| 5,731,969 A | 3/1998 | Small | 363/126 |
| 5,754,028 A | 5/1998 | Vezzini | 320/125 |
| 5,806,761 A | 9/1998 | Enoki et al. | 236/12.2 |
| 5,825,638 A | 10/1998 | Shutts | 363/21.11 |
| 5,832,996 A | 11/1998 | Carmody et al. | 166/53 |
| 5,923,550 A | 7/1999 | Kumar | |
| 5,930,340 A | 7/1999 | Bell | |
| 5,982,645 A | 11/1999 | Levran et al. | 363/37 |
| 5,983,743 A | 11/1999 | McGregor et al. | 74/89.23 |
| 5,984,260 A | 11/1999 | Rawson et al. | 251/71 |
| 6,007,047 A | 12/1999 | Phipps | 251/252 |
| 6,032,924 A | 3/2000 | Castle | 251/129.12 |
| 6,041,667 A | 3/2000 | Pischinger et al. | 73/862.69 |
| 6,073,907 A | 6/2000 | Schreiner, Jr. et al. | |
| 6,094,366 A | 7/2000 | Kalfhaus | 363/73 |
| 6,095,487 A | 8/2000 | Waber | 251/129.11 |
| 6,142,171 A | 11/2000 | Hancock | 137/271 |
| 6,152,167 A | 11/2000 | Baker | 137/458 |
| 6,154,381 A | 11/2000 | Kajouke et al. | |
| 6,158,295 A | 12/2000 | Nielsen | 74/89.38 |
| 6,181,576 B1 | 1/2001 | Ikeda et al. | 363/17 |
| 6,269,015 B1 | 7/2001 | Ikeda et al. | 363/142 |
| 6,356,384 B1 | 3/2002 | Islam | 359/334 |
| 6,385,057 B1 * | 5/2002 | Barron | 363/17 |
| 6,388,904 B2 | 5/2002 | Nomura | 363/71 |
| 6,411,527 B1 | 6/2002 | Reinold | 363/17 |
| 6,446,519 B1 | 9/2002 | Biester | 74/89.16 |
| 6,446,660 B1 | 9/2002 | Usabiaga | 137/243.6 |
| 6,494,257 B2 | 12/2002 | Bartlett et al. | 166/86.2 |
| 6,494,294 B1 | 12/2002 | Naiki et al. | 184/34 |
| 6,559,385 B1 | 5/2003 | Johnson et al. | 174/126.1 |
| 6,595,487 B2 | 7/2003 | Johansen et al. | |
| 6,615,916 B1 | 9/2003 | Vachon | 166/250.01 |
| 6,668,639 B2 | 12/2003 | Fong et al. | 73/161 |
| 6,965,302 B2 | 11/2005 | Mollenkopf et al. | |
| 6,998,962 B2 | 2/2006 | Cope et al. | |
| 7,075,414 B2 | 7/2006 | Giannini et al. | |
| 7,264,057 B2 | 9/2007 | Rytlewski et al. | |
| 2001/0012207 A1 | 8/2001 | Nomura | 363/17 |
| 2005/0013148 A1 | 1/2005 | Kunow et al. | |
| 2005/0029476 A1 | 2/2005 | Biester et al. | |

FOREIGN PATENT DOCUMENTS

| | | |
|---|---|---|
| DE | 514986 | 12/1930 |
| DE | 1 199 088 | 8/1965 |
| DE | 1 525 323 | 9/1969 |
| DE | 145 982 | 1/1981 |
| DE | 3224041 | 3/1983 |
| DE | 34 17 455 | 5/1984 |
| DE | 33 03 248 | 8/1984 |
| DE | 33 16 258 | 11/1984 |
| DE | 34 24 041 | 1/1986 |
| DE | 3424041 * | 1/1986 |
| DE | 38 32 304 | 3/1990 |
| DE | 90 05 411 | 8/1990 |
| DE | 43 44 709 | 6/1993 |
| DE | 44 14 677 | 11/1995 |
| DE | 44 47 395 | 6/1996 |
| DE | 195 28 081 | 6/1997 |
| DE | 195 48 593 | 7/1997 |
| DE | 196 14 627 | 10/1997 |
| DE | 196 39 476 | 5/1998 |
| DE | 197 14 552 | 10/1998 |
| DE | 197 50 041 | 1/1999 |
| DE | 199 09 712 | 7/2000 |
| DE | 199 63 105 | 6/2001 |
| EP | 0 028 296 | 8/1980 |
| EP | 0 050 466 | 4/1982 |
| EP | 0 303 801 | 6/1986 |
| EP | 0 622 574 | 3/1994 |
| EP | 0 626 670 | 11/1994 |
| EP | 0 384 607 | 6/1995 |
| EP | 1 024 422 | 8/2000 |
| EP | 1 107 437 | 2/2001 |
| EP | 1 244 203 | 12/2001 |
| FR | 1 390 757 | 1/1965 |

| | | |
|---|---|---|
| FR | 74 28273 | 11/1976 |
| FR | 2 353 992 | 12/1977 |
| GB | 625580 | 6/1949 |
| GB | 1001629 | 8/1965 |
| GB | 2332220 | 6/1989 |
| GB | 2 266 942 | 11/1993 |
| GB | 2 141 882 | 1/1995 |
| JP | 59 103570 | 6/1984 |
| JP | 61 076071 | 4/1986 |
| JP | 61 240858 | 10/1986 |
| JP | 62 217857 | 9/1987 |
| JP | 63 308420 | 12/1988 |
| JP | 01 114368 | 5/1989 |
| JP | 02 206362 | 8/1990 |
| JP | 03 065054 | 3/1991 |
| JP | 03 150068 | 10/1991 |
| JP | 04 200270 | 7/1992 |
| JP | 05 327381 | 12/1993 |
| JP | 07 154967 | 6/1995 |
| JP | 08338391 | 12/1996 |
| NL | 112253 | 12/1965 |
| SU | 1270293 | 11/1986 |
| SU | 1 709 511 | 1/1992 |
| WO | WO 95/20836 | 8/1995 |
| WO | WO 96/28878 | 9/1996 |
| WO | WO 97/38479 | 10/1997 |
| WO | WO 9738479 A1 * | 10/1997 |
| WO | WO 98/30816 | 7/1998 |
| WO | WO 99 37009 | 7/1999 |
| WO | WO 99/37009 * | 7/1999 |
| WO | WO 01 37411 | 5/2001 |
| WO | WO 01/52397 | 7/2001 |
| WO | WO 01/84689 | 11/2001 |

OTHER PUBLICATIONS

Engles, Ludwig, u.a.: *Informationsübertragung, Prozeβankopplung und und Komponenten eines Doppelrechnersystems*. In: etz-a, Bd. 98, 1977: (pp. 602-606).
German Search Report for Appln. No. 200 18 560.8; Dated Oct. 23, 2001 (pp. 4).
Brusewitz, M.: *Elektrochemische Aktoren*; F&M Feinwerktechnik Mikrotechnik Mikroelektronik; vol. 106, No. 7/8; Jul. 1998 (pp. 527-530.
International Search Report for Appl. No. PCT/EP02/10471 dated Jul. 14, 2003 (pp. 12).
Partial International Search Report for Appln. No. PCT/EP02/10468 dated Jan. 16, 2003 (pp. 8).
J. R. Pinheiro et al; *Isolated Interleaved-Phase-Shift-PWM de-dc ZVS Converters*; IEEE 2000; (pp. 2383-2388).
René Torrico-Bascope et al; *Dual-Bridge DC-DC Converter with Soft Switching Features*; IEEE 2001; (pp. 722-727.
Demercil S. Oliveira et al; *A Lossless Commutation PWM Two Level Forward Converter Operating Like a Full-Bridge*; IEEE 2000 (pp. 334-339).
J. E. Baggio et al; *An Improved Full-Load-Range Isolated ZVS-PWM DC-DC Converter*; IEEE 2001 (pp. 708-714).
Demercil S. Oliveira et al; *A Lossless Commutation PWM Two Level Forward Converter*; IEEE 2000 (pp. 334-339).
International Search Report for Appln. No. PCT/EP02/10467 dated Sep. 29, 2003 (pp. 10).
International Search Report for Appln. No. PCT/EP02/10469 dated Oct. 23, 2003 (pp. 14).
British Combined Search and Examination Report for Appln. No. GB0603306.2 dated Mar. 14, 2006 (pp. 5).
British Combined Search and Examination Report for Appln. No. GB0603307.0 dated Mar. 14, 2006 (pp. 6).
British Combined Search and Examination Report for Appln. No. GB0603309.6 dated Mar. 14, 2006 (pp. 6).
International Search Report for Appl. No. PCT/US05-14593 dated Sep. 29, 2006; (6 p.).
Office Action dated Nov. 17, 2005 for U.S. Appl. No. 10/415,510 (19 p.).
Office Action dated May 16, 2006 for U.S. Appl. No. 10/415,510 (19 p.).
Office Action dated Aug. 14, 2006 for U.S. Appl. No. 10/415,510 (22 p.).
Office Action dated Jan. 31, 2007 for U.S. Appl. No. 10/415,510 (21 p.).
Office Action dated May 30, 2007 for U.S. Appl. No. 10/489,573 (37 p).
Office Action dated Dec. 8, 2005 for U.S. Appl. No. 10/489,533 (20 p.).
Final Office Action dated Jul. 28, 2006 for U.S. Appl. No. 10/489,533 (19 p.).
Office Action dated May 18, 2007 for U.S. Appl. No. 10/489,533 (15 p.).
Office Action dated Dec. 19, 2006 for U.S. Appl. No. 10/489,533 (16 p.).
Office Action dated Jun. 4, 2007 for U.S. Appl. No. 10/489,583 (17 p.).
Office Action dated Jul. 3, 2006 for U.S. Appl. No. 10/489,583 (17 p.).
Office Action dated Dec. 15, 2006 for U.S. Appl. No. 10/489,583 (16 p.).
Office Action dated Jul. 17, 2006 for U.S. Appl. No. 10/489,584 (17 p.).
Office Action dated Jun. 15, 2007 for U.S. Appl. No. 10/489,584 (12 p.).
Invitation to Pay Additional Fees and Partial Search Report for App. No. PCT/EP02/10469 dated May 16, 2003 (pp. 7).
International Search Report for Appl. No. PCT/EP01/09513 dated Mar. 6, 2002 (7 p.).
International Search Report for Appl. No. PCT/EP01/12550 dated Feb. 26, 2002 (6 p.).
International Search Report for Appl. No. PCT/EP01/12548 dated May 17, 2002 (2 p.).
Office Action Dated Oct. 9, 2007 for U.S. Appl. No. 10/415,510; (24 p.).
Office Action Dated Oct. 18, 2007 for U.S. Appl. No. 10/489,533; (15 p.).
Office Action Dated Nov. 13, 2007 for U.S. Appl. No. 10/489,573 (26 p.).
Office Action Dated Nov. 13, 2007 for U.S. Appl. No. 10/489,583 (16 p.).
Translation of Official Action dated Jan. 17, 2007 for Norwegian Appl. No. 20031892 (3 p.).
German Search Report for Appln. No. 200 18 560.8 dated Jul. 11, 2001 (pp. 4).
Response to Office Action Dated Nov. 17, 2005 for U.S. Appl. No. 10/415,510 (pp. 34).
Response to Office Action Dated May 16, 2006 for U.S. Appl. No. 10/415,510 (pp. 22).
Response to Office Action Dated Aug. 14, 2006 for U.S. Appl. No. 10/415,510 (pp. 15).
Response to Office Action Dated Jan. 31, 2007 for U.S. Appl. No. 10/415,510 (pp. 16).
Response to Office Action Dated Oct. 9, 2007 for U.S. Appl. No. 10/415,510 (pp. 24).
Office Action Dated Oct. 19, 2006 for U.S. Appl. No. 10/489,573 (pp. 5).
Response to Restriction Requirement Dated Oct. 19, 2006 for U.S. Appl. No. 10/489,573 (pp. 5).
Office Action Dated Mar. 1, 2007 for U.S. Appl. No. 10/489,573 (pp. 3).
Response to Restriction Requirement Dated Mar. 1, 2007 for U.S. Appl. No. 10/489,573 (pp. 5).
Response to Office Action Dated May 30, 2007 for U.S. Appl. No. 10/489,573 (pp. 9).
Pre-Appeal Brief for Review Dated Feb. 13, 2008 for U.S. Appl. No. 10/489,573 (pp. 5).
Response to Office Action Dated Dec. 8, 2005 for U.S. Appl. No. 10/489,533 (pp. 24).
Office Action Dated May 9, 2006 for U.S. Appl. No. 10/489,533 (pp. 4).

Response to Restriction Requirement Dated May 9, 2006 for U.S. Appl. No. 10/489,533 (pp. 1).
Response to Final Office Action Dated Jul. 28, 2006 for U.S. Appl. No. 10/489,533 (pp. 14).
Response to Office Action Dated Dec. 19, 2006 for U.S. Appl. No. 10/489,533 (pp. 12).
Request for Continued Examination and Response to Final Office Action Dated May 18, 2007 for U.S. Appl. No. 10/489,533 (pp. 13).
Response to Office Action Dated Oct. 18, 2007 for U.S. Appl. No. 10/489,533 (pp. 11).
Office Action Dated Apr. 7, 2008 for U.S. Appl. No. 10/489,533 (pp. 18).
Office Action Dated Apr. 6, 2006 for U.S. Appl. No. 10/489,583 (pp. 6).
Response to Restriction Requirement Dated Apr. 6, 2006 for U.S. Appl. No. 10/489,583 (pp. 2).
Response to Office Action Dated Jul. 3, 2006 for U.S. Appl. No. 10/489,583 (pp. 9).
Response to Office Action dated Dec. 15, 2006 for U.S. Appl. No. 10/489,583 (pp. 10).
Response to Office Action Dated Jun. 4, 2007 for U.S. Appl. No. 10/489,583 (pp. 10).
Pre-Appeal Brief Request for Review for U.S. Appl. No. 10/489,583 (pp. 10).
Office Action Dated Apr. 6, 2006 for U.S. Appl. No. 10/489,584 (pp. 9).
Response to Restriction Requirement Dated Apr. 6, 2006 for U.S. Appl. No. 10/489,584 (pp. 1).
Response to Office Action Dated Jul. 17, 2006 for U.S. Appl. No. 10/489,584 (pp. 17).
Office Action Dated Feb. 28, 2007 for U.S. Appl. No. 10/489,584 (pp. 12).
Response to Office Action Dated Feb. 28, 2007 for U.S. Appl. No. 10/489,584 (pp. 8).
Appeal Brief for U.S. Appl. No. 10/489,584 (pp. 24).
Office Action Dated Jun. 20, 2008 for U.S. Appl. No. 10/415,510 (pp. 24).
Notice of Allowance and Fee(s) Due for U.S. Appl. No. 10/489,584 Dated May 29, 2008 (pp. 14).
Supplemental Notice of Allowability for U.S. Appl. No. 10/489,584 Dated Aug. 27, 2008 (pp. 8).
Notice of Allowance and Fee(s) Due Dated Jul. 16, 2008 for U.S. Appl. No. 10/489,583 (pp. 7).
Supplemental Notice of Allowability for U.S. Appl. No. 10/489,583 Dated Aug. 4, 2008 (pp. 5).
Translation of Norwegian Official Action Dated Dec. 7, 2007 for Appl. No. 2004 1129 (pp. 6).
Translation of Norwegian Official Action Dated Jan. 30, 2008 for Appl. No. 2004 1130 (pp. 7).
Translation of Norwegian Official Action Dated Dec. 7, 2008 for Appl. No. 2004 1128 (pp. 3).
Translation of Norwegian Official Action Dated Feb. 5, 2008 for Appl. No. 2004 1134 (pp. 3).
German Search Report for Appl. No. 200 18 562.4 dated Jul. 11, 2001 (pp. 4).
Response to Office Action Dated Jun. 20, 2008 for U.S. Appl. No. 10/415,510 (18 pp.).
Final Office Action Dated Jan. 7, 2009 for U.S. Appl. No. 10/415,510 (26 pp.).
Response to Final Office Action Dated Jan. 7, 2009 for U.S. Appl. No. 10/415,510 (18 pp.).
Final Office Action Dated Dec. 12, 2008 for U.S. Appl. No. 10/489,533 (18 pp.).
Response to Final Office Action Dated Dec. 12, 2008 for U.S. Appl. No. 10/489,533 (11 pp.).
Translation of Norwegian Official Action dated Nov. 5, 2008 for Appl. No. 2004 1130 (6 pp.).
Translation of Norwegian Official Action dated Jan. 6, 2009 for Appl. No. 2004 1134 (4 pp.).
Norwegian Office Action Dated Dec. 5, 2008 for Appl. No. 01 980 532.4 -2207 (3 pp.).

* cited by examiner

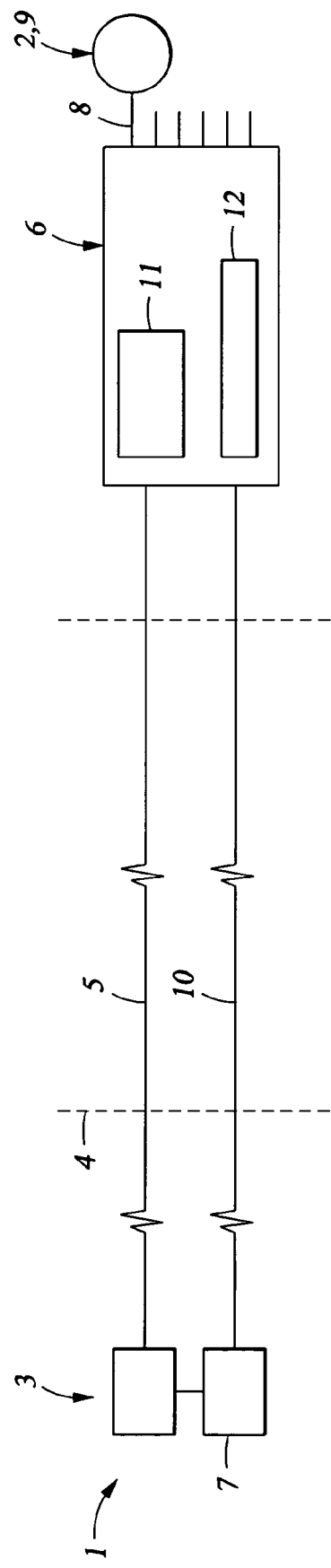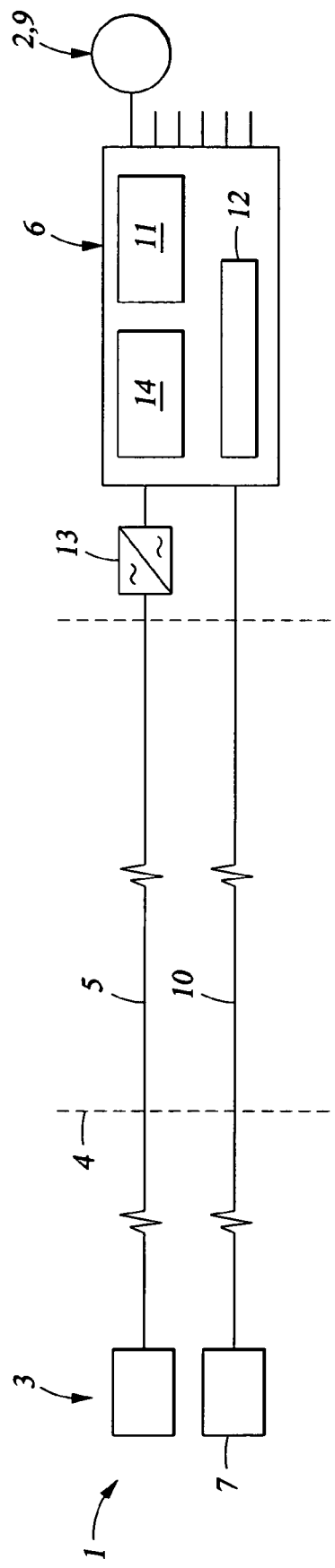
Fig. 1A (PRIOR ART)
Fig. 1B (PRIOR ART)

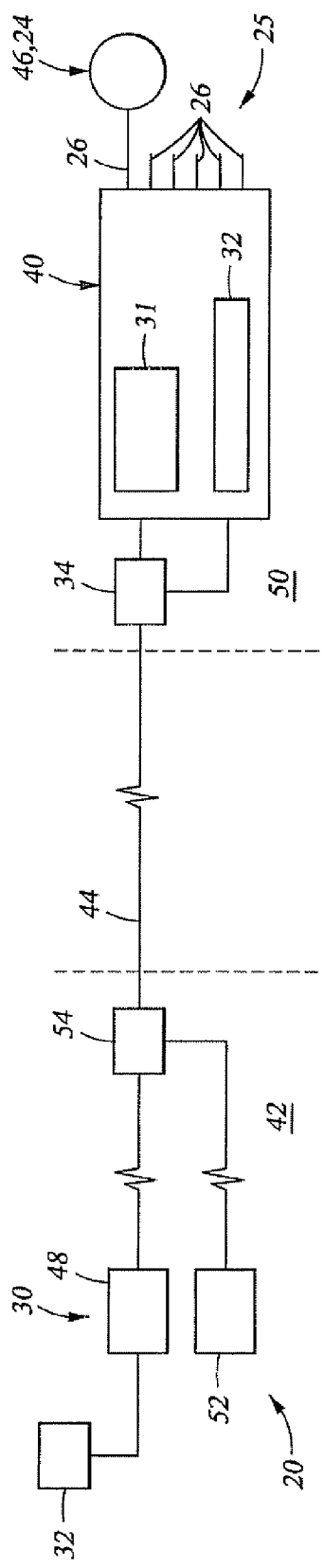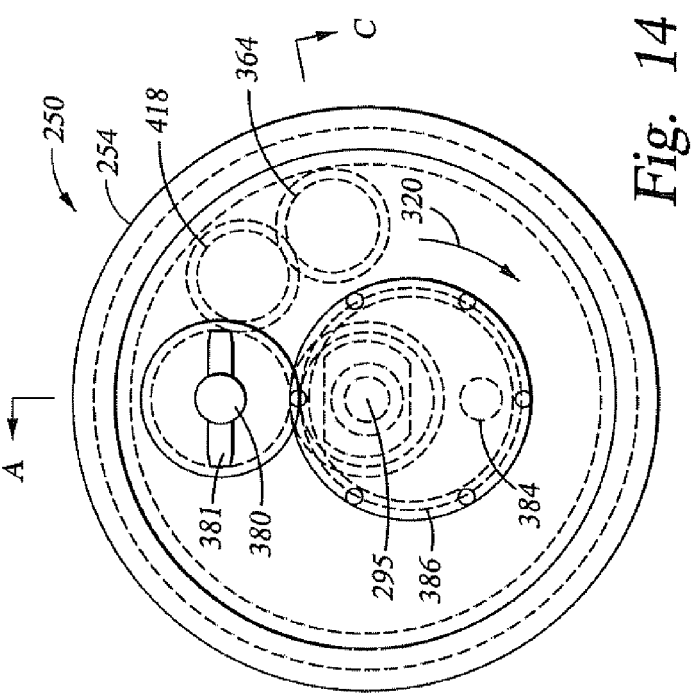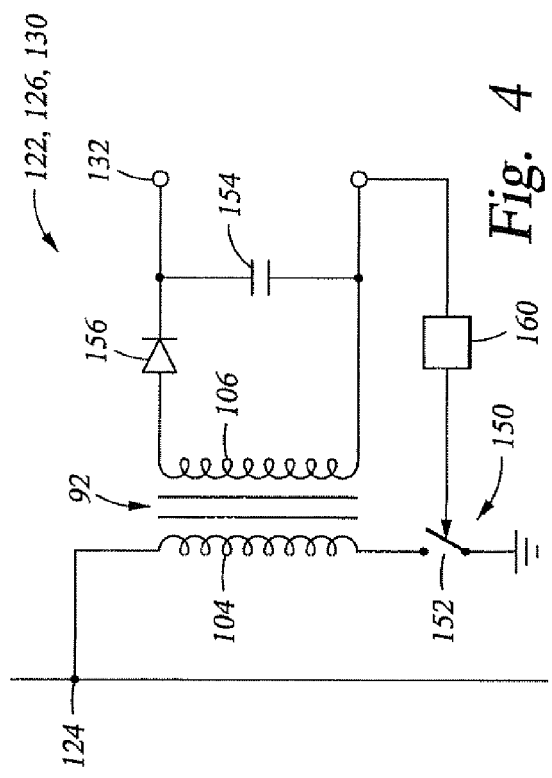

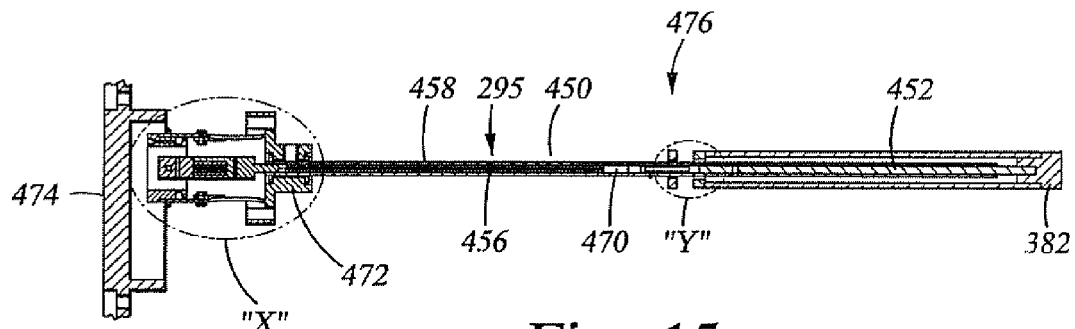
Fig. 15
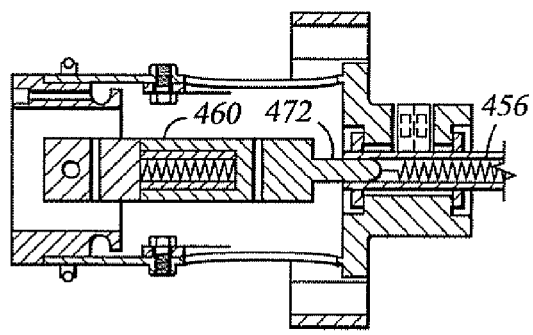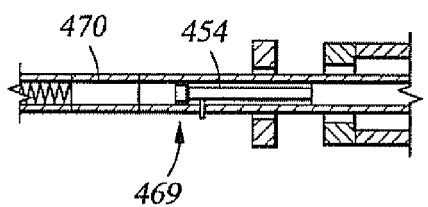
Fig. 16  Fig. 17
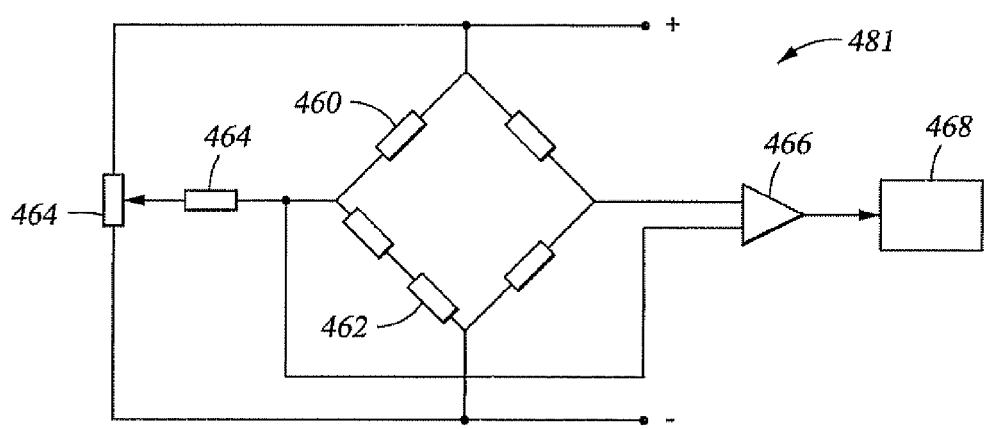
Fig. 18

ELECTRIC CONTROL AND SUPPLY SYSTEM

CROSS-REFERENCE TO RELATED APPLICATIONS

The present application is a continuation-in-part application of each of the following applications: U.S. patent application Ser. No. 10/415,510, filed Jul. 21, 2003 and entitled Control and Supply System, which claims the benefit of PCT application PCT/EP01/12547 filed Oct. 30, 2001, which claims the priority of DE 200 18 560.8 filed Oct. 30, 2000; U.S. patent application Ser. No. 10/489,573 filed Aug. 5, 2004 and entitled Universal Power Supply System, which claims the benefit of PCT/EP02/10471 filed Sep. 18, 2002, which claims the priority of DE 201 15 471.9 filed Sep. 19, 2001; U.S. patent application Ser. No. 10/489,583 filed Aug. 5, 2004 now U.S. Pat. No. 7,453,170 and entitled Universal Power Supply System, which claims the benefit of PCT/EP02/10468 filed Sep. 18, 2002, which claims the priority of DE 201 15 473.0 filed Sep. 19, 2001; U.S. patent application Ser. No. 10/489,533 filed Aug. 5, 2004 and entitled DC Voltage Converting Device, which claims the benefit of PCT/EP01/12547 filed Oct. 30, 2001, which claims the priority of DE 200 18 560.8 filed Oct. 30, 2000; U.S. patent application Ser. No. 10/489,584 filed Aug. 5, 2004 now U.S. Pat. No. 7,433,214 and entitled DC Converter, which claims the benefit of PCT/EP02/10469 filed Sep. 18, 2002, which claims the priority of DE 201 15 474.9 filed Sep. 19, 2001; U.S. patent application Ser. No. 10/276,204, filed Nov. 12, 2002 now U.S. Pat. No. 6,899,171 and entitled Actuating Device which claims the benefit of PCT/EP01/05156 filed May 7, 2001, which claims the priority of DE 200 08 415.1 filed May 11, 2000; U.S. patent application Ser. No. 10/276,201, filed May 8, 2003 now U.S. Pat. No. 7,231,842 and entitled Actuating Device which claims the benefit of PCT/EP01/05158 filed May 7, 2001, which claims the priority of DE 200 08 414.3 filed May 11, 2000; U.S. patent application Ser. No. 10/344,921, filed Feb. 18, 2003 now U.S. Pat. No. 6,898,968 and entitled Method and Device for Measuring a Path Covered which claims the benefit of PCT/EP01/09513 filed Aug. 17, 2001, which claims the priority of EP 00117841.7 filed Aug. 18, 2000; U.S. patent application Ser. No. 10/415,419, filed Oct. 1, 2003 now U.S. Pat. No. 7,172,169 and entitled Actuating Device, which claims the benefit of PCT/EP01/12551 filed Oct. 30, 2001, which claims the priority of DE 200 18 564.0 filed Oct. 30, 2000; U.S. patent application Ser. No. 10/415,418, filed Sep. 4, 2003 and entitled Actuating Device, which claims the benefit of PCT/EP01/12549 filed Oct. 30, 2001, which claims the priority of DE 200 18 563.2 filed Oct. 30, 2000; U.S. patent application Ser. No. 10/415,696, filed Sep. 2, 2003 now U.S. Pat. No. 6,978,979 and entitled Isolating Device which claims the benefit of PCT/EP01/12548 filed Oct. 30, 2001, which claims the priority of DE 200 18 562.4 filed Oct. 30, 2000; U.S. patent application Ser. No. 10/467,112 filed Aug. 5, 2003 now U.S. Pat. No. 7,048,004 and entitled Valve System, which claims the benefit of PCT/EP01/12550 filed Oct. 30, 2001, which claims priority from DE 20012168.4, filed Feb. 8, 2001; U.S. patent application Ser. No. 10/415,551, filed Sep. 3, 2003 now U.S. Pat. No. 7,007,922 and entitled Rotating Regulating Device which claims the benefit of PCT/EP01/12554 filed Oct. 30, 2001, which claims the benefit of DE 200 18 548.9 filed Oct. 30, 2000; which claims German patent application No. DE 203 11 033 filed Jul. 17, 2003 and entitled Pump Device, all hereby incorporated herein by reference in their entirety U.S. patent application Ser. No. 10/564,584 filed Jan. 13, 2006 and entitled Pump Device for the Hydraulic Actuation of a Valve claims the benefit of priority to German patent application No. DE 203 11 033 filed Jul. 17, 2003 and entitled Pump Device.

BACKGROUND OF THE INVENTION

1. Field of Invention

The electric control and supply system comprises a supply and control assembly at a first location and a control and actuating assembly at a remote location associated with a remote device. An umbilical extends between and connects the supply and control assembly with the control and actuating assembly for supplying direct voltage to the control and actuating assembly. The electric control and supply system may be used, for example, in the production of oil and gas and may be used either with land based wells or offshore wells. With offshore wells, the supply and control assembly is disposed on a platform or vessel at the sea surface and the control and actuating assembly is located at a remote location below the sea surface such as at the sea floor. The umbilical extends subsea from the supply and control assembly supplying direct voltage to the remote subsea control and actuating assembly. The subsea control and actuating assembly is connected to various electrical devices, such as motors, electrical actuators and similar equipment via appropriate connecting lines.

2. Background of the Art

Typically, subsea tools (e.g., controls systems and actuators) are hydraulically controlled and actuated. However, hydraulic supply lines are large and expensive. Further, hydraulic equipment, such as pumps at the surface, are large and take up a significant amount of space on the platform or vessel. One way to solve the problems presented by hydraulic equipment is to implement electrically powered subsea tools. Therefore, electrical control and power supply systems for subsea tools are needed.

Prior art electrical control and supply systems include an energy supply system at the sea surface, which transmits alternating voltage through a subsea cable to the sea floor. The amplitude and frequency of the alternating voltage is selected such that, for example, the subsea tools connected to the end of the subsea cable receive a suitable supply voltage for their operation. Each subsea tool is connected to a separate subsea cable. Furthermore, data transmission between the surface and the sea floor occurs via separate subsea cables.

Referring to FIG. 1(a), there is shown a prior art control and supply system 1 having a voltage supply and control device 3 with appropriate voltage source and multiplexer device 7 arranged above the surface of the sea 4. The voltage supply 3 transmits alternating voltage directly, via a subsea cable 5, to a control and actuating device 6 arranged below sea level. The control and actuating device 6 is connected via connecting lines 8 to appropriate electrical devices 2 or electrical units 9. An electrical unit 9 may be formed by a group of electrical devices 2, which, for example, are arranged in the form of a tree structure and are controlled and actuated on a common basis.

A data cable 10 is provided for the transmission of data and control signals between the voltage supply and control device 3 and the control and actuating device 6. The data cable 10 is preferably composed of coaxial conductors.

Normally, an alternating voltage of a maximum of 600 VAC is transmitted along the subsea cable 5. For the supply of the appropriate electrical devices with 240 VAC and appropriate power, cross-sectional areas of at least 175 mm$^2$ for appropriate conductors are required in the subsea cable having a length, for example, of 50 km.

The control and actuation device 6 includes at least one motor actuation device 11 and a control system 12. The various motors, as electrical devices 2, can be used subsea for the actuation of valves, BOPs (blow-out preventers) and similar equipment used for the production of oil or gas at the sea floor.

One disadvantage with prior art control and supply systems, such as shown in FIG. 1(a), is that a costly subsea cable is necessary. For example, to supply a subsea electrical device with 240 VAC via a subsea cable that extends 30 to 50 km from the surface down to the subsea electrical device, the subsea cable must have a cross-sectional area of 100 to 200 $mm^2$. In addition, data lines are required, such that the subsea cable must have a substantial diameter, and thus be very costly.

In the above example, it has been assumed that 240 VAC is sufficient for the subsea electrical devices. However, it has now been found that higher voltages are required, for example, in order to be able to actuate certain subsea electrical devices, such as servomotors requiring greater power, for example, to close valves in the production of oil and gas in a maximum time period of one minute. Where such electrical devices must be supplied with a greater voltage, the cross-sectional area of the subsea cable increases still further.

In addition, it has been found in practice that on starting a servomotor as an electrical device and in particular for servomotors requiring greater power, even with a slow starting process, a return signal is transmitted via a subsea cable to the supply and control device at the surface indicating the starting process of the servomotor as a short circuit at the end of the cable. This leads to the switching off of any systems automatically protected against short circuit. Furthermore, with the previously described prior art control and supply system, the overall system only has an output power efficiency of 27%.

Another known control and supply system is shown in FIG. 1(b) with the transmission of alternating voltage along the subsea cable 5. In this case, however, a voltage of a maximum of 10,000 VAC is transmitted which is reduced, before the control and actuation device 6, by a suitable transformer 13 to the voltage values required for the electrical devices. Also, with this prior art system, a separate data conductor 10 is provided as a coaxial cable or similar cable. The control and actuating device 6 according to FIG. 1(b) requires expensive power capacitors 14 in order to smooth the reduced alternating voltage appropriately. In addition, with this prior art system, as with the system according to FIG. 1(a), power factor correction devices are needed to lower the apparent power of the system to obtain an adequate efficiency for the overall system. Such correction devices are very complex and normally quite expensive and consist of capacitors or similar devices.

With the prior art system according to FIG. 1(b) and for appropriate voltage values and powers for the electrical devices on the sea floor, conductor cross-sectional areas in the subsea cable of, for example, at least 75 $mm^2$ arise for a length of 50 km or with power factor correction at least a cross-sectional area of 26 $mm^2$ for a 50 km length.

However, even with the complete expansion of the previously mentioned prior art system, the efficiency normally is less than 70% and the cross-sectional areas for a conductor in the subsea cable are about 16 or 26 $mm^2$ for a length of 30 km or 50 km, respectively.

Converting devices have been used to convert a high voltage (DC or AC) to a lower voltage (DC or AC). If a high voltage is present on the input side, a corresponding conversion into another voltage is difficult as a rule because corresponding components of the converting device do not show a sufficiently high breakdown strength. Moreover, in the case of a high power to be transmitted, the heat developed in the converting device may be considerable even if the power loss is only 10 or 20%. To be able to discharge the power loss converted into heat, corresponding cooling means must be provided. This makes the converting device more expensive and also larger due to the additional cooling means. Components having dielectric strengths of more than 1000V, e.g. 3000 or 6000V, are, however, not available or they can hardly be realized technically. If such a converter is nevertheless suitable for such high DC voltages, the whole system will collapse if the converter fails to operate. In addition, even if the efficiency is comparatively high, the converting device will have a dissipation power that produces a substantial amount of heat comparatively locally. This amount of heat may destroy certain components of the converting device. In order to avoid such destruction, complicated cooling systems are required which entail high costs.

The present invention overcomes the deficiencies of the prior art.

BRIEF SUMMARY OF THE PREFERRED EMBODIMENTS

An electric control and supply system comprises a supply and control assembly at a first location and a control and actuating assembly at a remote location associated with one or more remote electrical devices. An umbilical extends between and connects the supply and control assembly with the control and actuating assembly for supplying a voltage to the control and actuating assembly. The supply and control assembly at the first location includes an AC voltage source coupled to an AC/DC voltage converter. The AC/DC voltage converter converts an AC voltage from the AC voltage source to a high DC voltage output at the first location. The AC/DC voltage converter comprises a plurality of AC/DC voltage converter components which, on the input side thereof, are connected in parallel with the AC voltage source and which, on the output side thereof, are connected serially to the umbilical. The umbilical extends to the control and actuating assembly and associated remote electrical devices at the remote location. The control and actuating assembly preferably includes a DC/DC voltage converter, although a DC/AC voltage converter may be used. The DC/DC voltage converter includes a plurality of DC/DC voltage converter components having inputs connected serially to the umbilical and having outputs providing a lower DC voltage to one or more of the remote electrical devices. The length of the umbilical typically is at least one kilometer.

The electric control and supply system may further include a data communication assembly for the transmission of data signals over the umbilical. The data communication assembly may include a first data coupling device coupled to the umbilical and allows communication with the remote electrical devices via the umbilical using signals associated with a first frequency range while power is supplied to the electrical devices via the umbilical. Clocking frequencies associated with one or more of the AC/DC converter components may be phase shifted with respect to each other to shift clocking noise from the first frequency range to a second frequency range. Additionally, the control and actuating assembly may further include a data communication assembly for transmission of data signals over the umbilical. The data communication assembly may include a second data coupling device coupled to the umbilical and allows communication with the control and supply assembly via the umbilical using signals associated with a first frequency range while power is supplied to the electrical devices via the umbilical. Preferably, clocking frequencies associated with one or more of the DC/DC voltage converter components may be phase shifted with respect to each other to shift clocking noise from the first frequency range to the second frequency range. Filters may be used at the first location and the remote location to remove noise conducted over the umbilical. Preferably, noise associated with, at least, the second frequency range is reduced or eliminated by the filters.

The electric control and supply system also includes a first controller coupled to the AC/DC voltage converter allowing control of one or more functions of the AC/DC voltage converter and a second controller coupled to the DC/DC voltage converter allowing control of one or more functions of the DC/DC voltage converter. The first data coupling device is coupled to the first controller allowing the first controller to couple data to and decouple data from the umbilical and the second data coupling device is coupled to the second controller allowing the second controller to couple data to and decouple data from umbilical.

The control and actuating assembly is electrically connected to the one or more electrical devices for the supply of preferably DC voltage. One type of electrical device may comprise an actuator for valves, chokes, and other closure members. The actuator comprises an electric motor being powered by second DC voltage at the remote location. A rotating spindle is coupled to the electric motor and an actuator element is adapted to be axially displaced in a feed direction by the rotating spindle rotating in a direction of advance rotation. An enclosure is disposed about the electric motor, rotating spindle, and actuator element. A first volute spring is coupled to the rotating spindle and the enclosure such that the first volute spring is operable to prevent the rotating spindle from moving in the direction opposite the direction of advance rotation. The actuator also includes an electrically activated system operable to release the first volute spring so as to allow the rotating spindle to move in the direction opposite the direction of advance rotation. The system further includes an emergency release unit operable to move the actuator element in the direction opposite the feed direction when the DC voltage is interrupted.

The actuator may also include a position sensor operable to determine the axial position of the actuator element. Two electric motors may be coupled to the rotating spindle for redundancy.

Embodiments of the invention, preferably implement a subsea umbilical having a size (cross-sectional area) and cost that is significantly reduced. In at least some embodiments, transmitting a DC voltage supply via the subsea umbilical rather than an AC voltage supply allows the size and cost of the cable in the umbilical to be reduced. Furthermore, embodiments of the invention preferably allow high voltage and high power to be supplied to a subsea electrical device while maintaining a stable power supply.

The electric control and supply system provides several advantages such as providing power subsea over longer distances without increasing the size of the umbilical cable, higher power transfer efficiency, redundancy, and cost benefits.

The system according to the invention is therefore distinguished by its simplicity and higher efficiency (at least 70%), whereby a significant cost saving can be obtained solely by the significant reduction of the cross-sectional area of the conductors in the subsea umbilical.

The present system does not require a separate cable to transmit data between the electric supply and control assembly and the control and actuating assembly, as does the prior art.

According to the invention, another advantage arises in that voltage frequencies can be modulated onto the direct voltage transmitted over the umbilical in a simple manner for data transmission. This can especially take place in that the electric supply and control assembly and the control and actuation assembly each exhibit at least one data modulation device. In at least some embodiments, the data modulation devices used in the control and actuating assembly may be disposed after the DC/DC or DC/AC converter components.

In summary, the system offers many advantages, such as quick response, elimination of hydraulic fluid, no dumping of fluid to sea (environmentally friendly) and the ability to perform real time diagnostics on the actuators, valves and chokes. At the surface the requirement for a hydraulic power unit is eliminated and the surface equipment is generally more compact.

It is therefore the object of the present invention to improve a power supply system so that it is possible to provide a high and stable voltage, even in the case of high power requirements, in a reliable manner and at a reasonable price, without any additional components for e.g. heat dissipation being necessary. The object of the present invention is to provide a power supply system to remote (e.g., subsea) electrical devices so that with small constructional efforts and with low costs, the energy supply to the remote electrical device is guaranteed over great distances. Additionally, the power supply system is stable, efficient and redundant.

It should also be pointed out that, due to the DC voltage transmitted to the electric devices, thin line (cross-sections) umbilical conductors are possible especially when a coaxial cable is used as the umbilical; these thin line umbilicals permit a substantial reduction of the cable connection costs. In particular, when the distances to the electric devices are in the kilometer range (e.g., 50 kilometers) and when the coaxial cable can simultaneously be used for transmitting data as well, a substantial amount of costs will be saved.

Expensive capacitors, such as electrolytic filter capacitors, are no longer necessary for smoothing the DC voltage on the output side. In addition, power factor correction can take place directly at the location of the control and actuating assembly. For example, a suitable means for effecting this correction can be included in the DC/DC or DC/AC converter components or rather in the integrated circuit thereof. Additionally, high frequency clocking of the DC/DC or DC/AC converter components simultaneously guarantees that the DC voltage on the input side is sampled in full width, whereby a high efficiency is obtained.

Other objects and advantages of the invention will appear from the following description.

BRIEF DESCRIPTION OF THE DRAWINGS

For a detailed description of the preferred embodiments of the invention, reference will now be made to the accompanying drawings wherein:

FIGS. 1(a)-(b) are schematic diagrams of various prior art control and supply systems;

FIG. 1(c) is a schematic of the electric control and supply system according to embodiments of the invention;

FIG. 4 shows a schematic circuit diagram of an embodiment of a flyback converter clocked on the primary side and used as a converter component;

FIG. 14 is a cut-away view along line A-C in FIG. 13;

FIG. 15 shows a longitudinal section through a linear control device with incorporated path-measuring device in a partial representation;

FIG. 16 shows an enlarged representation of a detail "X;"

FIG. 17 shows an enlarged representation of a detail "Y;"

FIG. 18 shows a circuit representation;

DETAILED DESCRIPTION OF THE PREFERRED EMBODIMENTS

Figure 2:
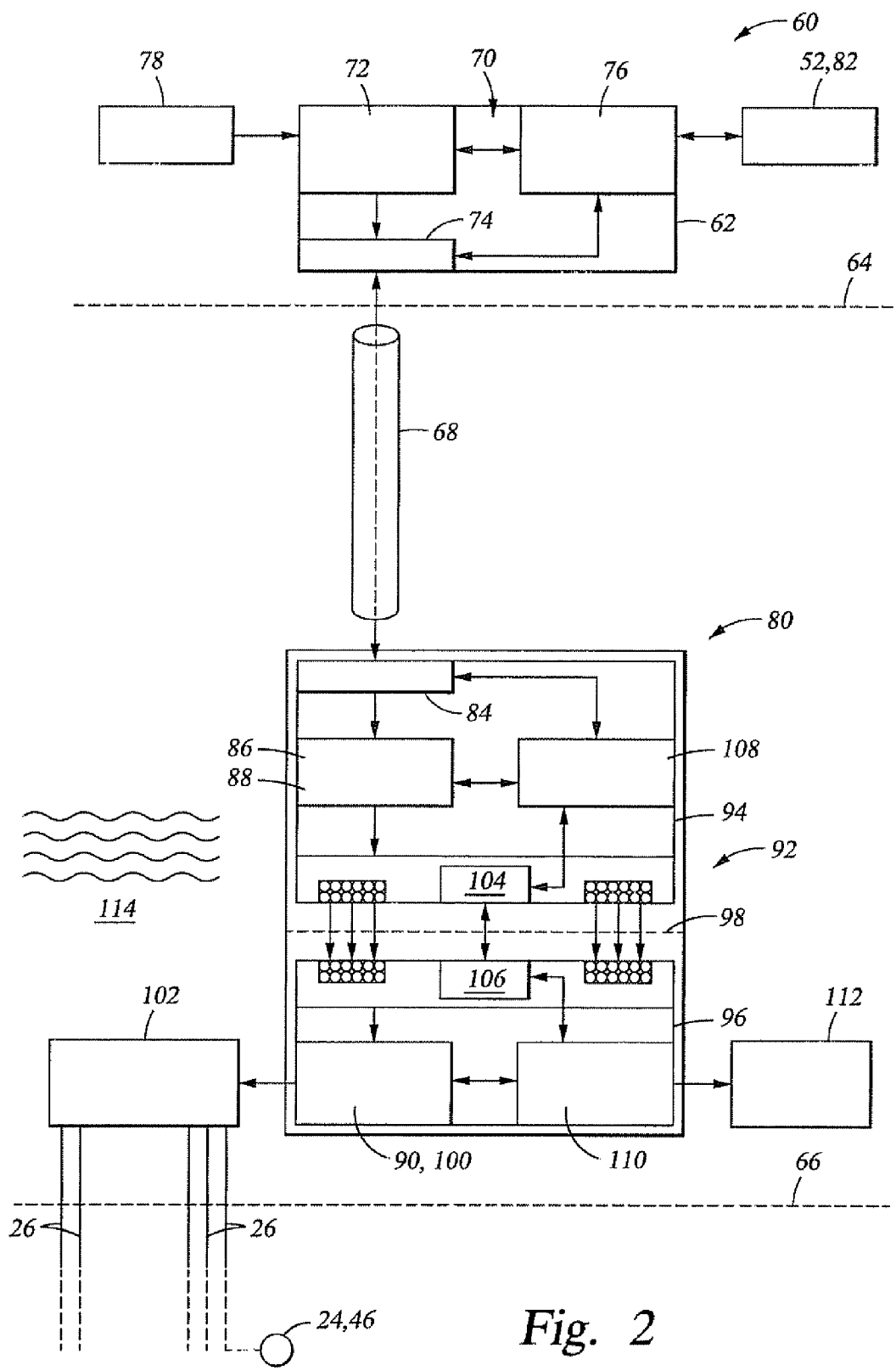
FIG. 2 is a block diagram of the control and supply system according to embodiments of the invention as in FIG. 1(c)

The present invention relates to methods, assemblies and systems for supplying power to and controlling remote electrical devices, particularly in the oil and gas industry. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. In particular, various embodiments of the present invention provide a number of different constructions and methods of operation of the electric control and supply system, each of which may be used to drill, complete, produce or workover an oil or gas well. The embodiments of the present invention also provide a plurality of methods for using the electric control and supply system of the present invention. It is to be fully recognized that the different teachings of the embodiments discussed below may be employed separately or in any suitable combination to produce desired results. The electrically actuated actuators described herein may be substituted for any hydraulically actuated actuators used in equipment for the exploration and production of oil and gas.

In the description, which follows, like parts are marked throughout the specification and drawings with the same reference numerals, respectively. The drawing figures are not necessarily to scale. Certain features of the invention may be shown in exaggerated in scale or in schematic form and some details of conventional elements may not be shown in the interest of clarity and conciseness.

One embodiment of an electric control and supply systems 20 may be constructed in accordance with U.S. patent application Ser. No. 10/415,510, filed Apr. 29, 2003 and entitled Control and Supply System, which claims the benefit of PCT application PCT/EP01/12547 filed Oct. 30, 2001, which claims the priority of DE 200 18 560.8 filed Oct. 30, 2000, all of which hereby incorporated herein in their entirety.

Referring initially to FIG. 1(c), the electric control and supply system 20 includes an electric supply and control assembly 30 at a first location 42, an umbilical 44 extending to a second remote location 50 and connecting the electric supply and control assembly 30 with a control and actuating assembly 40 associated with a remote assembly 25 at remote location 50. As distinguished from the prior art, the electric control and supply system 20 transmits direct voltage via umbilical 44 to control and actuating assembly 40 and not alternating voltage as in the prior art. The control and actuating device 40 is connected via connecting lines 26 to appropriate electrical devices 46 or electrical units 24 of remote assembly 25. An electrical unit 24 may be formed by a group of electrical devices 46, such as actuators, sensors, and control systems located at a subsea location such as hereinafter described.

The electric supply and control assembly 30 at the first location 42 includes at least one AC/DC converter 48, which converts a suitable alternating voltage from an alternating voltage source 32, into direct voltage. At the remote location 50 of the control and actuation device 40, a DC/DC or DC/AC converter 34 is provided analogously for the conversion of the direct voltage into direct or alternating voltage as required by the electrical devices 46 or electrical units 24. Preferably the converter 34 is a DC/DC converter to supply DC voltages to remote assembly 25.

A simple voltage source for system 20, which can also be used for other applications, can be utilized in that an alternating voltage source 32 is connected to the supply and control assembly 30 preferably for the supply of three-phase alternating voltage.

With the implementation of the converter 34 as a DC/DC converter, a conversion of the high direct voltage transmitted through the umbilical 44 occurs appropriately into the direct voltages required for the supply of the appropriate devices of remote assembly 25 at remote location 50. In this connection it must be noted that with a direct voltage supply from the first location 42 to the devices 46, 24 of remote assembly 25 at remote location 50, a suitable data interchange with these devices is simplified, because appropriate data signals can be modulated onto the direct voltage signal in a simple manner.

Due to the DC/DC or DC/AC converter 34 in the remote area 50 of the control and actuating device 40, a corresponding conversion of the direct voltage takes place into the required direct or alternating voltage values, such as for example, 240V or 300V with the appropriate frequency, for the electrical devices 46 such as motors, actuators and similar equipment of assembly 25.

The electric control and supply system 20 is able to transmit direct voltage via the long subsea umbilical 44, whereby the conversion from alternating voltage into direct voltage or vice versa from direct voltage into alternating voltage only takes place at the ends of the umbilical 44. With direct voltage and the corresponding direct current, only real power is transmitted via the umbilical 44 and no apparent power. This means that the power factor is 1. Due to the direct voltage transmission along the umbilical 44, even with high voltages, only slight losses are present in comparison to a transmission of alternating voltage with previously known prior art systems.

Furthermore, with the transmission of direct voltage, only small cross-sectional areas arise for a conductor in the umbilical 44 which may be only one tenth or less of the cross-sectional areas for the transmission of alternating voltage.

Since, according to the invention, a direct voltage is transmitted through the umbilical 44, correspondingly no transmission of high frequency voltages occurs, so that signals for data transmission can be modulated onto the direct voltage in a simple manner. The data transmission may take place through the multiplexer device 52 and through an appropriate cable coupler 54. The multiplexer device 52 may couple different data channels to the cable coupler 54. For example, each data channel may be associated with a different user-interfaced computer. Therefore, users of different computers are able transmit commands, data, etc., to the control and actuation assembly 40 via the multiplexer device 52. Demodulation of the data occurs appropriately at the remote area 50 of the control and actuation assembly 40.

The electric control and supply system 20 may be used, for example, in the drilling, completion, production and workover of oil and gas and may be used with land based wells or offshore wells. The electric control and supply system is particularly advantageous when a wellhead assembly is remote from the electric supply 32, such as for example when the wellhead assembly is many kilometers from the supply 32. The electric control and supply system 20 is still more particularly advantageous for use on an offshore well because of the more harsh environment caused by working subsea. Although the following embodiment is described with respect to an offshore well, by way of example, it should be appreciated that the electric control and supply system 20 of the present invention may also be used in a land based well.

Referring now to FIG. 2, there is shown another embodiment of an electric control and supply system 60 according to the invention for an offshore well. The electric control and supply system 60 includes an electric supply and control assembly 70 arranged on a platform or vessel 62 above the sea surface 64 and a control and actuation assembly 80 below the sea surface 64, such as at the sea floor 66. These are connected by a subsea umbilical 68. The electric supply and control assembly 70 is connected to an alternating voltage source 78 which preferably provides a three-phase alternating voltage.

The electric supply and control assembly 70 comprises at least one AC/DC converter 72 and a data modulation device 74. A surface control device 76 controls both the AC/DC converter 72 and the data modulation device 74. Furthermore, the electric supply and control assembly 70 is connected to a data transmission device 82 which can be positioned remotely from the electric supply and control assembly 70, but which is still part of the control and supply system 70. The control of the complete system 60 and its monitoring can occur through the data transmission device 82.

The arrows shown between the various units in system 60 indicate by the arrow direction, a transmission of voltage or data, whereby generally a bidirectional data transmission is possible.

The control and actuation assembly 80 is positioned below the sea surface 64 and, for example, on the sea floor 66. It comprises a data modulation device 84 for demodulation of the data transmitted through the subsea umbilical 68, but also for the modulation of appropriate data onto the voltage transmitted through the subsea umbilical 68 when such data is transmitted in the reverse direction from the control and actuation assembly 80 to the supply and control assembly 70.

Following the data modulation device 84, the control and actuation assembly 80 comprises a voltage converter 86. For example, the voltage converter 86 may comprise a DC/DC voltage converter or a DC/AC voltage converter. Using the voltage converter 86, the direct voltage transmitted through the subsea umbilical 68 is converted into a suitable direct or alternating voltage. In order to prevent the occurrence of high currents and, where applicable, of damage to the relevant electrical devices, especially on the sea floor, an over current control device 88 can be assigned to the voltage converter 86.

Following conversion of the direct voltage into a suitable voltage, an inductive transmission of the suitable voltage occurs to a voltage measurement device 90. The inductive transmission occurs through a transformer 92 consisting of two coil cores 94, 96. In at least some embodiments, the coil cores 94, 96 may be half-coil cores. An air gap 98 is formed between the coil cores 94, 96.

The coupling control devices 108, 110 are used for the interchange of data. For example, the coupling control device 110 may permit the voltage measurement device 90 to communicate with a subsea electronic module 112. The electronic module 112 may contain electronics for controlling the various items of equipment below sea level and in particular on the sea floor, such as valves, blow-out preventers, actuators and similar equipment. Generally, the appropriate electronics is contained redundantly in the electronic module.

The voltage measurement device 90 may measure the amplitude of the suitable voltage. In some embodiments, the voltage measurement device 90 may implement a voltage shunt regulator 100. The voltage shunt regulator 100 provides an appropriate static and/or dynamic stabilization of the suitable voltage. In order to pass data in the direction of the supply and control assembly 70 directly from the electrical devices 46, 24, the voltage measurement devices 90 and the voltage shunt regulator 100 may be bi-directional.

Due to the voltage shunt regulator 100, the system 80 can, for example, run under full voltage before the actuation of the electrical devices 46, 24, whereby the voltage shunt regulator 100 takes over the dynamic load regulation and then can reduce the voltage to appropriately low values. The stabilized suitable voltage may then be passed to a subsea voltage source 102 to which the various electrical devices 46 or units 24 are connected via electrical connecting lines 26.

By using the usual electrical connectors, it is also possible for all the connected parts to be recovered and to be retrieved from below sea level and, for example, to service them and reuse them later. According to embodiments of the invention, a non-fixed (i.e., releasable) connections between, for example, the subsea umbilical and subsea devices may be implemented.

The control and actuation assembly 80 operates utilizing direct voltage transmitted through subsea umbilical 68. The direct voltage is converted to either a lower DC voltage or to alternating voltage by an appropriate converter 86 at the subsea floor 66 only after the DC voltage has been transmitted through the long subsea umbilical 68. Above the surface 64 of the sea, a three-phase alternating voltage is converted by an AC/DC converter 72 to, for example, an output voltage in the range of from 3000 to 6000V. The voltage value depends on the power requirements of the system 60.

Then, the direct voltage is transmitted through coaxial conductors in the subsea umbilical 68. Additionally, data signals may be modulated onto the direct voltage via a suitable data modulation device 74, such as a modem or similar device. Since coaxial conductors exhibit optimum properties with regard to attenuation and electrical noise, high data transmission rates of at least 100 to 600 kBaud are possible. However, embodiments of the inventions are not limited to coaxial conductors and other existing or future conductors may be implemented.

At the sea floor 66 or below the surface 64 of the sea, a demodulation of the data signals occurs using a suitable data modulation device 84, again such as a modem. Then, conversion of the direct voltage occurs by converter 86 into, for example, a rectangular wave voltage of 300V with a frequency of 20 kHz. This voltage is transmitted to the various electrical devices 46, 24. Only slight filtering is required such that large electrolytic capacitors are not necessary. The transformer 92 converts the voltage of the converter 86 to the appropriate voltage values utilizing the two coil cores 104, 106, separated by the air gap 98. The coil cores 104, 106 are assigned to one another, separable from one another and may be formed mutually symmetrically. The transformer 92 provides the inductive coupling.

The transformer 92 can be realized such that the air gap 98 between the two cores 94, 96 is, for example, in the millimeter range (e.g., 1 to 5 millimeters). In addition, appropriate materials for the coil cores 94, 96 can be used which are not susceptible to attack by sea water 114, such as arrangements of corrosion-resistant transformer steel sheet or plastic encapsulated magnetic powder mixtures for the appropriate coil core materials.

In order to couple data to or from the control and actuation assembly 80, the data modulation device 84 of the control and actuation assembly 80 may be positioned before the voltage converter 86. Therefore, the data may be coupled to or from a direct voltage. In at least some embodiments, data may be transmitted from the measurement device 90 via the data modulation devices 106 and 104 and further via the further data modulation device 84 to the voltage supply and control device 70 for regulation of the voltage supply.

Using appropriate calculations for the required voltage values and powers, a conductor cross-sectional area of only approximately 2 mm$^2$ arises for, for example, a length of 50 km of subsea umbilical with the voltage control and supply system 60 according to the invention. This is a substantially lower cross-sectional area than with prior art systems.

In addition, high data transmission rates are possible due to the simple modulation and demodulation with respect to the direct voltage and the coaxial cable used. Through the devices used in the system 60 according to the invention, a stable supply voltage and high system reliability arise. With a simple embodiment without further control devices, the voltage measurement device 90 can be connected to the electrical devices 46, 24 for their supply.

A separate voltage stabilization, for example, using a Zener diode 240 arrangement is no longer necessary due to the voltage measurement device 90 with voltage shunt regulator 100 according to the invention, because the voltage provided is already statically and dynamically stabilized.

For the transmission of the direct voltage and also the electrical signals along the subsea umbilical 68, the umbilical can be advantageously formed from coaxial conductors. These exhibit optimum properties with regard to attenuation and immunity with regard to radiated noise and they enable a high data transmission rate of at least 100 to 600 k Baud. Furthermore, bidirectional transmission of data along the subsea umbilical 68 can also be carried out simply.

Due to the application according to the invention of direct voltage or direct current and the resulting possible small cross-sectional areas of the conductors in the subsea umbilical 68, there is also the possibility that for each electrical device 46, 24 a separate connecting conductor can be provided in the subsea umbilical 68. In this relationship it must be noted that an electrical unit 24, for example, a single motor or a single actuator can also be a suitable tree structure or group of electrical motors, actuators or other electrical devices.

A suitably simple coupling of data—also multi-channel—can be realized in that the system 60 exhibits a multiplexer device 52 with the data transmission device 82. The multiplexer device 52 may couple different data channels to the controller 76. For example, each data channel may be associated with a different user-interfaced computer. Therefore, users of different computers are able transmit commands, data, etc., to the control and actuation assembly 80 via the multiplexer device 52.

Figure 3:
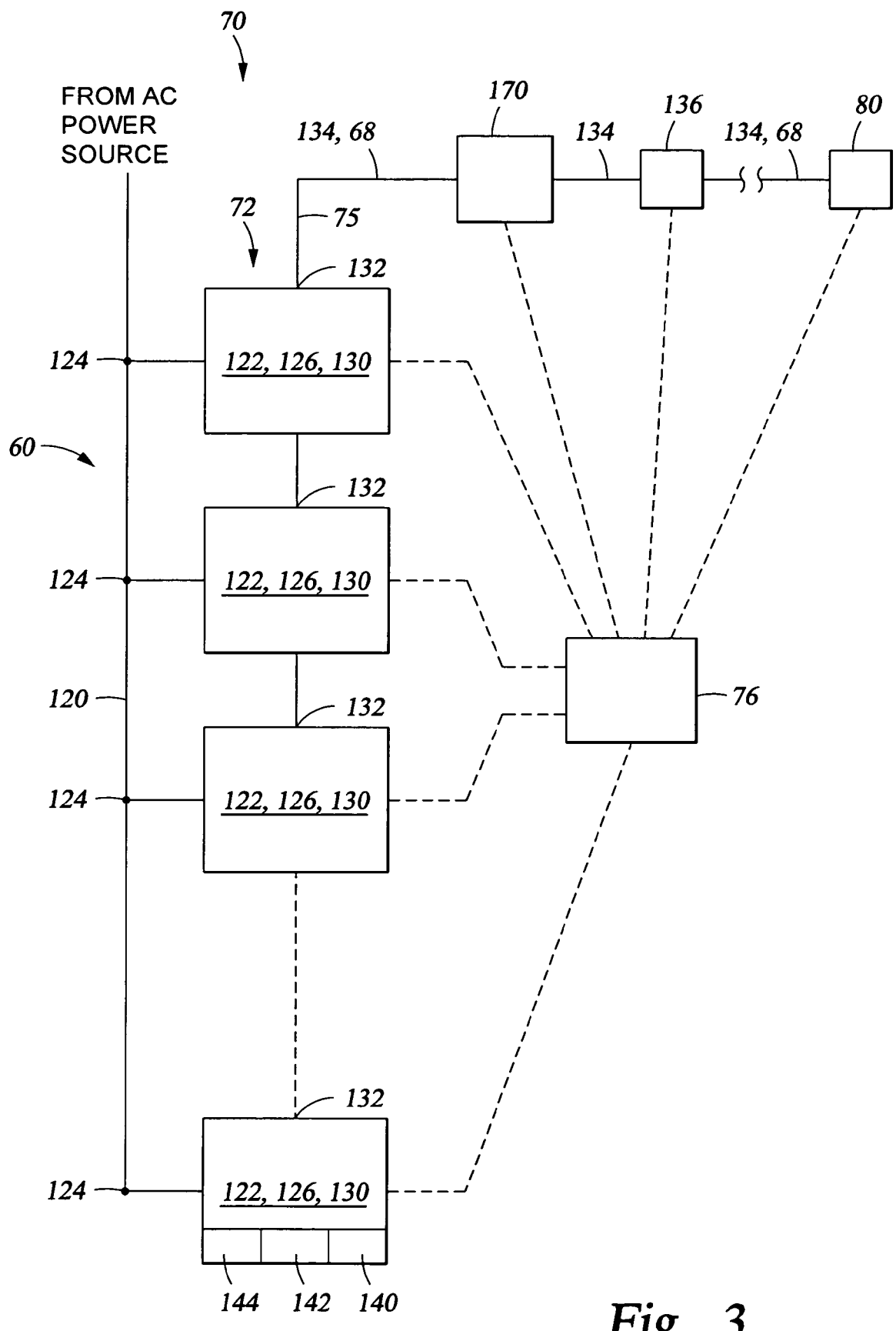
FIG. 3 shows a schematic representation of an embodiment of the supply and control assembly.

FIG. 3 shows a schematic circuit diagram of the electric supply and control assembly 70 disclosed in U.S. patent application Ser. No. 10/489,573 filed Mar. 12, 2004 and entitled Universal Power Supply System, which claims the benefit of PCT/EP02/10471 filed Sep. 18, 2002, which claims the priority of DE 201 15 471.9 filed Sep. 19, 2001; and U.S. patent application Ser. No. 10/489,583 filed Mar. 12, 2004 and entitled Universal Power Supply System, which claims the benefit of PCT/EP02/10468 filed Sep. 18, 2002, which claims the priority of DE 201 15 473.0 filed Sep. 19, 2001; all of which are hereby incorporated herein by reference in their entirety. Electric supply and control assembly 70 receives AC power from AC power source 78 (see FIG. 2). The AC power may comprise an alternating 380 V three-phase power source. As shown, the electric supply and control assembly 70 may comprise an AC/DC converter 72 having a plurality of AC/DC converter components 122 which are connected in parallel to the line 120 via respective input terminals 124.

Due to this mode of connection of the AC/DC converter components 122, each of these components 122 only serves to generate a certain percentage of the voltage on the output side of the AC/DC converter 72. If the DC voltage which is to be produced on the output side 75 amounts e.g. to 6000V, the DC voltage can be produced by, e.g., 20 converter components 122 each having an output voltage of 300V. It is also possible to provide 30, 40 or 50 converter components 122, each of these converter components 122 providing a respective percentage of the DC voltage required on the output side 75.

In the simplest case, the converter components 122 all have the same type of structural design so that, in the case of n converter components 122, each converter component 122 produces the nth percentage of the necessary output voltage from the AC voltage applied to the input side.

Due to the use of a plurality or multitude of AC/DC converting units 122, each individual converting unit 122 is only responsible for providing a specific amount of the voltage needed on the output side. If all of the converting units 122 are of a similar construction, each individual converting unit provides, for instance, only the nth part of the necessary output voltage.

The AC/DC converter components 122 may comprise switched mode power supplies 126 and, in particular, flyback converters 130 clocked on the primary side and acting as a switched mode power supply 126.

On the output side 75, the various converter components 122 are serially connected to one another via respective output terminals 132 and they are connected to umbilical 68 and connections 134. Via the connections 134, the control and actuation assembly 80 at a remote location has electric power supplied thereto. Between the AC/DC converter 72 of the supply and control assembly 70 and the control and actuation assembly 80, a means for coupling data signals in/out 136 is additionally connected to the umbilical 68 and connections 134. The means for coupling data signals in/out 136 is used for transmitting respective data signals or for coupling out data signals that have been received from the control and actuation assembly 80 or from units associated therewith. The transmission of the data signals is also effected via the connections 134 and umbilical 68.

In FIG. 3, only one control and actuation assembly 80 is shown. Normally, a plurality of control and actuation assemblies 80 have supplied thereto electric power and also data via the connections 134 and umbilical 68 from the supply and control assembly 70 according to the present invention. Such control and actuating assemblies 80 include electric devices 46 such as actuators located at sites, which are remote and/or not easily accessible. The actuators control e.g. units of fluid lines, such as valves, shut-off devices, restrictors, pumps and the like, so that the flow of fluid into and along the fluid line is controlled and shut off in emergency cases, such as leakage, line fractures or the like, and so that also parameters of the fluid, of the fluid flow or of the respective units are monitored and controlled. The fluid is normally fed into the lines under high pressure from a respective fluid source and conducted along such lines e.g. from the bottom to the surface of the sea. Since such a fluid normally contains aggressive or environmentally noxious components, a power supply and remote control which can be effected with the aid of the power supply system according to the present invention is of great advantage.

The remote control of the respective actuators can in this connection be carried out via the communication connection established with the aid of the means for coupling data signals in/out 136.

All the units of the supply and control assembly 70, including, if desired, the control and actuation assembly 80, are adapted to be controlled and/or regulated by controller 76. In addition, a relevant monitoring of parameters of the various units can be carried out. In FIG. 3, the controller 76 is connected to the various units via connections represented by broken lines, so as to control, regulate and/or monitor said units.

The switched mode power supplies 126 and flyback converters 130, respectively, can be implemented as integrated circuits. These integrated circuits directly comprise respective further units, such as power factor control means 140, under voltage detection means 142 or over voltage monitoring means 144. In order to simplify the illustration, these additional units are shown in FIG. 3 only in the case of one AC/DC converting component 122; normally, they are, however, component parts of all of the AC/DC converting components 122.

FIG. 4 shows a simplified embodiment for a flyback converter 130 acting as a switched mode power supply 126. The flyback converter 130 comprises a transformer 92 having a primary winding 104 connected to the input terminal 124 and a secondary winding 106 connected to the output terminal 132. An effective magnetic coupling exists between these two windings, 104, 106. The transformer 92 acts as a magnetic energy storage. When a switching means 150 in the form of a power transistor 152 is closed, the current will increase in the primary winding 104 and energy will be stored in the transformer 92. When the switching means 150 is opened, the stored energy on the side of the secondary winding 106 will be supplied to a smoothing capacitor 154 via a diode 156. The stored energy is thereby output via the output terminal 132. In at least some embodiments, the switching means 150 is designed as a power MOSFET 152. Furthermore, it is possible to design the switching means 150 as a BIMOSFET or as a power thyristor.

The respective flyback converters 130 have their output terminals 132 serially connected to the connection 134, cf. FIG. 1.

For activating or clocking the switching means 150, i.e. the power transistor 152, a pulse width modulation means 160 is provided in the flyback converter 130. The pulse width modulation means 160 produces a pulse width-modulated signal whose clock cycle ratio is controlled in accordance with the measured actual value of the output voltage. For this purpose, the actual value measured at the output of the flyback converter 130 is subtracted from the respective desired value and this difference is supplied, via a control amplifier of the flyback converter 130, to the pulse width modulation means 160. Here, the output voltage of the control amplifier of the flyback converter 130 is compared with a sawtooth voltage whose frequency determines the clock frequency of the flyback converter 130. Depending on the result of this comparison, the switching means 150 is switched on or off and the desired output voltage is adjusted in this way. The maximum output voltage is normally defined by the breakdown voltage of the switching means 150 and the corresponding power MOSFET 152, respectively. A pulse width modulation means 160, in particular a pulse width modulation means 160 which is adapted to be controlled or regulated, can be provided for activating the switching means 150 of the flyback converter 130 or of the switched mode mains power supply 126 in a suitable manner.

This pulse width modulation means 160 is capable of producing a series of pulses, which are adapted to be varied with respect to their width and/or height and/or frequency. A frequently used pulse modulation means is a pulse width modulation means 160. This pulse width modulation means 160 produces a pulse width-modulated signal whose clock cycle ratio can be controlled in accordance with a measured actual value of the output voltage. The measured actual value of the output voltage can, e.g. be subtracted from the desired value and this difference can be supplied via a control amplifier of the flyback converter 130 to the pulse width modulation means 160.

Here, the output voltage of the control amplifier of the flyback converter 130 can be compared with a sawtooth voltage whose frequency determines the switching frequency or clocking of the switched mode mains power supply 126. Depending on the result of this comparison, the switching transistor 150 is then switched on or off, whereby a desired output voltage can be adjusted.

The clock frequency of the switching means 150 can be in the kilohertz range and in particular in the hundred-kilohertz range so as to permit a sufficiently fast clocking of the switching means 150 and, in this connection, a comparatively low dissipation power of the flyback converter 130. For example, flyback converters 130 are known, which are clocked in the range of from 20 kHz to 200 kHz. Lower and higher clock frequencies are, however, possible as well.

In order to avoid, especially in the case of high power values, the necessity of providing separate cooling means for the converter components 122, such converter components 122 can be arranged in spaced relationship with one another. The spatial distance is, however, so small that, normally, it corresponds only to the dimensions of one converter component.

In connection with the converter components 122 and especially the flyback converters 130 used as such components, attention should also be paid to the fact that each of each of such converter components 122 should be adapted to be controlled or regulated separately with respect to its output voltage. The inputs of the converter components 122 are arranged in parallel in each converter component so that the voltage supply and, consequently, current and power are fully separated. It follows that, irrespectively of the output voltage, also the total power of the system can be adapted according to requirements. A completely free selection of the power and of the output voltage is therefore possible. Due to the use of a plurality of converter components 122, an extremely exact and precise control of the output voltage as well as of the power are additionally obtained, since each converter component controls independently of the other components only its own range If one of the converter components 122 fails to operate, the power supply is still guaranteed (redundancy), since the other converter components 122 are activated in a suitable manner so that the power failure of the converter component that failed to operate will be compensated for on the output side. The respective range within which each of the still operative converter components 122 has to be adjusted is extremely small, since a comparatively low increase in the voltage on the output side of the plurality of converter components 122 will already lead to a substantially higher increase in the total output voltage.

In connection with each converter component and especially in connection with the flyback converter 130, it is possible to dispense with additional components, i.e. to implement such converter components 122 e.g. as integrated circuits comprising in addition to the actual flyback converter 130 other elements, such as a power factor control means, an under voltage detection means, an over voltage monitoring means, a so-called "soft start" and the like.

At least the AC source and/or the AC/DC converter and/or the means for coupling data signals in/out 136 may have associated therewith the controller 76 so that the various units of the power supply system according to the present invention can be monitored, controlled or, if necessary, regulated more effectively. This controller 76 can e.g. also detect whether one of the converter components 122 implemented as a flyback converter 130 has failed. If such failure is detected, the other flyback converters 130 can be activated such that they compensate for the failure of such one flyback converter 130 in that a slightly higher output voltage is e.g. delivered by each of the other flyback converters 130.

The controller 76 can also control the pulse width modulation means in this connection.

The controller 76 can not only be used for monitoring purposes alone, but it is also possible to use it for establishing a communication connection between the respective units of the power supply system. This will be of advantage especially in cases in which the various units are arranged at comparatively large distances from one another and/or at inaccessible sites. With the aid of this communication connection, physical examination or maintenance can be limited to rare cases or to cases where the unit in question has to be replaced.

To monitor, control and optionally regulate all devices of the energy supply system 60 and possibly also the electrical devices via the umbilical connection 68, a controller 76 may be assigned at least to the AC voltage source and/or the AC/DC converting means and/or the data signal coupling/decoupling means and optionally also to the electrical device. Such a controller 76 yields an intelligent supply system, which controls and/or regulates a great number of parameters. An example of the activity of the controller 76 may be seen in the measure that said controller 76 controls the flyback converters 130 not only with respect to their output voltage, but also monitors them with respect to their function. For instance in case of failure of one flyback converter 130, a message may be sent by the controller 76 to a corresponding monitoring means that one and possibly also which one of the flyback converters 130 has failed or is impaired in its function. At the same time, the controller 76 can control the remaining flyback converters 130 such that they compensate for the voltage failure. A corresponding message may also be sent. After failure of a number of flyback converters 130, the system according to the invention may also send a corresponding repair request through the controller 76, whereby full operability of the energy supply system would be guaranteed up to the time of the repair.

The controller 76 may also detect further possible defects in the energy supply system and optionally also in the electrical devices supplied by the system. For instance, electrical devices may optionally be switched on and off via the data signal connection, controlled in their operation or influenced in another way.

To permit a direct querying of different means and also of the electrical device via the controller 76 at the same time, a communication connection with the respective means of the energy supply system and optionally with the electrical device may be established via the controller 76.

In contrast to an AC/DC converter for producing e.g. 6000V, such converter components 122 are easy to handle and easy to maintain. The dissipation heat per converter component is here normally so low that separate cooling means can be dispensed with. If the converter components 122 are arranged comparatively close to one another, simple cooling means conducting, e.g., cooling air over the converter components 122 will suffice even in the case of high power. In comparison with known converters, the costs for cooling the AC/DC converter 72 are reduced substantially.

If one of the converter components 122 fails to operate, the output voltage will only be reduced by such nth part so that also the remaining n−1 converter components 122 will still provide a sufficiently high voltage for the electric device. Only if a plurality of converter components 122 fails to operate, may it prove to be necessary to replace such converter components 122, at least partially. In any case, if one of the plurality of converter components 122 fails to operate, it is still guaranteed that the voltage supplied to the electric device will still be sufficiently high to permit operation thereof (providing redundancy).

A filter means 170 can be arranged between the AC/DC converter and the electric device so that, if necessary, the DC voltage generated by the AC/DC converter can be smoothed still further.

In the case of certain electric devices, it may prove to be advantageous when also a signal connection is provided in addition to a voltage supply. In order to avoid the necessity of providing an additional cable connection to the electric device for this purpose, a means for coupling data signals in/out 136 can be connected to the umbilical connection, such means for coupling data signals in/out 136 being especially located between the filter means 170 and the electric device. This means for coupling data signals in/out 136 can, on the one hand, be used for coupling respective data signals into the data connection for, e.g., controlling the electric device or for supplying information thereto. In the opposite direction, data received from the electric device can be coupled out from the umbilical connection and used, e.g., for monitoring the electric device by means of suitable units, such as computers and the like.

In this connection, it must betaken into account that data transmission on the basis of the output-side DC voltage can be effected with less interference and with a higher velocity than in cases in which the electric device is supplied with an AC voltage.

Interference frequencies on the umbilical connection are also approximately within the range of the clock frequency, which results in already relatively high interference frequencies when 100 kHz are used. Such high interference frequencies do normally not affect the components of the energy supply system or the electrical device.

If the interference frequencies are to be shifted into an even higher frequency range, at least some of the clocked switch mode power supplies may be phase-shifted relative to one another in their clock frequencies. It is true that a natural frequency is maintained for each of the individual flyback converters 130, i.e., e.g. a clock frequency of 100 kHz. With this frequency direct current is fed accordingly on the secondary side into the cable. If said clocked feed is shifted by the phase shift of the clocking of individual converting units (e.g., by only one nano second fraction each at the time of feed) one will obtain a cutoff frequency of the system (i.e., the cutoff frequency of the interference on the secondary side) of 100 kHz×n, n being the number of the flyback converters 130 that are phase-shifted with respect to their clock frequency. For instance, if n equals 30, a system cutoff frequency of 3 MHz is obtained. At the same time, the magnitude of the interference voltage output is reduced to 1/n of the interference voltage of an individual unit.

Such a shift in the cutoff frequency of the system is in particular of considerable advantage when a data transmission takes place via the cable connection simultaneously with the energy supply. To this end a data signal coupling/decoupling means may be provided according to the invention. Such means serves both to feed data which are e.g. to be transmitted from the electrical devices, and to decouple data received by the electrical devices or other units of the energy supply system.

Since a corresponding data signal transmission normally takes place within the range of a few 10 kHz, possible residual interferences by the system cutoff frequency are far away from any data transmission bandwidth. Troublesome filtering, e.g. by filter electrolyte capacitors, are not needed for smoothing the output voltage, and a safe data transmission that is as fast as possible is obtained on an almost undisturbed umbilical connection.

To make data transmission even safer, a simple filter means 170 may be arranged between AC/DC converting unit and electrical device. However, this means is only used according to the invention for filtering remaining interference within the data transmission, i.e. up to a few 10 kHz, e.g. 50 kHz.

Subsequent to the AC/DC converter 72, a filter means 170 is disposed in the umbilical 68. The filter means 170 filters interference above the frequency range of a few tens of kilohertz, which interference might disturb a data transmission via the umbilical 68.

The data signal coupling/decoupling means 136 is arranged between the filter means 170 and the at least one control and actuation assembly 80 supplied by the supply and control assembly 70 with DC voltage and high power. Corresponding data signals are coupled via such means 136 into the umbilical 68, or data signals transmitted from the control and actuation assembly 80 via the umbilical 68 are decoupled by such means 136. An interference-free data transmission at a high speed (tens of kilohertz) is thereby made possible via the umbilical 68. It should here be noted that the cutoff frequency of the system 20 may be shifted by a shift of the clocking frequencies of the individual converter components 122 into the range of MHz, so that said cutoff frequency is far away from any data transmission bandwidth and a reliable data transmission at a high speed is thereby possible.

The control and actuation assembly 80 may e.g. include an actuator, and it is self-evident that several control and actuating assemblies 80 can be supplied accordingly via the umbilical 68 with both power and data. Such an actuator serves e.g. to control means along a fluid line. The corresponding means and actuators, respectively, for the actuation thereof are normally arranged at remote places, which are difficult to reach, or are impassable and confined. The fluid can flow at a high pressure into or through the fluid line, so that e.g. one means is an emergency shut-off unit, which in case of leakage in the fluid line prevents possibly aggressive or environmentally harmful fluid from exiting into the environment. Further means for actuation by the actuators are valves, throttles, pumps, or the like. As a rule, the actuators require much power because the fluid flows at a high pressure and possibly also with a large quantity through the fluid line or into the same. It is also possible to provide a corresponding shut-off device already during inflow, i.e. substantially at the source of the fluid, to prevent an uncontrolled outflow of the fluid into the environment.

Of course, it is here of advantage when corresponding parameters of the actuators and of the means controlled by them, e.g. positions of the valve, shut-off device, action of the pumps, or the like, can be queried and monitored through the communication connection.

The control of the communication connection and the monitoring of all means take place via the controller 76 which is connected to all of the corresponding means and also to the control and actuation assembly 80.

Using the controller 76, it is possible to precisely regulate the power for control and actuation assembly 80 with the associated voltage and to carry out the regulating operation with a multitude of flyback converters 130. Moreover, the controller 76 may control the phase shift in the clocking of each flyback converter 130 to yield a very high cutoff frequency of the system 20, which permits an interference-free data transmission via the corresponding connection 134 also over long umbilical distances and even in the case of a thin cross-section of the umbilical at a high speed.

In case of failure of one or several flyback converters 130, the controller 76 may operate to adjust the output voltage provided by the remaining flyback converters 130 so that an adequate voltage and power supply on the output side of the AC/DC converter 72 is still provided for the corresponding control and actuation assembly 80.

In accordance with an advantageous embodiment, the maximum output voltage of each switched mode mains power supply is chosen such that it does not exceed a limit value below the breakdown voltage of a respective component of the switched mode mains power supply, especially of the switching means 150, so that a safety distance from the breakdown voltage is kept.

As has already been mentioned hereinbefore, the flyback converters 130 are clocked on the primary side. In this connection, it may of advantage when the flyback converter 130 provides a plurality of galvanically separated, controlled output voltages.

Such an adjustment of the output voltage is of advantage, in particular, in case of failure of one or several converting units. For instance, if among the above-indicated number of 30 converting units one fails, the output voltage is only reduced by 200 V.

The system as such remains operative and can supply the electrical device with enough power. Moreover, due to the adjustability of the output voltage of each converting unit, it is still possible to readjust the missing 200V, advantageously, via all of the remaining converting units. Since each of the remaining converting units must only produce a minimum amount of the missing 200V, the output voltage is each time increased by a small amount only. The converting units may here be designed such that, for instance during normal operation while all of the converting units are working, the units only output—as the output voltage—a fraction of the maximum output voltage that can be produced by them. As a result, the readjustment range is relatively large, so that several converting units may also fail without collapse of the system.

Figure 5:
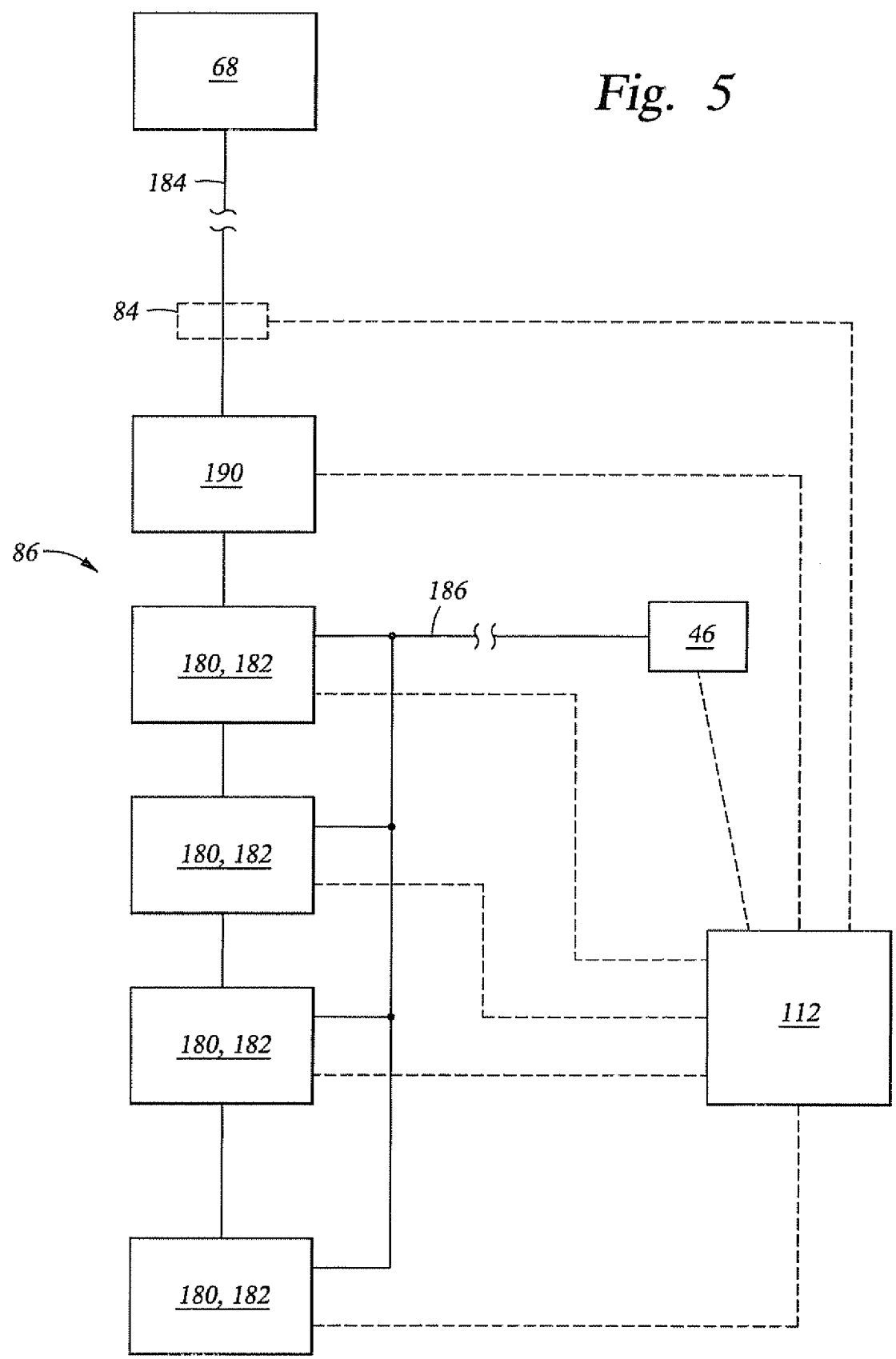
FIG. 5 is a block diagram of an embodiment of the DC voltage converting device according to embodiments of the invention.

Referring now to FIG. 5, the converting device 86 of control and actuation assembly 80 (see FIG. 2) preferably is a DC converting device having a plurality of DC converting units 180 in the form of switch mode power supplies 182. Converting device 86 may be constructed in accordance with U.S. patent application Ser. No. 10/489,453 filed Mar. 12, 2004 and entitled DC Voltage Converting Device, which claims the benefit of PCT/EP01/12547 filed Oct. 30, 2001, which claims the priority of DE 200 18 560.8 filed Oct. 30, 2000, which are all hereby incorporated herein by reference in their entirety. The switch mode power supplies 182 are wired one after the other on the input side and connected to the output side of the supply and control assembly 70 via connection 184 with umbilical 68. The supply and control assembly 70, providing DC voltage, is located at a remote place from the control and actuation assembly 80; the length of the umbilical 68 may here be several kilometers, for instance 50, 60 or more kilometers.

A filter means 190 is disposed upstream of the DC voltage converting units 180. Filter means 190 filters, in particular, a frequency range needed for a communication connection to the DC voltage source of the supply and control assembly 70. The filtering operation may e.g. be carried out within a frequency range of up to 50 kHz.

The DC voltage converting units 180 and the corresponding switch mode power supplies 182, respectively, are wired in parallel with one another on their output side and connected accordingly with a connection 186. The connection 186 leads to at least one electrical device 46 such as an actuator.

The actuator 46 may function with a means for controlling a fluid flow into a fluid line or within the fluid line. Such means may comprise, e.g., valves, shut-off devices for emergency cases, such as leakage, pipe breakage, or the like, throttles, pumps, etc. These means and the actuators 46 assigned to them are possibly disposed in rough terrain that is difficult to reach. The means and actuators 46 may also be arranged underwater. The fluid can enter into the ducts at a high pressure and be guided there along. Moreover, the fluid may be aggressive or pollute the environment, so that a corresponding monitoring and control of the fluid flow is of utmost importance.

The actuators 46, as well as the DC converting device 86, may be arranged below sea level. The umbilical connection 184 can extend up to the water surface to the supply and control assembly 70. It is also possible that the actuators 46 are arranged on the surface of the earth at a place that is difficult to reach, and are controlled and monitored accordingly from a remote place. The coupling control devices 108, 110 shown in FIG. 2 are used for the interchange of data. As shown in FIG. 2, subsea electronic module or controller 112 may contain electronics for controlling the various items of equipment below sea level and in particular on the sea floor, such as valves, blow-out preventers, actuators and similar equipment. Generally, the appropriate electronics is contained redundantly in the controller 112. The controller 112 may be assigned at least to the DC voltage converting device 86 for monitoring, controlling and regulating the corresponding DC converting units 180. This controller can also monitor, control or regulate other components of the control and actuation assembly 80.

For the transmission of corresponding data to the supply and control assembly 70 and means further assigned to such source, a data coupling/decoupling means 84 may be provided. This means is arranged upstream the filter means 190 between filter means 190 and the supply and control assembly 70. Corresponding data signals can be coupled and decoupled, for instance, by the controller 110 into and out of the connection 184 via the data coupling/decoupling means 84. A communication connection is thereby established between the supply and control assembly 70 and the control and actuation assembly 80. The communication connection is bidirectional, so that data can be exchanged in both directions via the connection 184.

Due to the use of the plurality of converting units 180 and the configuration of the units 180, each unit 180 converts only part of the high DC voltage supplied by the supply and control assembly 70. For instance, if a DC voltage of 6000V is provided from the supply and control assembly 70 as an input to the control and actuation assembly 80, each of the converting units 180 will only convert the nth fraction of the input voltage if these are of an identical construction and on condition that there is a number of n converting units 180. For instance, if n is 30, each converting unit 180 would only convert 200V. The breakdown strength of the corresponding components of the converting units is normally considerably higher than 200V, so that there is no risk in this respect.

On the output side, depending on the design of the converting units 180 and with a corresponding wiring to the cable connection 186, it is e.g. possible to provide a DC voltage value of 300V for the actuator device 46.

Of course, it is possible to use different numbers of converting units 180. It is also possible that the converting units 180 are of no similar construction, but convert, e.g., different amounts of the input voltage per converting unit into a corresponding output voltage. However, for reasons of maintenance and repair, it is of greater advantage to give all converting units 180 an identical design.

Moreover, it is ensured through the number of the converting units 180 that, when one, two, three or even more converting units 180 fail, a complete failure of the voltage supply to the electrical device need not be feared, because the converting units 180 that are still operative can be clocked to receive more voltage on the input side and convert the input voltage into the output voltage required.

It is therefore the object of the present invention to provide a DC converter 86 that is structurally simple and is able to reliably convert high DC voltages even in the case of high power, in such a way that the reliability of the converter 86 is increased and cooling systems entailing high costs can be dispensed with.

As shown in FIG. 5, the DC converter 86 may comprise a plurality of DC converter components 180, each of said DC converter components 180 being, on the input side, serially connected to the control and supply assembly 70 and, on the output side, connected in parallel to the cable connection 186 so as to provide the converted DC voltage for the electric device 46. In at least some embodiments, the converting units 180 may be spaced apart from one another such that they do not mutually affect one another in their heat development, and each converting unit 180 can thus be cooled separately.

Depending on the number and design of the converting units, DC voltages of about 1 kV to 10 kV and, in particular, 3 kV to 8 kV may be present on the input side. It should once again be pointed out that even higher input voltages with a correspondingly high power can be converted if the number of the converting units 180 or their corresponding construction is matched accordingly. Care should be taken such that the breakdown strength of the components of every converting unit 180 is at least so high that the amount of the input voltage to be converted by the converting unit 180 is smaller than the breakdown strength.

To implement highly efficient converting units 180 that, consequently, only generate a small amount of heat and thus ensure a high reliability and, economically speaking, are excellent in production and operation at the same time, a corresponding DC voltage converting unit 180 may be designed as a clocked switch mode power supply 182. In comparison with, e.g., linear controlled power supplies, a clocked switch mode power supply 182 offers advantage such as smaller size, less noise development, reduced smoothing demands and an increased input voltage range.

Various realizations of such a clocked switched mode power supply 182 are known. The first subdivision that can be carried out is a division into switched mode mains power supplies 182 clocked on the secondary side and those clocked on the primary side. In both said fundamental versions, it is possible that a current flows constantly into a storage capacitor of the switched mode mains power supply 182 or that a current is only discharged at certain time instances so that the converter in question is referred to as a feed forward converter or a flyback converter 130. In order to obtain a compact and reliable component, the switched mode mains power supply 182 can, for example, be implemented as a flyback converter 130. This flyback converter 130 can preferably be clocked on the primary side so as to obtain a galvanic separation between the input and output sides, and it can be a single-phase or a push-pull converter. Single-phase converters are, in this context, advantageous insofar as they normally require only one power switch as a clock switching means 150.

This power switch 150 can be implemented e.g. as a power MOSFET or as a BIMOSFET. In addition, also thyristors may be used as clocked switching means 150 especially when high power values in the kilowatt range are involved.

The above-mentioned switched mode mains power supplies 182 have, especially in the case of higher power values, a plurality of advantages, such as a lower dissipation power, a lower weight, a smaller volume, no generation of noise, less smoothing outlay and a larger input voltage range. Switched mode mains power supplies 182 and especially also flyback converters 130 are used in a great variety of fields of application, such as microwave ovens, computers, electronic adapting equipment for fluorescent lamps, industrial and entertainment electronics, screens, cardiac defibrillators and the like. Flyback converters 130 are also excellently suitable for use in fields of application where a high power is required on the output side.

The switch mode power supplies 182 can be subdivided into primarily and secondary clocked switch mode power supplies. The secondary clocked switch mode power supplies include, for instance, step-down and step-up converters. However, in order to realize an electrical isolation between input and output, primarily clocked switch mode power supplies and, in particular, flyback converters 130 may be used according to the invention as converting units. Such flyback converters 130 are also called isolating transformers.

Figure 6:
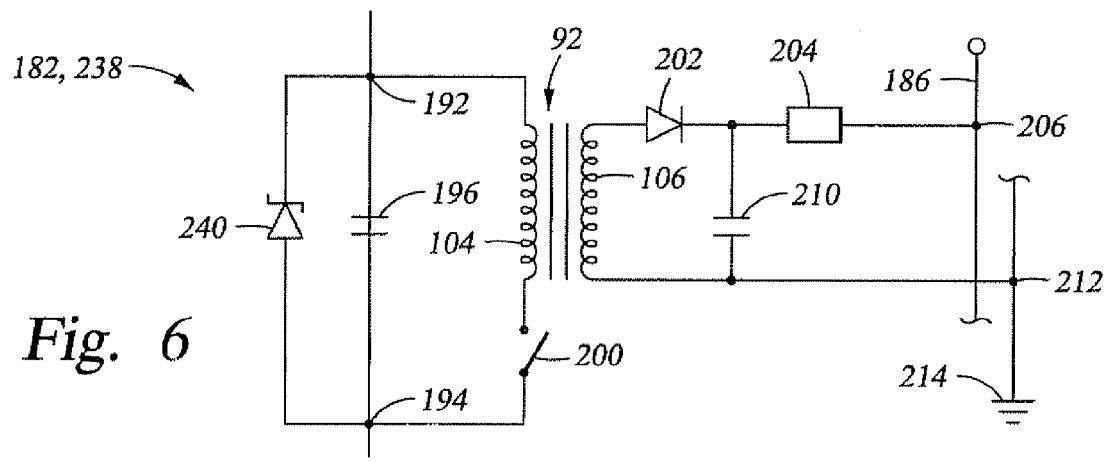
FIG. 6 shows a schematic circuit diagram of a push-pull converter for use as a switched mode mains power supply in FIG. 5.
Figure 7:
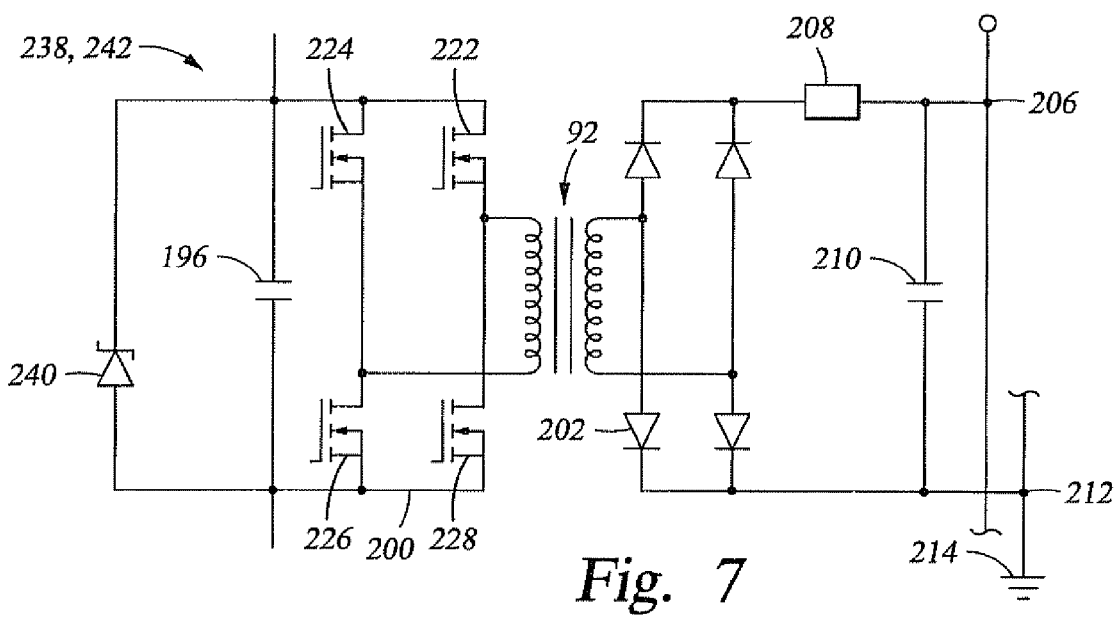
FIG. 7 shows a circuit for a full-bridge push-pull converter.
Figure 8:
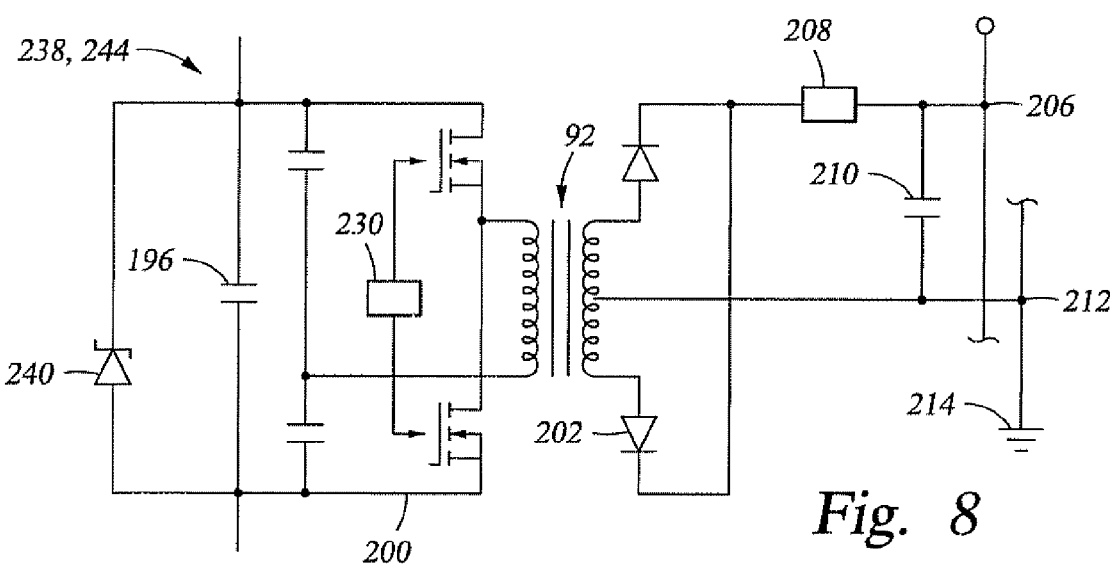
FIG. 8 shows a circuit for a half-bridge push-pull converter.

FIGS. 6-8 are described in U.S. patent application Ser. No. 10/489,584 filed Mar. 12, 2004 and entitled DC Converter, which claims the benefit of PCT/EP02/10469 filed Sep. 18, 2002, which claims the priority of DE 201 15 474.9 filed Sep. 19, 2001, all of which are hereby incorporated herein by reference in their entirety.

FIG. 6 shows a simplified embodiment for a push-pull converter 238 used as a switched mode mains power supply 182. This push-pull converter 238 has its input terminals 192 and 194 connected in series with the other push-pull converters 238 or switched mode mains power supplies 182 according to FIG. 5. On the input side, the push-pull converter 238 may comprise a Zener diode 240 and an input capacitor 196. These two components are connected parallel to each other and to a primary winding 104 of a transformer 92.

The Zener diode 240 can be composed, in a manner known per se, of a number of transistors and load resistors.

The primary winding 104 of the transformer 92 has associated therewith a switching means 200.

This switching means 200 is shown as a simple switch in FIG. 6. In actual fact, such switching means 200 is, however, realized by one or more switching transistors 222, 224, 226 and 228, cf. e.g. FIGS. 7 and 8; such switching transistors may be power MOSFETs, BIMOSFETs or thyristors.

The primary winding 104 is magnetically coupled to a secondary winding 106 of the transformer 92.

The secondary winding 106 is connected to output terminals 206 and 212 of the push-pull converter 238. A diode 202 and a load 204 are serially connected between the secondary winding 106 and the output terminal 206. The load 204 may e.g. be an inductor 208 according to FIGS. 7 and 8.

The output terminals 206 of all push-pull converters 238 or switched mode mains power supplies 182 according to FIG. 5 are connected parallel to one another and to the connection

186. The other output terminals 212 are also connected parallel to one another and to ground 214.

On the output side of the push-pull converter 238, a smoothing capacitor 210 is connected parallel to the secondary winding of the transformer 198.

In FIGS. 7 and 8 a respective push-pull converter 238 according to FIG. 6 is shown in detail, in one case as a full-bridge push-pull converter 242 and in another case as a half-bridge push pull converter 244, both push-pull converters 242 and 244 being shown with the respective circuit. Such circuits for full-bridge and half-bridge push-pull converters 242, 244 are known per se. The circuits shown differ from known circuits with regard to the respective connection modes of the push-pull converters on the input side and on the output side, i.e. with regard to the fact that respective terminals are serially connected on the input side and connected in parallel on the output side.

Furthermore, the Zener diode 240 on the input side of each push-pull converter 238 or 242, 244 is connected parallel to the primary winding of the transformer 92.

This Zener diode 240 serves as an input-side load of the various push-pull converters 238 for powering up the system with regard to voltage and energy already prior to connecting or additionally connecting a respective electric device 46, 24. As long as the electric devices 46, 24 have not yet been connected or additionally connected, the respective energy in the system is consumed and converted into heat by the Zener diode 240. When the electric devices 46, 24 are then additionally connected, energy distribution takes place in each of the push-pull converters 238, and it is only a small percentage of the energy that is still converted into heat by the Zener diode 240.

Due to the large number of Zener diodes 240 and the fact that they are arranged in spaced relationship with one another, the electric energy converted into heat in said Zener diodes 240 will not result in overheating of the DC converter 86, but, depending on the location where the converter is arranged, it can be discharged directly into air or water as waste heat. Complicated and expensive cooling systems can be dispensed with.

When the electric devices 46 of remote assembly 25 no longer need electric energy, they will be switched off, i.e. disconnected from the system. Subsequently, the whole energy is, in situ, again converted into heat by the Zener diode 240. If the electric device 46 in question or another electric device 46 is then not connected or additionally connected once more, the system as a whole can be run down to a lower voltage, such as 3000V or even less than that. The reduced voltage is then still required for the function of the controller and of other units of the DC converter 86 which are always in operation.

In the full-bridge push-pull converter 242 according to FIG. 7 a total of four switching transistors 222, 224, 226, 228 are integrated in the switching means 200. The switching transistors 222, 224, 226, 228 co-operate in pairs for effecting a push-pull activation of the transformer 92, the push-pull clock cycle ratio being 1:1.

On the output side, respective diodes 202 are provided, and on the input side a plurality of input capacitors 196 are provided.

For activating the various switching transistors 222, 224, 226, 228, a pulse modulation means 230 may be implemented as shown in FIG. 8. This pulse modulation means 230 outputs a series of pulses whose widths and/or heights and/or frequencies are variable so as to clock the switching transistors 222, 224, 226, 228.

For the sake of clarity, the pulse modulation means 230 is not shown in FIGS. 6 and 7.

As previously described, there are electric devices, which require both a high voltage and a high power. If the power and the voltage are suddenly demanded, when the electric device 46 is switched on, and are not yet available, the power and supply assembly 70 may collapse due to a feedback caused by the sudden request or large amount of power. In order to avoid such a collapse and a negative feedback, the clocked switched mode mains power supply 182 has on the input side thereof a load 240 which is connected in parallel to the transformer 92 of such switched mode mains power supply 182.

The DC converter 86 according to the present invention is so conceived that, already prior to switching on or supplying the electric device 46, the voltage and the power in the control and actuation assembly 80 are increased to at least the values demanded by the electric device 46. Until the electric device 46 actually operates, the voltage drops across the load 240 and the power is converted into heat as dissipation power. Only when the electric device 46 demands power, will the power across the load 240 be supplied to the electric device 46.

For the DC source, a stable utilization and a constant load are always discernible, i.e., the respective power distribution takes place in situ and is no longer fed back to the supply and control assembly 70.

As described above, the load 240 can be implemented as a Zener diode 240 so that, if necessary, voltage and power can be built up rapidly to desired values only a short time before they are demanded by the electric device. Full voltage and full power can in this way be built up within a few milliseconds and consumed by the Zener diode 240. The electric device 46 is only connected or additionally connected when voltage and power have been built up completely. The voltage and the power are then supplied to the electric device 46, only a residual voltage dropping across the Zener diode 240 and only a small percentage of the power (a few percent) being consumed there. If the electric device is then switched off, the whole voltage will again drop across the Zener diode 240 and said Zener diode 240 will consume the full power in the system. Subsequently, the voltage and the power can be reduced to a lower value. The reduced values are sufficient for supplying respective components of the system, such a monitoring and control means, which are also active if no electric device has been connected or additionally connected.

If a supply of components by the DC converter 86 according to the present invention is not necessary, the voltage and the power can also be switched off completely or reduced to zero. As soon as there is again a demand from an electric device, voltage and power are again built up within a few milliseconds.

In some embodiments, the Zener diode 240 can be implemented in the form of field effect transistors or load resistors. Furthermore, the Zener diode 240 also guarantees in each converter component 182 a good heat dissipation of dissipation power that has there been converted into heat. The heat in question is no longer generated locally within close limits, but it is generated at a large number of locations so that the heat can be given off directly into the air or into water or the like. Separate cooling systems are not necessary.

Furthermore, the Zener diode 240 may have a very steep limiting characteristic so as to stabilize the output voltage still further, if necessary. If the Zener diode 240s and the respective converter components have the same type of structural design, it is also guaranteed that identical current intensities are distributed to each component. The voltage is stabilized up to a range of 2,3 or 5% at the most.

In at least some embodiments, to increase a cutoff frequency of the filter 184, the switch mode power supplies 182 of the DC converting device 86 may be clocked with respect to one another in phase-shifted fashion.

To produce corresponding harmonics only to a small degree in this connection, a phase shift in the clocking of neighboring switch mode power supplies 182 may be 1/n each if n is the number of the switch mode power supplies 182 of the DC voltage converting device 86. Hence, the phase shift is such that the n+1th switch mode power supply 182 would be again in phase with the first switch mode power supply 182 (cyclic phase shift).

The switched mode mains power supplies 182 of the DC converter 86 can be clocked in a phase shifted mode so as to shift, especially in the case of the communication connection in the direction of the supply and control assembly 70, the cutoff frequency of clocking interference.

Such a push-pull converter 238 may be designed as a half-bridge or full-bridge push-pull converter 244, 242 respectively. In particular for maximum powers the switch mode power supply 182 may be designed as a full-bridge push-pull converter 242.

Such converter components 180 for an input voltage of e.g. a few hundred volts are nowadays commercially available, whereas converter components for a few thousand or for several thousand volts on the input side are not available at all or are at least very expensive and complicated The parallel connection of the converter components 180 on the output side results, depending on the power of the individual converter components 180, in the total power of the system. Depending on the total power desired, the number and the structural design of the converter components 180 are selected accordingly. The overall system can easily be adapted to given requirements in this way.

In order to satisfy requirements with respect to the control of mains fluctuations and load control, the tendency towards miniaturization and the wish for reducing the dissipation power, the converter components 180 can be implemented as clocked switched mode mains power supplies 182. Such clocked switched mode mains power supplies 182 have, in comparison with conventional power supply units, an efficiency that is in some cases higher than 90%, a reduction of volume and weight of up to 60%, a voltage stabilization of less than 1-2%, they require only a small amount of filtering means and their price-performance payoff is more advantageous.

It can also be considered to be advantageous when the switched mode mains power supply 182 is clocked on the primary side so as to galvanically separate the output side and the input side.

The switched mode mains power supply 182 can be implemented as a push-pull converter 238 so as to use a switched mode mains power supply 182 which is also well adapted to high power values. The push-pull converter 238 can be implemented as a half-bridge or as a full-bridge push-pull converter 242, 244.

The switched mode mains power supply 182 can include a switching transistor, 222, 224, 226 and 228 especially a power MOSFET or a power BIMOSFET, so that a transformer of the switched mode mains power supply 182, which is clocked on the primary side, can be switched electronically in a simple way. In this connection, attention should be paid to the fact that, e.g. for a full-bridge push-pull converter, four such switching transistors 222, 224, 226 and 228 are respectively connected in pairs.

The switching transistors 222, 224, 226 and 228 can be clocked in a push-pull mode with a clock cycle ratio of 1:1 so as to obtain a low current consumption of the transformer in the push-pull converter.

In order to obtain the least possible amount of harmonic waves on the output side, the switched mode mains power supplies 182 of the DC converter 86 can be clocked synchronously.

To control the switching transistors accordingly, the switch mode power supply may comprise a pulse modulation means for the clocked control of the switching transistors 222, 224, 226 and 228, the pulse modulation means supplying a sequence of pulses of a variable width and/or height and/or frequency for clocking the switching transistors 222, 224, 226 and 228.

In order to activate the switching means of the various switched mode mains power supplies 182 while controlling or regulating especially the controller, the switched mode mains power supply 182 can be provided with a pulse modulation means which outputs a series of pulses having variable widths and/or heights and/or frequencies so as to clock the switching means in question or rather the switching transistors 222, 224, 226 and 228 defining the same.

A switching means for correspondingly switching the transformer of the switch mode power supply may e.g. be designed as a switching transistor, in particular a power MOSFET or BIMOSFET. It is also possible that the switching means is designed as a thyristor.

In a push-pull converter, at least two switching transistors 222, 224, 226 and 228 are used that operate in the push-pull mode. Advantageously, it is also possible to operate in the push-pull mode with a clock ratio of 1:1. This means that both switching transistors 222, 224, 226 and 228 are each switched through alternatingly for the same periods of time.

To obtain an output voltage that is as smooth as possible and has a relatively small amount of harmonics, the switch mode power supplies 182 of the DC converting device 86 may be clocked in synchronism. This means that all switch mode power supplies 182 are clocked at the same clock rate.

To ensure an undisturbed transmission of a communication connection in this respect and to scan the DC voltage on the input side substantially completely at the same time, the clock rate of the switch mode power supply may be in the range of 10 kHz to more than 1 MHz and, in particular, in the range of 50 kHz to 300 kHz.

In this connection each switch mode power supply 182 can e.g. be readjusted in its output voltage via changes in the duty factor, in particular, in case of failure of another switch mode power supply 182 of the DC voltage converting device 86.

In the simplest case a readjustment of the output voltage of a switch mode power supply 182 can take place via a change in the duty factor of the switching transistor.

To be able to transmit data sent via the cable connection in the direction of the DC voltage source, i.e. without interference and at a high speed, the DC voltage converting device 86 may comprise a filter means 190 arranged upstream on the input side.

In connection with the filter means 190, it should additionally be mentioned that such means filters, in particular, the frequency range within which the communication connection to the DC voltage source takes place. This means that only a lower frequency range of up to e.g. 50 kHz is filtered. Relatively simple and inexpensive filters are thus sufficient.

In order to remove interfering frequencies especially from the frequency range required for the communication connection, the DC converter 86 can be provided with a filter means 190 preceding such DC converter 86 on the input side thereof.

This filter means 190 filters especially a frequency range of up to approx. 50 kHz.

In order to realize suitable communication connection in a simple way and only after the filtering, a means for coupling data signals in/out 136 can be connected upstream of said filter means 190 in the direction of the DC source.

It should additionally be pointed out that the filter means 190 between the DC converter 86 and the DC voltage source can be realized e.g. by comparatively small capacitors, since, due to the fact that the individual converter components are clocked in a phase-shifted mode, the cutoff frequency of the system is very high.

To monitor, control and regulate the corresponding components of the DC voltage converting device 86 on site, a controller 112 may be assigned at least to the DC voltage converting device 86 and the components thereof. However, the controller 112 may also be responsible for electrical devices supplied by the converting device with DC voltage and may monitor the same in their function and carry out the control or regulation of the devices.

The controller 112 used according to the invention can be designed in its monitoring function such that it monitors e.g. the individual switch mode power supplies, reports on the failure of corresponding switch mode power supplies and the location of said switch mode power supplies within the DC voltage converting device 86 and sends an alarm message in case of failure of a predetermined number of switch mode power supplies. The corresponding information of the controller 112 can be transmitted via the coaxial cable connection to the DC voltage source that is located far away, and can be represented there accordingly.

A controller 112 can be associated with at least the DC converter 86 and the components thereof so as to design the DC converter 86 in such a way that said DC converter 86 and, if necessary, also the electric device 46 connected thereto can be can be controlled and monitored automatically. This controller 112 can e.g. detect failure of a converter component and, if desired, also the position of said converter component. This information can be transmitted via the communication connection and the means for coupling data signals in/out 136 to the DC source and the units associated therewith. There, the information can be displayed in a suitable manner on a reproduction device, such as a screen or the like. If a relevant number of converter components failed, a repair demand can additionally be supplied by the controller.

The cable connection 68 may comprise at least one coaxial cable so that, even if high power is to be transmitted and if voltage and data are transmitted simultaneously, said cable connection can be established such that it has a small cross-section, whereby costs will be saved, especially in the case of long distances. Since the voltage transmitted through the coaxial cable is a DC voltage, only line losses will occur, whereas additional attenuation losses, which are caused by a transmission of AC voltages, are avoided.

Referring again to FIG. 1(c), electrical devices 46 or electrical units 24 maybe a combination of actuators, sensors, motors, and other electrically operated equipment disposed at a remote assembly 25. The remote assembly 25 may include a subsea wellhead assembly with a subsea tree. By way of example, the wellhead assembly shown and described in U.S. Pat. No. 6,039,119, hereby incorporated herein by reference, with a spool tree as described therein may be used with the embodiments of the present invention. The subsea tree may also be a dual bore tree. The electrical devices 46 may be actuators, which operate devices such as valves, chokes, and other devices that are used to control the flow of fluid through a subsea system. In the preferred embodiments, the electrically operated subsea system eliminates the use of hydraulically actuated valves. Therefore, control and operation of a subsea assembly 25 can be all electrically controlled. An all electric system offers many advantages, such as quick response, elimination of hydraulic fluid, no dumping of fluid to sea (environmentally friendly), and the ability to perform real time diagnostics on the actuators, valves, and chokes of the assembly 25. At the surface, the requirement for a hydraulic power unit is eliminated and the surface equipment can be packaged more compactly.

The following embodiments describe exemplary electrical devices 46 and electrical units 24 that may be used with the electric control and supply system 60 of the present invention.

Figure 9:
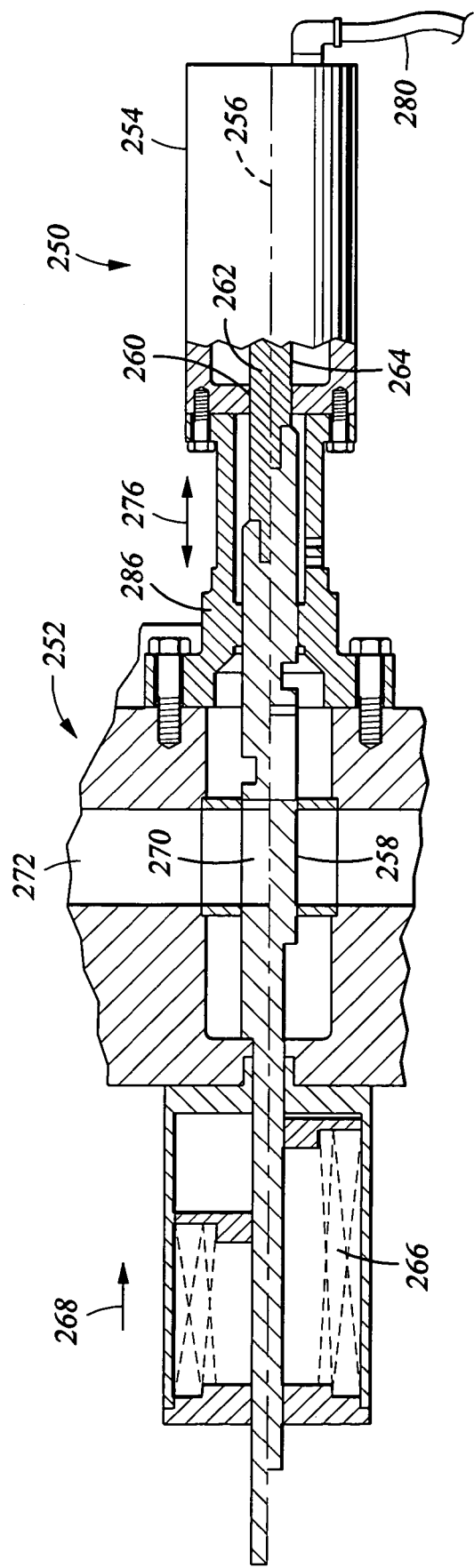
FIG. 9 is a longitudinal section through the actuator system according to embodiments of this invention, attached to a control device such as a gate valve.

Referring now to FIG. 9, there is shown a section through an electrical device 46 of a remote subsea assembly 25. The electrical device 46 is an actuator system 250 constructed in accordance with U.S. patent application Ser. No. 10/276,204, filed Nov. 12, 2002 and entitled Actuating Device, which claims the benefit of PCT/EP01/05156 filed May 7, 2001, which claims the priority of DE 200 08 415.1 filed May 11, 2000; all of which are hereby incorporated by reference herein in their entirety. Actuator system 250 is mounted via flange housing 286 to a control device 252 in the form of a gate valve. The actuator system 250 includes a system enclosure 254 laterally flanged to one side of the control device 252 with an actuator element 260 slide-mounted in the axial direction 256 to permit shifting between an extended position 262 and a retracted position 264. The actuator element 260 is connected to a valve slide 258 that is reciprocably disposed within the control device 252 so that the valve slide 258 can be shifted in the shift direction 276.

In the extended position 262, the actuator element 260 is extended so as to shift the valve slide 258 within a slide bore 270 of the control device 252 to a position where it opens a transverse flow bore 272 through the valve gate 252 and through the valve slide 258. In its retracted position 264, the valve slide 252 closes the flow bore 272 through the valve gate 252. At least one return spring 266 is mounted on the other side of the control device 252 to subject the actuator system 250 to a pressure load in the reset direction 268. A connecting line 280 connects the actuator system 250 with the control and actuation assembly 80. The connecting line 280 is used for controlling the actuator system 250 and for data transfer.

Figure 10:
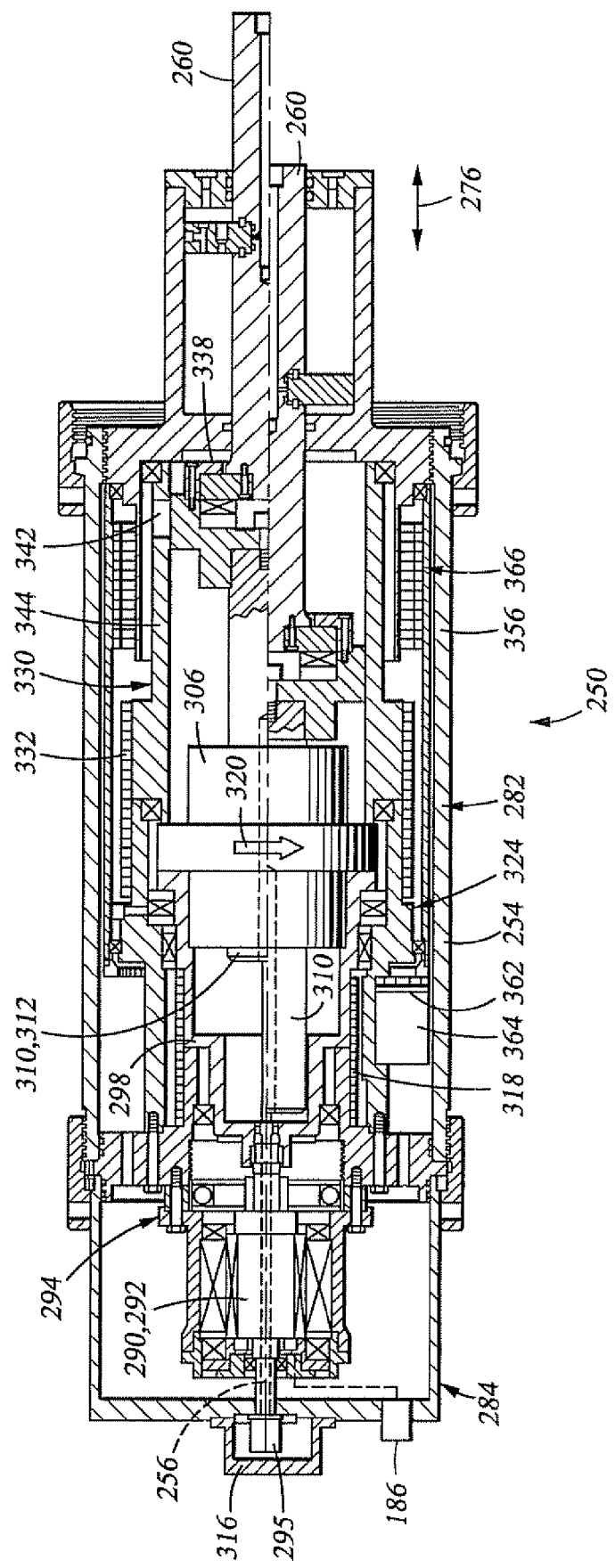
FIG. 10 shows a longitudinal section through the actuator system per FIG. 9 along the intersecting line II-III in FIG. 11.

Referring now to FIG. 10, there is shown a longitudinal section through the actuator system 250. In the upper half of FIG. 10, the actuator element 260 is shown in its retracted position 264 and in the lower half, separated by the axis line 256, the actuator element 260 is shown in its extended position 262 as in FIG. 9.

The enclosure 254 is a two-part system having an inner enclosure section 282 removably attached to an outer enclosure section 284. The outer enclosure section 284 houses a power assembly 290 including an electric motor 292, for instance a direct-current servomotor, that is connected to a drive assembly 294, which may comprise a standard clutch-and-brake combination or alternatively a so-called flex-spline drive without the traditional gears. It should be appreciated that motor 292 preferably uses DC voltage but may use AC voltage. Power is supplied to motor 292 by subsea power source 102 via a connecting lines such as line 186. Connecting sleeve 298 is connected to drive assembly 294 on one end and to ball nut 306 at its opposite end. Rotating spindle 310, in the form of a ball screw 312, is suspended in the ball nut 306 and is adapted to move relative to the ball nut along axial direction 256. The drive assembly 294 turns the connecting sleeve 298 and the rotation is transferred to the ball nut 306, causing the rotating spindle 310 translate relative to the ball nut 306.

A positional sensor 295 is disposed on the outer end section 284 to detect the longitudinal position of the spindle 310. The positional sensor 295 protrudes from the enclosure end section 284 and is positioned inside a sensor cap 316 that is detachably connected to the enclosure end section 284. The sensor 295 would detect for instance the respective longitudinal position of the rotating spindle 310 from which it determines the position of the actuator element 260.

At its end on the side of the rotating spindle 310, the actuator element 260 is connected to a rotary mount 338. Radially protruding from the rotary mount 338 are two mutually opposite guide lugs 342 which engage in corresponding guide slots 344 in the rotating sleeve 330 and are guided by these slots in the axial direction 256. By engaging in the guide slots, the guide lugs cause the rotary mount 338 and thus the rotating spindle 310 and the rotating sleeve 330 to be rigidly connected to one another.

Volute spring 318 permits rotation of the connecting sleeve 298 in the advance direction 320 while preventing any rotation in the reverse direction. A second volute spring 332 is disposed between casing 324 and rotating sleeve 330. At one of its coil ends, the volute spring 332 makes contact with an inside surface of a tensioning sleeve 356 that engages in a gear 362 that is turned by a tensioning motor 364. The tensioning motor 364 is positioned between the casing 324 and the system enclosure 254 and can be controlled independent of the electric motor 292 for turning the tensioning sleeve 356. The tensioning motor 364 is connected to the control and actuation assembly 80.

A return spring 366 in the form of a torsion spring is connected to tensioning sleeve 356 such that, when the tensioning motor 364 turns the tensioning sleeve 356, it tensions the return spring 366, producing the necessary return force for the tensioning sleeve 356. The combination of tensioning motor 364, tensioning sleeve 356, volute spring 332 and return spring 366 constitutes an emergency release unit 370 which causes the actuator element 260 to be automatically reset into its retracted position 264 in the event of an electric-power failure in the actuator system 250.

In operation, the actuator element 260 is moved in the shift direction 276 by operating the electric motor 292, which, by way of the drive assembly 294, turns the connecting sleeve 298 and the ball nut 306. As the ball nut 306 turns, the rotating spindle 310 or ball screw 312 is moved in an axial direction 256 which, by way of the rotary mount 338, moves the actuator element 260 in the direction of the extended position 262. The corresponding longitudinal movement of the rotating spindle 310 is monitored by the positional sensor 295. As shown in FIG. 2, with actuator element 260 in the extended position 262, the valve 252 is open, allowing gas, oil or similar exploration or extraction to take place.

Either simultaneous with or before operation of motor 292, tensioning motor 364 turns the gear 362 and with it the tensioning sleeve 356, causing the volute spring 332 to be relaxed and the return spring 366 to be tensioned. If and when the tensioning motor 364, designed as a step motor, is fed a corresponding holding current by control and actuation assembly 80, it will hold its position, as will the tensioning sleeve 356. The return spring 366 stores energy which tries to turn the tensioning sleeve 356 back against the holding force of the tensioning motor 364.

If the actuator element 260 is to be moved, the holding force of the tensioning motor 364 is brought down by appropriate controls in control and actuation assembly 80. This will then release the volute spring 332, enabling the rotating sleeve 330, powered by the return energy of the return spring 366, to rotate in the opposite direction relative to the casing 324. By virtue of the rigid connection between the rotating sleeve 330 and the rotating spindle 310, provided by the guide slots 342 and guide lugs 344, the rotating spindle 310 and ball nut 306 can reverse direction toward the electric motor 292, whereby the actuator element 260, connected to the rotating spindle 310, is shifted back into its retracted position 264 (see FIG. 9). A major factor in this context is the return force applied by the return spring 366 on the actuator element 260 since it is essentially this force that resets both the actuator element 260 and the rotating spindle 310 by turning back the tensioning sleeve 356 and correspondingly releasing the volute spring 332.

In the event of a power failure as well, the holding force in the tensioning motor 364 subsides, causing an emergency closure of the actuator system 250 due to the action of the return spring 366, volute spring 332 and tensioning sleeve 356. As described further above, the return spring 366 turns the tensioning sleeve 356 back, releasing the volute spring 332, so that the rotating sleeve 330 can then rotate relative to the casing 324. The remainder of the closing process takes place in the same way as in a normal closing operation of the actuator system 250.

Figure 11:
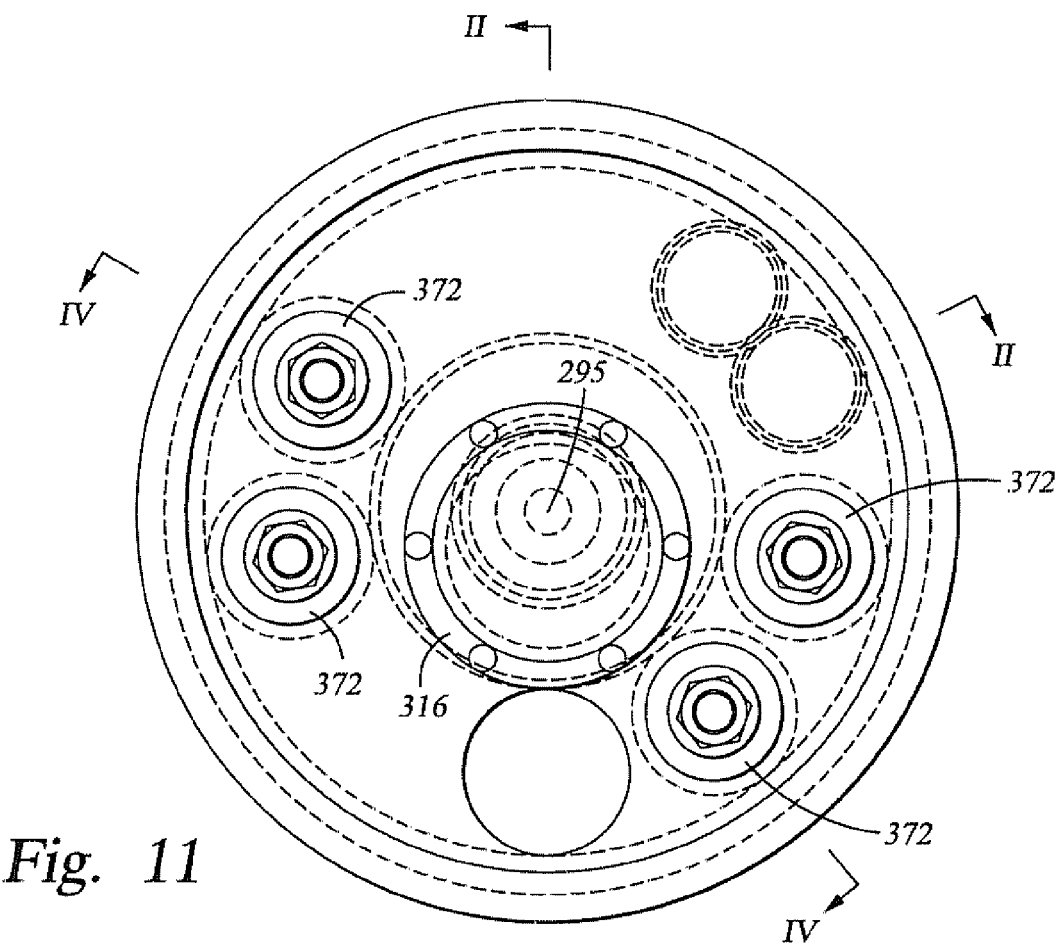
FIG. 11 is a front view of the actuator system per FIG. 10.
Figure 12:
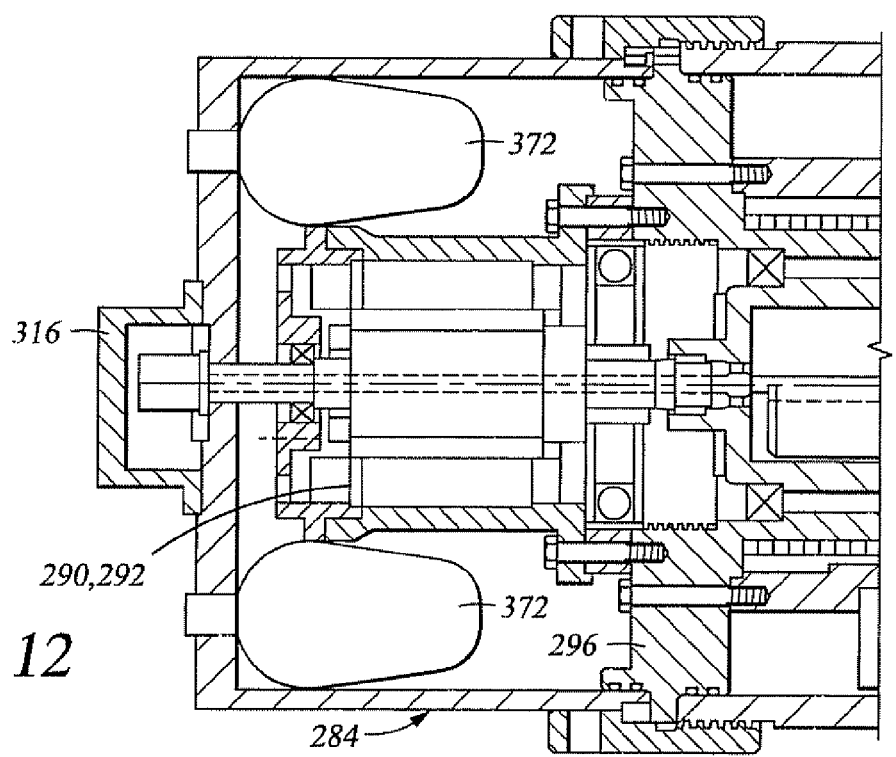
FIG. 12 is a sectional view along the line IV-IV in FIG. 11.

FIG. 11 is a frontal illustration of the actuator system 250 per FIG. 10 viewed in the direction of the outer enclosure end section 284 and the sensor cap 316. FIG. 10 represents a sectional view along the line II-II in FIG. 11. Four compensators 372, shown in more detail in FIG. 12, are mounted in a concentric arrangement around the positional sensor 295 per FIG. 11. FIG. 12 represents a section along the line IV-IV in FIG. 11. The compensators 372 are positioned in the outer enclosure end section 284 in a radial configuration relative to the electric motor 292. These compensators 372 serve to compensate for volume and pressure variations relative to a complete oil filling of the actuator system 250, i.e. they compensate for volume changes due to system actuation and to temperature fluctuations.

Figure 13:
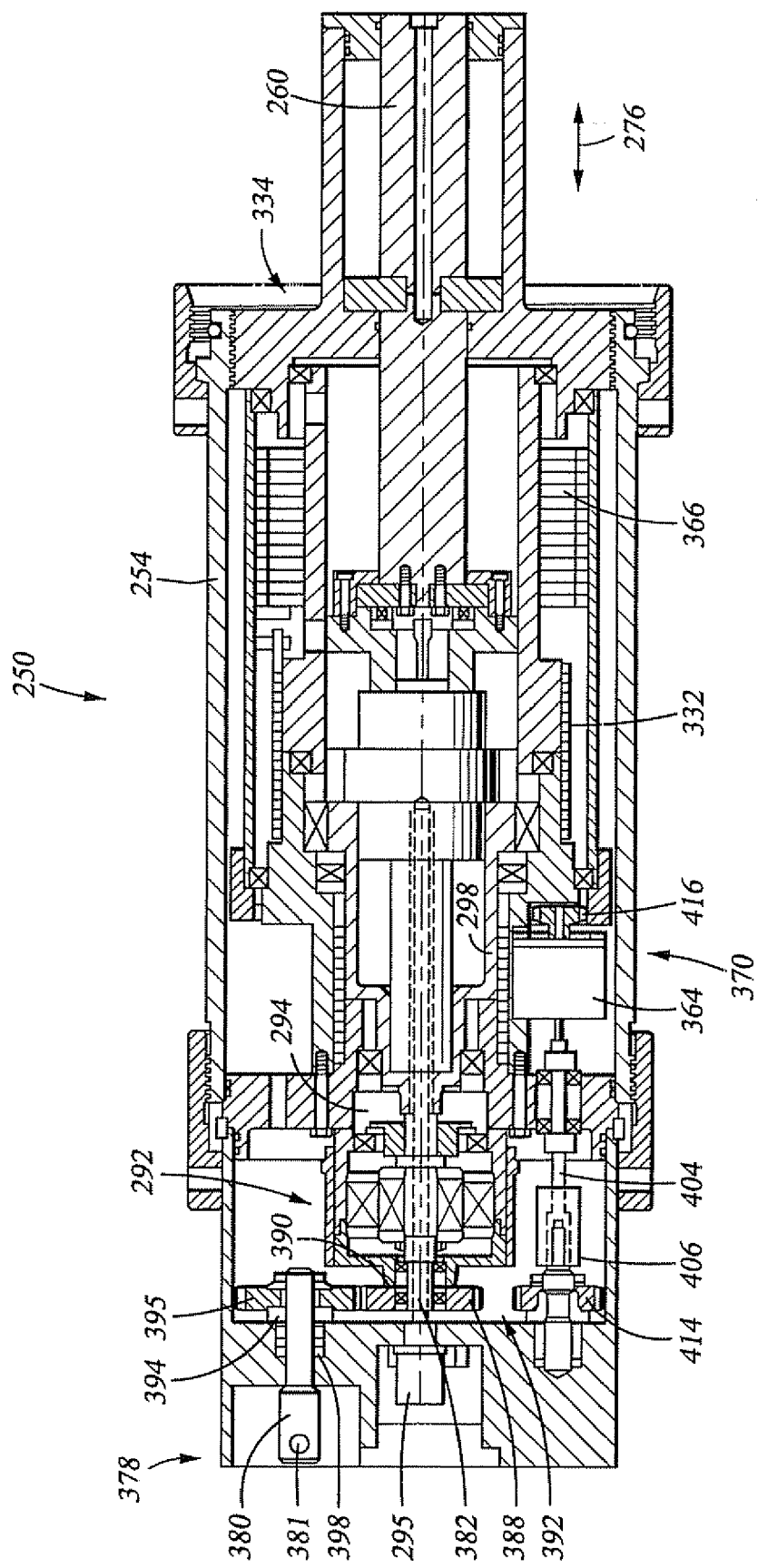
FIG. 13 is a front view of an actuator system according to embodiments of this invention.

Referring now to FIGS. 13 and 14, actuator system 250 may also include an externally activated emergency actuator assembly 378 in accordance with U.S. patent application Ser. No. 10/276,201, filed Nov. 14, 2002 and entitled Actuating Device which claims the benefit of PCT/EP01/05158 filed May 7, 2001, which claims the priority of DE 200 08 414.3 filed May 11, 2000, all of which are hereby incorporated by reference herein in their entirety. The emergency actuator 378 includes an auxiliary trunnion 380, with diametrically opposite pins 381 for attaching from outside the actuator system 250, such as with an underwater manipulator or similar tool. Auxiliary trunnion 380 may be located adjacent to position-monitoring sensor 295. FIG. 13 shows an end view of system 250 while FIG. 14 shows a longitudinal section along the line A-C in FIG. 13.

The motor 292 and the tensioning motor 364 each feature, respectively, a motor shaft 382 or a tensioning-motor shaft 404, projecting toward trunnion 380. Motor shaft 382 is equipped with a gear 388 in the form of a free-wheeling gear with a coaster mechanism 390, thus constituting a directional clutch unit 392. The free-wheeling gear 388 engages in a drive gear 395, which is mounted on one end of the trunnion 380, with a slip-ring coupling 394 interpositioned between them.

Tensioning-motor shaft 404 connects to a sleeve nut 406 that supports a tensioning gear 414. As can be seen in FIG. 13, tensioning gear 414 is rotated by the rotation of trunnion 380 via drive gear 395 and intermediate gear 418. Therefore, rotation of trunnion 380 rotates both a motor shaft 382 and a tensioning-motor shaft 404.

The combination of auxiliary trunnion 380, drive gear 395, free-wheeling gear 388, tensioning gear 414, and tensioning motor shaft 404 forms and emergency actuator assembly 378 by means of which, in the event power to the motor 292 or to the tensioning motor 364 is interrupted or some other problem interferes with the normal operation of the actuator system 250, the actuator element 260 can be shifted into its operating position 276 as described above.

The emergency actuator assembly 378 and its components remain in an idle standby state during normal operation, without requiring any further technical provisions, i.e. they are not moved in any way. If in an emergency situation the actuator element 260 is to be opened by the emergency actuator assembly 378, the auxiliary trunnion 380 is turned in the appropriate direction, in this case also turning the motor 292 by way of the free-wheeling gear 388 and coaster mechanism 390, as a result of which the actuator element 260 is shifted into its extended position 262, as described above.

At the same time, by way of the intermediate gear 418 and the tensioning gear 414, the tensioning motor 364 is set in motion to activate the emergency release unit 370. The emergency release unit 370 is so designed that after only a few hundred revolutions of the tensioning-motor shaft 404, the volute spring 332 and return spring 366 are tensioned and by virtue of the slip-ring coupling 416, any further torque action on the tensioning motor 404 is prevented.

If in an emergency situation the actuator system 250 must be used to close the actuator element 260, the auxiliary trunnion 380 is turned in the opposite direction. Only a few turns are necessary to trigger the emergency release unit 370. That unit 370 then works as described above, without the motor 292 turning along with it since in this case again the free-wheeling mechanism is activated.

FIG. 15 illustrates one embodiment of a position measuring sensor 295 as described in U.S. patent application Ser. No. 10/344,921, filed Feb. 18, 2003 and entitled Method and Device for Measuring a Path Covered which claims the benefit of PCT/EP01/09513 filed Aug. 17, 2001, which claims the priority of EP 00117841.7 filed Aug. 18, 2000, all of which are hereby incorporated by reference herein in their entirety. In order to determine the position of a control element relative to a housing in the case of such a linear control device relative to the housing, one end of the control element may be connected with a spring element, which, with its end turned away from the control element, is connected with a force-measuring device, which transmits an electrical signal corresponding to the force transmitted from the spring element to the force-measuring device, to an evaluating device. This means that the linear control device is distinguished by the fact that the path-measuring device is incorporated in the latter. Correspondingly the path-measuring device in the linear control device can have the same features as the position-monitoring sensor described below.

In the case of oil and gas recovery, in particular, a number of linear control devices are used. Such a linear control device is used, in particular, for operating valves, throttles or the like, in the case of oil and/or gas recovery, and has at least one control element mounted movable linearly within a housing and a drive device associated with the latter. The control element may be a ball spindle, which is mounted capable of turning in a corresponding nut. The nut is connected moving with the corresponding drive device and converts rotation of the nut induced thereby into a longitudinal motion of the ball spindle.

The position-monitoring sensor 295 has a simple, strong, and reliable construction and is particularly suited for applications in remote and inaccessible areas. For example, one area of application is the use of the position-monitoring sensor 295, for the linearly actuator element 260 in a device for oil and/or gas production. Corresponding devices are so-called actuators, BOP's (blowout presenters), valves and the like, as are necessary in the case of oil and gas production. In this case, the area of application of the position-monitoring sensor 295 is not limited to uses on land, but because of the insensitivity to pressure or other unfavorable environmental influences, in particular the use under water is also possible. This obtains analogously for underground use.

Referring now to FIG. 14, the position-monitoring sensor 295 is situated underneath the auxiliary trunnion 380 and is operationally connected to the motor shaft 382 of electric motor 292 that is rotatable in the direction of advance rotation 320. Located next to the positional sensor 295, in the same recess in the motor cover or end section 284 is the plug connector 384 for the connection of a connecting line by way of which data can be transmitted to or retrieved from the position-monitoring sensor 295 and actuator system 250 and power may be provided to power assembly 290.

Referring now to FIGS. 15-17, there is shown an enlarged view of the position-monitoring sensor 295 as an example of path-measuring device according to the invention. The position-monitoring sensor 295 is located in a linear drive device 450, which has at least one operating element 452, which is movable back and forth in the longitudinal direction. Operating element 452 is preferably a ball spindle, which is mounted capable of rotating in a ball rotation nut. At the time of the rotation of the ball rotation nut by means of the drive device 450, shown only partially in FIG. 15, there is a corresponding rotation of the operating element 452 and a motion of the operating element 452 in the longitudinal direction takes place as a result of the rotation relative to the ball rotation nut in the longitudinal direction.

Operating element 452 is connected at one end 454, per FIG. 15, with spring element 456 of position-monitoring sensor 295. The spring element 456 is guided in a conduit 458 by drive device 450 and connected with its end opposite the operating element 452 with a corresponding force-measuring device 460 in the form of an electrical measuring conductor. The force exerted by the operating element 452 onto spring element 456 by means of the force-measuring device 460 or the corresponding electrical measuring conductor is converted into a corresponding voltage.

The spring element 456 can be chosen in particular so that it expands proportional to the retaining force exerted, so that the evaluation of the signal of the force-measuring device 460 and correspondingly the determination of motion or position of the actuator element 260 is simplified.

Since a spring element, as a rule, has a soft damping characteristic, corresponding vibrations, shocks, or the like are transmitted without influence on the force-measuring device 460.

Such a spring element 456 can be chosen with the corresponding spring constants, from corresponding material, and the like depending on the requirements. Only a limited motion of the actuator element 260 is possible because of the connection with the spring element 456 and via the latter with the force-measuring device 460. Essentially the range of motion is determined by the spring element 456 and the maximum expansion, which can be evaluated by the latter.

The spring element may follow a curved, for example circular, path of a moving object, and correspondingly the position of the moving object along this path can be determined.

Force-measuring device 460 can include a number of electrical conducting wires, which change their resistance depending on the force exerted on them. This means, a resistance change of the electrical conducting wires corresponds to a force transferred by spring element 456, and the force is proportional to a deflection of spring element 452 and thus to a position of the longitudinal movement of actuator element 260.

The wires of force-measuring device 460 are parallel to another and can be switched electrically also parallel or even in series. The wires form a resistor, which is part of a bridge circuit, as shown in FIG. 18. A further resistor 462 of this bridge circuit also is formed by a number of electric conducting wires and this further electrical resistor 462 corresponds to the resistance formed by the electric conducting wires of force-measuring device 460 and is used for temperature compensation.

In order to be able to determine changes in the resistance in such an electrical conductor 460 in a simple way, the electrical conductor 460 can be connected in a bridge circuit, such as a so-called Wheatstone bridge, and form at least one resistor in the bridge circuit highly accurate circuit measurements are possible by means of such a bridge, whereby a high accuracy for position determination of the actuator element 260 also results.

In order to compensate for changes in the resistance of the conductor 460, on the basis of temperature changes, so that the latter do not lead to an erroneous determination of the position of the moving object, the bridge circuit can have a further resistor analogous to the resistor formed by the force-measuring device 460. For example, if the force-measuring device 460 is made up of a number of wires, this further resistor is made in a similar way. Of course, as opposed to the force-measuring device 460, it is not exposed to a corresponding tensile force from the spring element 456.

In order to compensate for certain statistical irregularities of the wire, such as diameter deviations, changes in the properties of the material, and so forth, in a wire-like conductor 460 in a simple way, the conductor 460 can have a number of electrically conducting wires located parallel to one another. In this way, corresponding statistical deviations of the individual wires are determined and a force-measuring device 460 measuring accurately over its entire measuring range results.

The wires may be individual wires or formed by an individual wire, which is laid meandering.

The force-measuring device 460 has at least one electrically conducting, in particular wire-like conductor, the electric resistance of which depends on a force exerted upon it in the longitudinal direction. Such a conductor also may be made out of different materials, which are chosen, for example, with respect to the environmental conditions under which the position-monitoring sensor 295 is used. In this way the position-monitoring sensor 295 also may be used in aggressive media, under water, under pressure, under a vacuum and the like, essentially without limitations. Because of a simple structure of the position-monitoring sensor 295 there is no wear and no abrasion of the individual parts, so that the service life is extraordinarily high.

Such an electrical conductor 460 as a force-measuring device changes its electrical resistance in the case of exertion of a corresponding tensile force on the conductor, and such a resistance change can be detected via corresponding stress or current changes and evaluated as a signal in the evaluating device 468.

The force-measuring device 460 can be made correspondingly in order to convert the tensile force exerted by the spring element 456 into an electrical signal. A simple example of such a force-measuring device 460 can be seen if the latter has at least one electrical measuring conductor, the electrical resistance of which changes depending on a force exerted on the measuring conductor.

An offset device 464 and amplifier 466 are connected with the resistors formed by the wires. Corresponding signals from the amplifier 466 may be output on an output unit of evaluating unit 468, in which case this evaluating unit 468 also can have a differentiator, by which the corresponding position values of actuator element 260 changing in time can be differentiated and thus a speed and, in a given case, acceleration, of the actuator element 260 can be determined.

A zero point of the deflection of the spring element 456 can be adjusted by offset device 464. For example the springs can be pre-stressed 2% to 5%, in order to create such a measurable zero point for the motion of the actuator element 260. A stress value associated with this pre-stress is set to zero by means of the offset device 464.

A voltage supply is connected with the wires and the evaluating unit for the voltage supply of the wires and evaluating device.

In the case of a linear control device which has a control element moving linearly forward by a screw motion, it is advantageous if the corresponding turning of the control element is not transferred to the spring element and thus leads to a stress or force in the spring element, which is not caused by the linear motion of the control element. For this, for example, at least the connector between spring element and control element can have a rotation decoupling device. Only the linear motion of the control element is transferred to the spring element by means of this rotation decoupling element, and the rotation is received by the rotation coupling device.

The spring element 456 according to FIGS. 15-18 is connected via connectors 470, 472 to control element 452, respectively with electrical measuring conductor 460. The connector 470 is a rotation decoupling device 469. The rotation decoupling device 469 prevents a transfer of the rotation of the operating element 452 made as a ball spindle to spring element 456. Rotation decoupling device 469 can be made, for example, by a screw which is screwed into the end of operating element 452, and which is mounted fixed capable of rotating in the connector 470, but in the longitudinal element of the spring element 456.

FIG. 16 corresponds to a magnified representation of section "X" from FIG. 15 and FIG. 17 is a magnified representation of section "Y" from FIG. 15.

The connection of spring element 456 with the connector 472 in particular is shown in FIG. 16. This is connected to electrical measuring conductor 460, which is fastened on its end opposite spring element 456 at a fixed point of housing 474 of linear control device 476. Corresponding connecting wires are connected to the electrical measuring conductor 460 via soldering points, which lead to the bridge circuit 481, see FIG. 18.

In order to be able to detect corresponding resistance changes easily via associated stress changes, the electric measuring conductor 460 can be connected as a resistor in a bridge circuit, as a so-called Wheatstone bridge.

According to the invention a simple electrical structure, which also requires simple means in the case of the evaluating unit 468, results from the use of the bridge circuit and the electrically conducting wires 460 as a force-measuring device. For example, an amplifier 466 and/or a differentiator and/or an evaluating device 468, connected with a microprocessor or the like, are the only electronic components, which are necessary. The differentiator may be omitted if, for example, a determination of the speed or acceleration of the actuator element 260 during this motion is omitted. In addition, arrangements of other evaluating devices are used if the latter are supported by software.

The signals detected are transferred to evaluating device 468 from the bridge circuit 481 via the amplifier 466 for further processing.

One branch of the bridge circuit is grounded and the other branch lies on the plus pole of a voltage source.

In operation the linear motion of the actuator element 260 can be measured as a result of the fact that a retaining force is exerted by the spring element 456 during motion of the actuator element 260. Of course this is so small that it does not hinder, or only slightly hinders the desired motion of element 260. The retaining force exerted by spring element 456 is transferred to an electrical conductor as a force-measuring device 460. The electrical conductor 460, for example, has a number of wires, the resistance value of which varies in the case of exertion of a tensile force in a longitudinal direction of the wires. The change of the resistance value is determined by a corresponding change of a voltage decreasing on the resistor, this resistance change and thus also the associative voltage. change depending on the force exerted. If the force which is exerted by the spring element 456 onto actuator element 260 is determined from the resistance changes by corresponding calculations, the deflection of the spring 456 and thus the position of actuator element 260 may be determined simply from the force if the corresponding parameter (spring constant) of spring element 456 is known.

The actuator element 260 moves against the resistance of the elastically expandable retaining element 456 along an essentially linear path, having the retaining force appearing in the retaining element 456 be measured in relation to the path covered by the actuator element 260 and a signal corresponding to the retaining element 456 be transmitted from the force measuring device 460 to an evaluation device 468, and the path covered by the actuator element 260 corresponding to the retaining element 456 be determined there.

The spring element 456 is expanded in the case of motion of the actuator element 260, the retaining force appearing in the spring element 456 in the simplest case is directly proportional to the path covered by the actuator element 260. The retaining force is transferred through the spring element 456 to the force measuring device 460 and measured there. A corresponding electrical signal, which corresponds to the retaining force, and thus to the path covered by the actuator element 260, is received by the evaluation device 468 connected with the force-measuring device 460.

The components used for the position-monitoring sensor 295 are designed simply and economically. No wear of these components takes place, since, for example, there is no friction between the components or between the components and other objects. The position-monitoring sensor 295 is independent of a medium in which it is located, of the site conditions, of vibrations, shocks, or the like.

Figure 19:
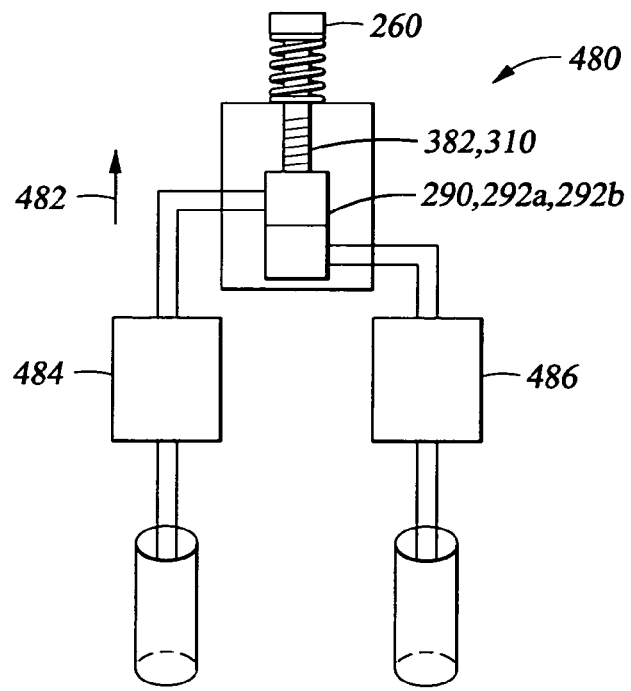
FIG. 19 shows a basic illustration of the actuating device according to embodiments of the invention with two separate electric motors and associated control device.
Figure 20:
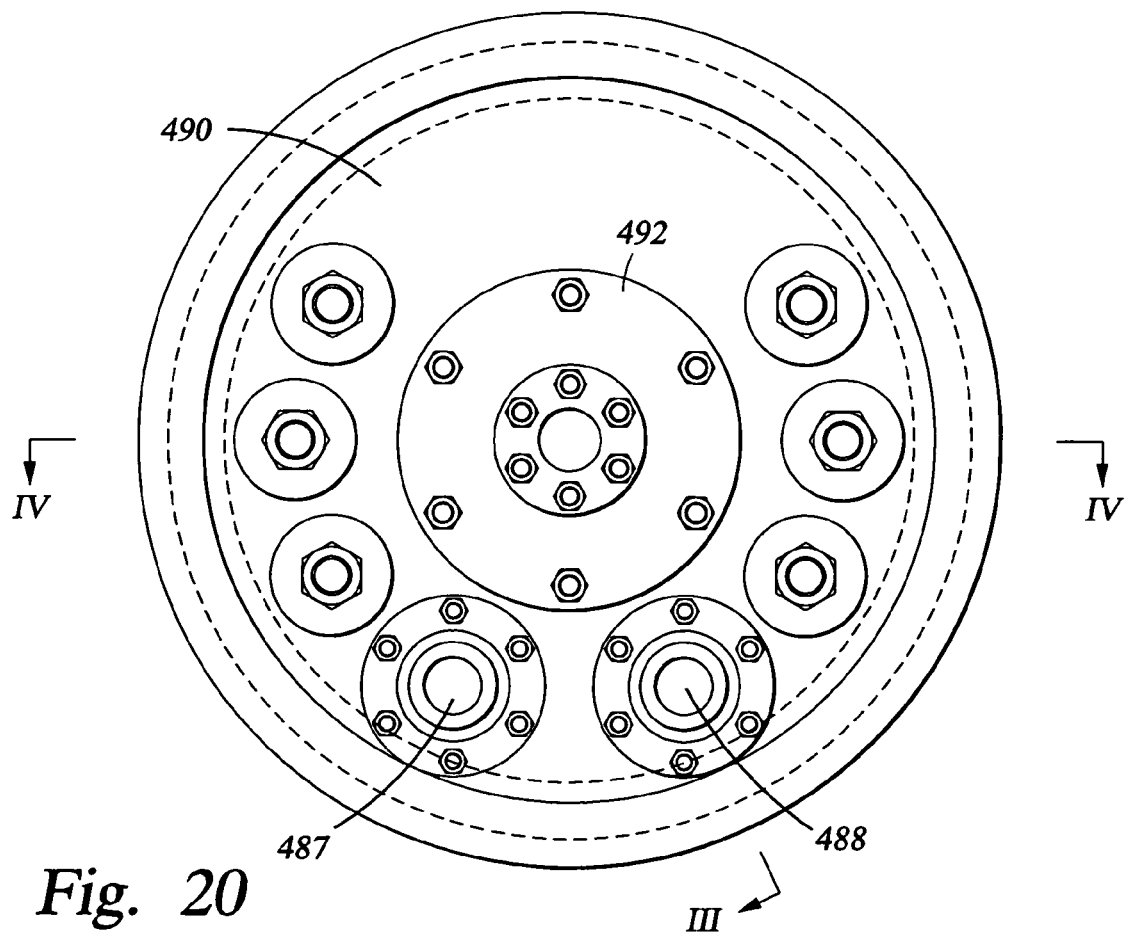
FIG. 20 shows a front view of a housing cover of the actuating device according to embodiments of the invention.
Figure 21:
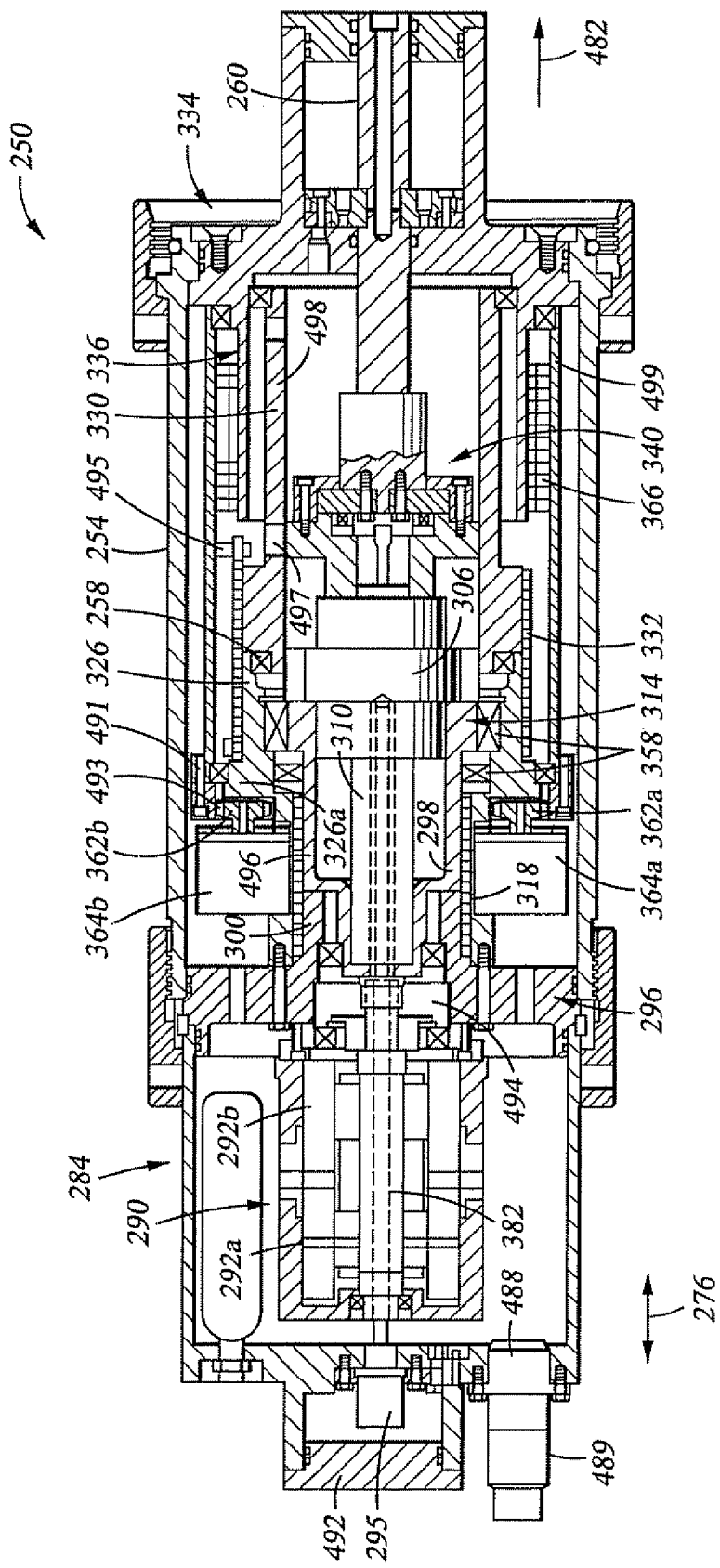
FIG. 21 shows a cross-section along the line IV-IV from FIG. 20.

Referring now to FIGS. 19-21, there is shown a dual redundant actuator 480 shown in schematically for actuating an actuation system 250. Dual redundant actuator 480 is constructed in accordance with U.S. patent application Ser. No. 10/415,419, filed Mar. 29, 2003 and entitled Actuating Device, which claims the benefit of PCT/EP01/12551 filed Oct. 30, 2001, which claims the priority of DE 200 18 564.0 filed Oct. 30, 2000, all of which are hereby incorporated by reference herein in their entirety. The dual redundant actuator 480 includes a power assembly 290 having two separate electric motors 292a, 292b. The electric motors 292 are preferably direct current servomotors and are both used, where necessary, independently of one another for rotating the drive shaft 382. As best shown in FIGS. 20-21, when the drive shaft 382 is rotated, a rotating spindle 310 is displaced in the regulating direction 482 and accordingly the actuating element 260 connected to it is also displaced. The actuating element 260 is used, for example, for closing or opening a valve as control device 252, shown in FIG. 9, to be actuated by the dual redundant actuator 480 of actuating system 250.

The servomotors 292a, 292b may be each electrically connected to a dedicated motor control device 484 or 486. These devices 484, 486 comprise appropriately a microprocessor, a memory device and other components necessary for the control, such as controller 112. An appropriate software program for controlling the servomotors 292a, 292b is held in the motor control devices 484, 486. Each of the electric motors 292 may be individually and essentially independent of one another.

Each of the motor control devices 4894, 486 can be separately connected to the dual redundant actuator 480 via suitable connections 487, 488 (see for example FIG. 20). In addition, each of the motor control devices 484, 486 is connected to a suitable voltage supply, such as supply 102.

In order to supply the motors 292 of the actuating device 250 with electricity also independently of one another at least two separate electrical connections 487, 488 are arranged on the housing 254 and especially on the housing cover 488 adjacent to the electric motors 292. The appropriate voltage supply as well as the data interchange or interchange of control signals can be implemented via these electrical connections 487, 488. Each of the electrical connections 487, 488 can be provided for one of the electrical motors 292, i.e. servomotors. In this connection it is also possible that each of the electrical connections 487, 488 is assigned to a stepper motor 364. A further possibility is also the provision of separate electrical connections for the stepper motors 364.

According to the invention, there is the possibility that the two electric motors 292 can be controlled independently of one another for the separate drive of the drive shaft 382. In this case it is practicable to operate one of the electric motors 292 in the idling mode when the other drives the drive shaft 382.

However, in order to be able to transfer a higher torque to the drive shaft 382 when necessary and therefore to displace the actuating element 260 in the regulating direction 482 with a higher force, both electric motors 292 (servomotors) can be operated simultaneously.

In this case, in order to prevent the motors 292 from rotating the drive shaft 382 with a phase displacement due, for example, to different motor characteristics or due to the formation of the separate electrical supply for both motors 292 instead of providing mutual support during simultaneous operation, the servomotors 292 can be especially synchronized by software via their associated motor control devices 484, 486.

A simple type of synchronization and control can be seen in that one servomotor 292 is used as the master and the other as the slave.

It can be seen as being advantageous, especially for the transmission of a high torque if each of the servomotors 292 is a direct current motor.

FIG. 20 shows a front view of a housing cover 490 of a device housing 284, see FIG. 21, of the dual redundant actuator 480 according to the invention. The housing cover 490 can also be the end of a sub housing, see FIG. 21, which can be releasably connected to the rest of the housing 254.

In the housing cover 490 especially the connections 487, 488 for the electrical supply and control of the servomotors 292a, 292b are arranged. A smaller cover 492 is arranged centrally with respect to the housing cover 490, the smaller cover 492 covering a pot-shaped protrusion of the housing cover 490, see again FIG. 21, in which a position sensor 295 is located.

For the further monitoring of the actuating device 250 according to the invention, especially remotely from said actuating device 250, a position sensor 295 can be assigned to the drive shaft 382. With the sensor 295, it can be found, for example, how far the actuating element 260 has been regulated, whether it has returned to its initial position, etc.

FIG. 21 shows a section along the line IV-IV from FIG. 20 with the addition of connector 488.

The two servomotors 292a, 292b of the drive device 290 are arranged in the longitudinal direction 276 of the drive shaft 382 one behind the other. The drive shaft 382 extends adjacent to the position sensor 295. The sensor 295 is used to measure rotation of the drive shaft 382 and therefore for the determination of a feed of the actuating element 260 in the regulating direction 482. An especially simple and space-saving arrangement can be seen in that the electric motors 292 are arranged one behind the other in the longitudinal direction 276 of the drive shaft 382.

The drive shaft 382 terminates in a transmission device 494, which, for example, can be a so-called flex-spline gearbox without classical gearwheels. A rotating sleeve 496 is rotated by the drive shaft 382 via the transmission device 494, the rotating sleeve 496 being rotationally rigidly connected to a ball nut 306 as part of a feed device 314. A further part of the feed device 314 is formed by the rotating spindle 310, which is a recirculating ball spindle.

A spindle head 340 is arranged on one end of the rotating spindle 310, which protrudes from the ball nut 306. The actuating element 260 is connected to the spindle head 340 on its side opposite the rotating spindle 310. The rotating sleeve 496 is rotationally supported in the ball bearing 358 with respect to a retaining sleeve 326, which surrounds the rotating sleeve 496. The rotating sleeve 496 is inserted into a ring flange 300 at its end facing the transmission device 494.

In order to prevent reactions by the control device 484, 486, which is subjected to force in the direction opposite to the regulating direction 482, via the actuating element 260 and rotating spindle 310 or recirculating ball spindle on the electric motors 292, the rotating sleeve 496 can be fixed by a first spiral spring 318 opposing a feed rotational direction on a ring flange 300 rotationally rigidly arranged in the housing 254. The feed rotational direction corresponds here to a rotation of the recirculating ball spindle for the regulation of the actuating element 260 or the rotating spindle 310 in the regulating direction 482.

In order to enable resetting of the actuating element 260 in the direction opposing the regulating direction 482 despite this when the control of the actuating device 250 fails, a retaining sleeve 326 can be rotationally rigidly connected at one of its ends to the transverse wall 296, whereby the retaining sleeve 326 is rotationally rigidly connected at its other end via a second spiral spring 332 to a guide sleeve 330 in the direction opposite to the feed rotational direction, the actuating element 260 connected to the recirculating ball spindle being supported for longitudinal displacement, but rotationally rigidly in the guide sleeve 330. If this second spiral spring 332 is released during a failure of the usually provided control for the actuating device 250, the guide sleeve 330 can rotate in the direction opposite to the feed rotational direction due to the force which is transferred via the actuating element 260 and which is acting on the control device 252 to be actuated. Through this rotation the rotating spindle 310 is turned back in the recirculating ball nut 306 also in the direction opposite to the regulating direction 482 until the actuating element 260 is again arranged in its initial position.

In this connection, in order to prevent the actuating element 260 itself from being rotated in the direction opposite to the regulating direction 482 when being displaced, a spindle head 340 for mutual connection can be arranged between the actuating element 260 and the recirculating ball spindle. The actuating element 260 is decoupled with regard to rotation from the recirculating ball spindle by this spindle head 340.

In order to wind up the second spiral spring 332 for the rotationally rigid connection of the retaining sleeve 326 and guide sleeve 330 sufficiently tightly on them, the spring 332 can be drive-connected to at least one electric motor 292. A sufficiently rotationally rigid connection between the retaining sleeve 326 and the guide sleeve 330 is produced by suitable actuation of the electric motor 292 for winding up the spiral spring 332, especially before regulation of the recirculating ball spindle and actuating element 260.

In order to enable appropriate guidance and retention with regard to the guide sleeve 330 as mentioned above, the spindle head 340 can comprise at least one guide element 497 protruding radially outwards, which engages a longitudinal guide 498 running in the guide sleeve 330 in the regulating direction 482.

In order to be able to still release the second spiral spring 332 with the failure of both electric motors 364, a torsion spring 366 can be arranged between the clamping sleeve 499 and ring flange 336, the torsion spring 366 being able to be tensed during the rotation of the clamping sleeve 499 for winding up the second spiral spring 332. If therefore the clamping sleeve 499 is no longer held by one of the electric motors 364 during the failure of its electrical supply in such a position in which the second spiral spring 332 is wound up, the torsion spring 366 rotates back the clamping sleeve 499 at least so far that the second spiral spring 332 is relieved for the release of the rotationally rigid connection between the retaining sleeve 326 and the guide sleeve 330.

In order to be able to finely and accurately control the rotation of the clamping sleeve 499, the first and second electric motors 364a, 364b can be stepper motors. The electric motors 292 and 364 may be powered by either DC or AC voltage, preferably DC voltage.

A first spiral spring 318 is wound up on the outer sides of the ring flange 300 and the rotating sleeve 496. The spring 318 is used to provide the rotationally rigid connection of the ring flange 300 and the rotating sleeve 496 in a rotational direction opposite to the feed rotational direction of the rotating sleeve 496, i.e. the direction of rotation through which both the rotating spindle 310 and also the actuation element 260 are displaced in the regulating direction 482.

The ring flange 300 protrudes essentially coaxially to the drive shaft 382, respectively rotating spindle 310 from a transverse wall 296. The wall 296 is arranged in the region of the housing 254 where it is releasably connected to the sub housing 284.

A retaining sleeve 326a is rotationally rigidly connected to the transverse wall 296 radially outwards relative to the ring flange 300. The rotationally rigid connection is realized by screwing one end of the retaining sleeve 326a to the transverse wall 296. The retaining sleeve 326a extends up to its end, which faces away the transverse wall 296. The retaining sleeve 326a is rotationally supported relative to a guide sleeve 330 on this said end via a ball bearing 258. A second spiral spring 332 is wound up on the outsides of both the retaining sleeve 326a and also the guide sleeve 330.

The guide sleeve 330 extends to a housing cover 334 through which the actuating element 260 is passed. The guide sleeve 330 exhibits longitudinal guides 497 running in the regulating direction 482 and in which guide elements 498 engage. The guide elements 498 protrude outwards radially from the spindle head 340.

In the region of the longitudinal guides 497, the guide sleeve 330 is inserted into a ring flange 336, which protrudes from an inner side of the housing cover 334. A clamping sleeve 499 is rotationally supported by suitable bearings on an external side of the ring flange 336 and on an external side of the retaining sleeve 326. The clamping sleeve 499 is releasably connected at its end facing the drive device 290 by screwing to a toothed ring 491. The toothed ring 491 exhibits inner teeth as tooth system 493, which engages the gearwheels 362a, 362b. The gearwheel 362a can be rotated by a first electric motor 364a and the other gearwheel 362b by a second electric motor 364b. The electric motors 364 are preferably stepper motors.

In order to be able to accommodate the appropriate electric motor 364 at a convenient point within the housing 254, the electric motor 364 can be drive-connected to a clamping sleeve 499 from which a dog 495 protrudes radially inwards which can be motion-connected to essentially one end of the second spiral spring 332. Due to the arrangement of the clamping sleeve 499, the electric motor 292 can be located remotely with respect to the second spiral spring 332. Here, the arrangement is preferably realized such that a space available in the housing 254 is optimally used.

In order to be able to arrange the actuating device 250 suitably compact and with small outer dimensions, the clamping sleeve 499 can be rotationally supported on an external side of the retaining sleeve 326 and on an external side of a ring flange 336 which engages in the housing 254, whereby the ring flange 336 protrudes from an inner side of a housing cover 334.

A simple type of drive connection between the electric motor 364a and clamping sleeve 499 can be seen in that the electric motor 364a drives a gearwheel 362a, which engages teeth on especially one end of the clamping sleeve 499.

In order to achieve redundancy also in connection with the drive of the clamping sleeve 499, another electric motor 364b can be arranged, especially diametrically opposed to the first electric motor 364a, through which a gearwheel 362 that meshes with the teeth can be driven. In this way the clamping sleeve 499 can be alternatively driven by the first or second electric motor 364a, 364b and especially with the failure of one electric motor the other one is used.

A dog 495 protrudes radially inwards approximately centrally to the clamping sleeve 499 and the dog 495 can be coupled to one end of the second spiral spring 332, so that, depending on the rotation of the rotating sleeve 496, the second spiral spring 332 can be wound up more or less on the retaining sleeve 326 and the guide sleeve 330.

A torsion spring 366 is arranged between the clamping sleeve 499 and ring flange 336. The spring 366 can be clamped between the ring flange 336 and the rotating sleeve 496 when the clamping sleeve 499 is rotated for winding up the second spiral spring 332.

The following describes the function of the dual redundant actuator 480 in accordance with FIGS. 19-23.

Since the servomotors 292a, 292b are mounted on the drive shaft 382, they can be used singly as well as in combination. Single application occurs especially when one of the servomotors 292a, 292b is to replace the other one. Common actuation of both servomotors 292a, 292b is especially then provided when a higher torque is to be transferred onto the drive shaft 382, which may amount to twice the torque, which can be transferred by one servomotor.

Both servomotors 292a, 292b are connected via separate feed cable connections 487, 488, and the partially illustrated connection line 489, to their respective motor control devices 484, 486. One of the servomotors 292a, 292b, or both motors, can be actuated and controlled via these control devices and separate electrical supplies to the motor control device 484, 486 and also to the servomotors 292a, 292b.

The motor control devices 484, 486 are especially formed in that one of the servomotors 292a, 292b is wired as the master and the other as the slave and synchronization of both motors to the common drive of the drive shaft 382 occurs by software.

The electric motors 364a, 364b formed as stepper motors, are also arranged double in order to substitute one of the stepper motors with failure, damage or a similar condition. Also in this case, the control of the stepper motors 364a, 364b occurs independently of one another over dedicated feed cables 487, 488 and dedicated motor control devices 484, 486.

Through the use of at least two electric motors 292a, 292b, it is ensured that with the failure of one motor, the other one continues to drive the drive shaft 382 in order to move the rotating spindle 310 and the actuating element 260 appropriately in the regulating direction 482. All other parts of the actuating device 250 are present in the usual numbers and only the number of electric motors 292 is doubled. According to the invention, a second drive shaft is also not needed on which the second electric motor acts and through which it controls the rotating spindle 310 and actuating element 260. As a consequence, overall the actuating device 250 according to the invention is in its dimensions essentially unchanged with respect to the previously described actuating device 250. Alternatively, both motors 292 are used simultaneously, if, for example, a higher driving force is needed.

If due to the failure of both stepper motors 364a, 364b, a release of the second spiral spring 332 is not possible, the release of the spiral spring 332 occurs through the torsion spring 366, which was tensed on winding up the second spiral spring 332 for the rotationally rigid connection of the guide sleeve 330 and retaining sleeve 326a between the clamping sleeve 499 and the ring flange 336.

Otherwise the actuating device 250 according to the invention functions as follows:

The ball nut 306 is rotated through the rotating sleeve 496 by rotating the drive shaft 382. Since the ball nut 306 is fixed in the axial direction relative to the housing 254, the rotating spindle 310 is displaced in the regulating direction 482 when the ball nut 306 is rotated. The actuating element 260 is also displaced at the same time as the rotating spindle 310, because the actuating element 260 is connected to the rotating spindle 310 via the spindle head 340. The displacement of the actuating element 260 can be measured via the position sensor 295.

In order to obtain a bearing mechanism of high quality and high efficiency which is at the same time reversible in its movement in a simple manner, the rotating sleeve 496 can be driven by a drive shaft via a transmission device 494, the rotating sleeve 496 being rotationally rigidly connected to a ball nut 306 of a feed device 314, whereby the rotating spindle 310 formed as a recirculating ball spindle for movement in the regulating direction is rotationally supported in the ball nut

306. In this way the drive force of the electric motors 292 is transferred to the ball nut 306 via the rotating sleeve 496. The ball nut 306 rotates together with the rotating sleeve 496 and with the suitable rotation the recirculating ball spindle 310 is moved in the regulating direction 482 and consequently also the actuating element 260. It is also possible that instead of the previously described ball screw drive, a roller screw drive is analogously applied.

The force applied to the actuating element 260 from the direction of the control device 484, 486, which is not illustrated, in the opposite direction to the regulating direction 482 is transferred via the first spiral spring 318 from the rotating sleeve 496 to the ring flange 300 and therefore to the housing 254.

For resetting the actuating element 260 in the opposite direction to the regulating direction 382, the second spiral spring 332 is released via the dog 495, the spiral spring 332 holding the guide sleeve 330 with the retaining sleeve 326a rotationally rigid in the direction opposite to the feed rotational direction. With the second spiral spring 332 released, the guide sleeve 330 can rotate in the direction opposite the feed rotational direction, whereby the rotation onto the guide sleeve 330 is transferred via the guide elements 497 of the spindle head 340 corresponding to the reverse rotation of the rotating spindle 310.

Figure 22:
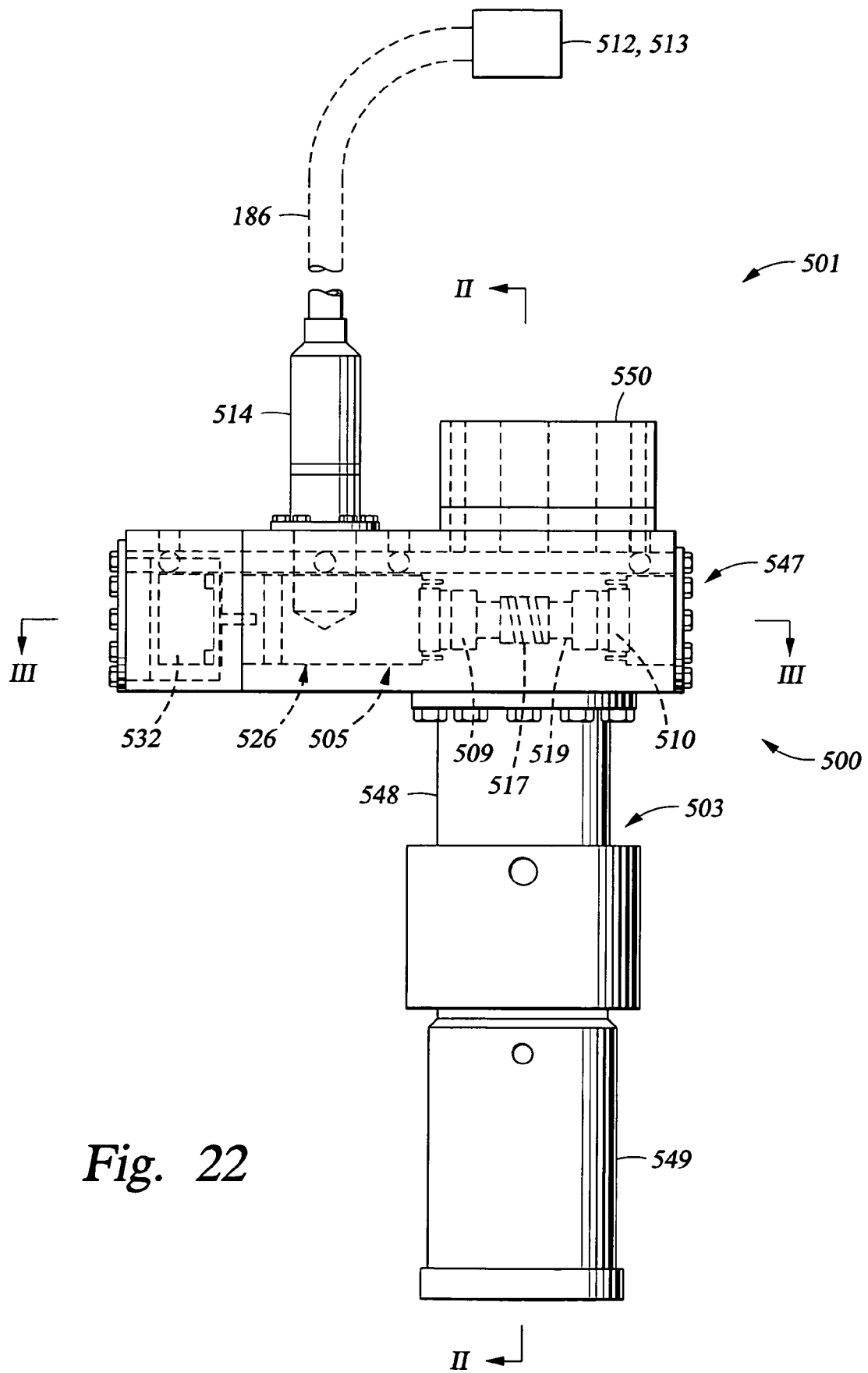
FIG. 22 shows a plan view onto a first embodiment of an isolating device.

Referring now to FIG. 22, there is shown another electrical device 46, namely an electrically-actuated injection valve 500 having isolation device 501 and an injection valve 502 as is described in U.S. patent application Ser. No. 10/415,696, filed Oct. 30, 2001 and entitled Isolating device which claims the benefit of PCT/EP01/12548 filed Oct. 30, 2001, which claims the priority of DE 200 18 562.4 filed Oct. 30, 2000, all of which are hereby incorporated by reference herein in their entirety. The isolation device 501 comprises a device housing 503 constructed of various interconnected sub-housings 547, 548, 549 and 550. Sub-housing 547 encloses a drive device 505 including two electric motors 509 and 510 arranged at both ends of a worm shaft 519 on which a worm 517 is provided. Sub-housing 547 may also comprise an emergency release device 526 that can be actuated by another electric motor 532. Connection 514 and a connecting line 186 connects motors 509 and 510 with remotely arranged control devices 512 and 513 or controller 112. The electric motors 509, 510, 532 may be powered by either DC or AC voltage, preferably DC voltage.

Figure 23:
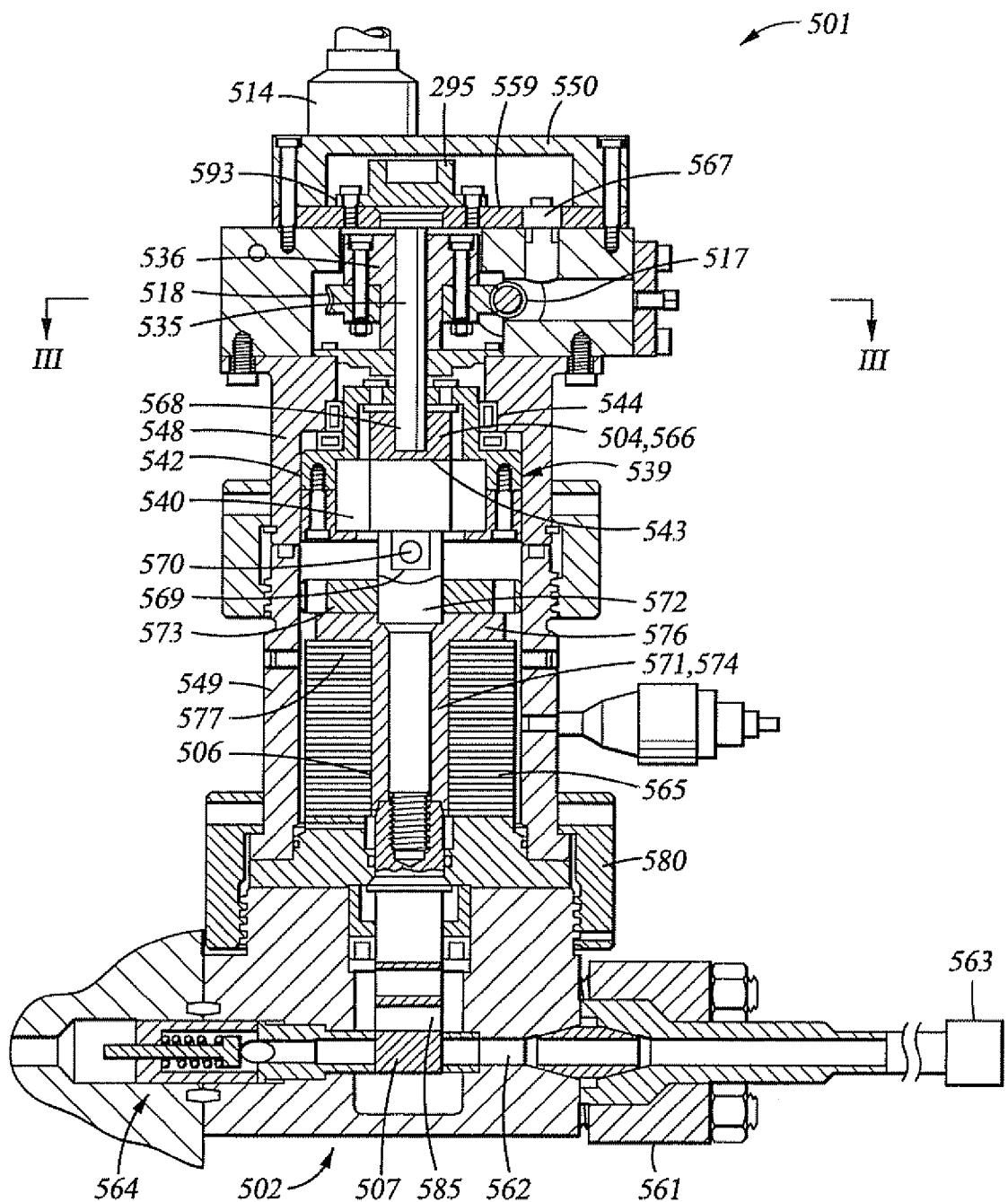
FIG. 23 shows a section along the line II-II of FIG. 22 with a partially represented injection valve.

Referring now to FIG. 23, a section along the line II-II of FIG. 22 is shown, including the injection valve 502 with a corresponding injection valve housing 561. Injection valve 502 is attached to isolating device 501 by threaded sleeve 580 and comprises a connection line 562 providing fluid communication between a fluid pump 563 and a ball valve of valve arrangement 564. An isolation stop valve 507 engages the connection line 562, such that the connection between the pump 563 and the valve arrangement 564 is interrupted. Shifting the isolation stop valve 507 out of the isolating device 501 moves slider opening 585 of the isolation stop valve 507 into connection line 562 and allows fluid communication through the connection line 562.

The isolation stop valve 507 is arranged at the end of an operating element 506 that is arranged within a piston housing 571 and connected to a shaft section 572. The piston housing 571 comprises a radially extending end flange 576 that supports one end 577 of a spring arrangement 565. Spring arrangement 565 urges operating element 506 into a starting position 574, in which the end flange 576 is adjacent to a locknut 573 screwed into the sub-housing 549.

Sub-housing 549 is connected to sub-housing 548, which encloses a screw 539. Screw 539 is formed of a screw nut 540, in this case a revolving roller nut, and the turning spindle 504, forming together a planetary roller screw. At its end 569 facing the operating element 506, the turning spindle 504 is inserted into a hole at the end 570 of the operating element 506 or the shaft section 572, respectively, and held therein by means of a bolt. The screw nut 540 is rotatable, but axially fixed within bearing sleeve 542.

Opposite to the end 569, the turning spindle 504 projects with its other end 543 from the screw nut 540 and is there also surrounded by a section of the lower-diameter bearing sleeve 542. At the outside of this section, the bearing sleeve 542 is rotatably mounted to sub-housing 548 by needle bearing 544. A bearing shaft 535 passes through the bearing sleeve 542, the end 568 thereof being inserted in the end 543 of the turning spindle 504 and being stationarily held therein. In FIG. 23, the turning spindle 504 is represented in its starting position 566, i.e. as far as possible inserted through the screw nut 540 in the direction away from the injection valve 502.

The bearing shaft 535 is arranged in a bearing sleeve 536, which is connected to a worm wheel 518 via a spline connection. The worm wheel 518 is a globoid worm wheel and engaged with worm 517. The bearing sleeve 536 is rotatably mounted in the sub-housing 547 via needle bearings 544. The end of the sub-housing 547 that is opposite to the sub-housing 548 is detachably sealed by an end plate 559. Sub-housing 550 is detachably connected to end plate 559 and encloses positioning sensor 295. End plate 559 also includes electrical passages 567 to provide electrical connection between connection 514 and devices within sub-housing 547. A connecting line 186 connects the subsea power source 102 to electrically-actuated injection valve 500.

Figure 24:
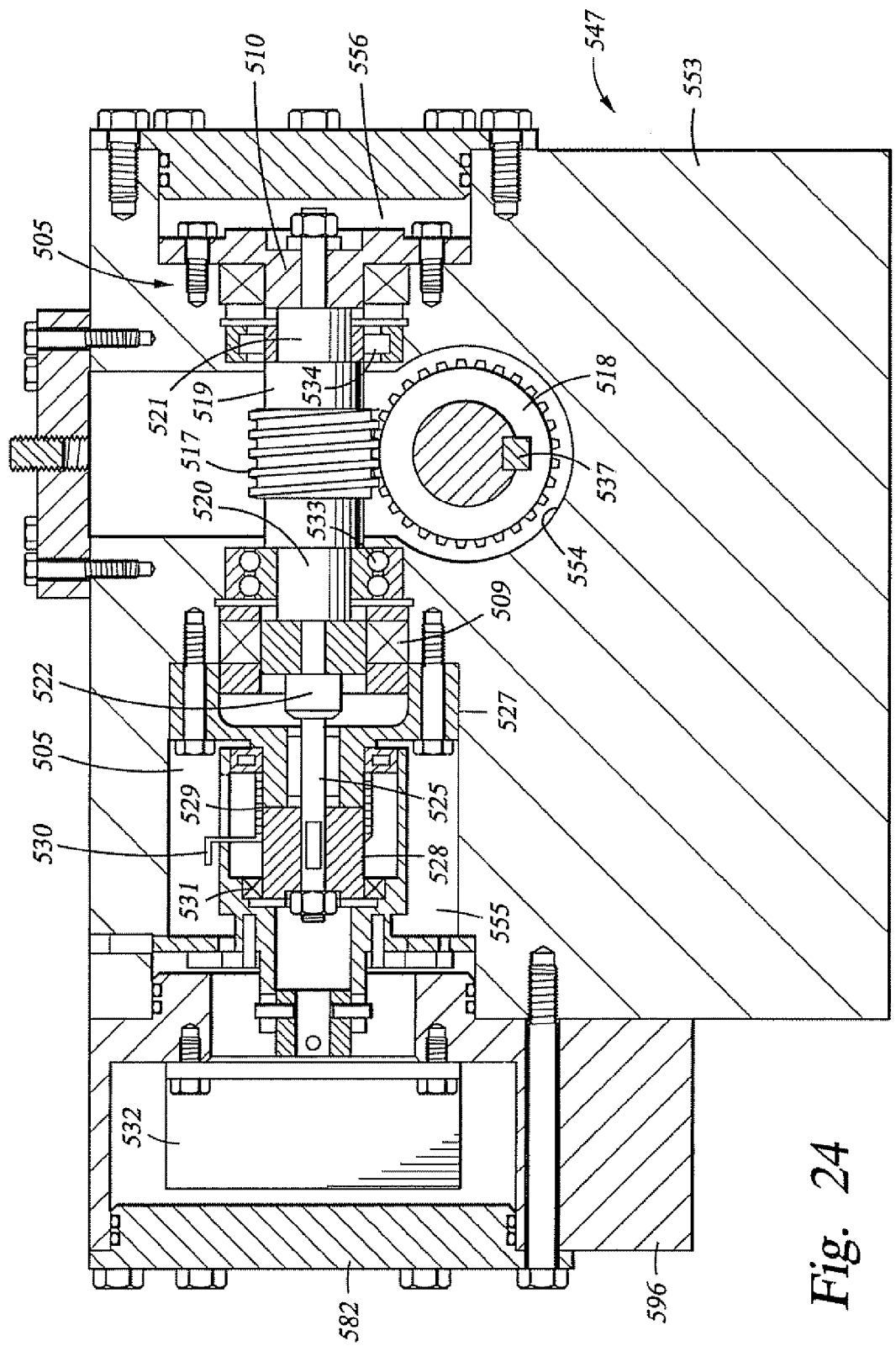
FIG. 24 shows a section along the line III-III of FIG. 22 or FIG. 23, respectively.

Referring now to FIG. 24, a section along the line III-III of FIGS. 22 and 23, respectively, is represented. The sub-housing 547 is essentially formed of a central body 553 in which a central bore 554 is formed. In this bore, the bearing sleeve 536 of FIG. 23 is rotatably mounted. The worm wheel 518 is stationarily connected to the bearing sleeve 536 via the splined shaft connection 537 in the form of a ratchet. The same is engaged with its external gearing in a corresponding external gearing of the worm 517. The worm 517 is arranged on a worm shaft 519, which extends approximately tangentially to the central bore 554.

Shaft ends 520, 521 of the worm shaft 519 are rotatably mounted by means of a ball bearing 533 or a roller bearing 534, respectively. An electric motor 509, 510 of the drive device 505 is associated to each of the ends 520, 521 of the worm shaft 519. The electric motor 509 is directly actively connected with the shaft end 520 or a motor shaft 522, respectively, and is detachably mounted in motor opening 555 in the central body 553. The other electric motor 505 is also detachably held in a motor opening 556. A synchronous operation of both electric motors 505, 509 can be effected with software with at least one electric motor as master and the other electric motor as slave to provide high torque and high rotational speeds that can be transmitted by the corresponding gearbox unit.

One end 525 of the motor shaft 522 extends beyond the electric motor 509 along a narrowed section of the supporting sleeve 527. The motor shaft 522 extends beyond the supporting sleeve 527 into a spacing sleeve 528 that is connected to the supporting sleeve 527 via a volute spring 529 that limits the rotation of the spacing sleeve relative to the supporting sleeve to one direction. With one of its ends 530, the volute spring 529 engages a release sleeve 531, which is rotatably mounted with respect to the spacing sleeve 528 and the supporting sleeve 527. The release sleeve 531 is actively connected to a drive shaft of a stepper motor 532 that is arranged in a side housing 596 in the extension of the motor opening 555. The side housing 596 is detachably sealed by a cover 582.

Figure 25:
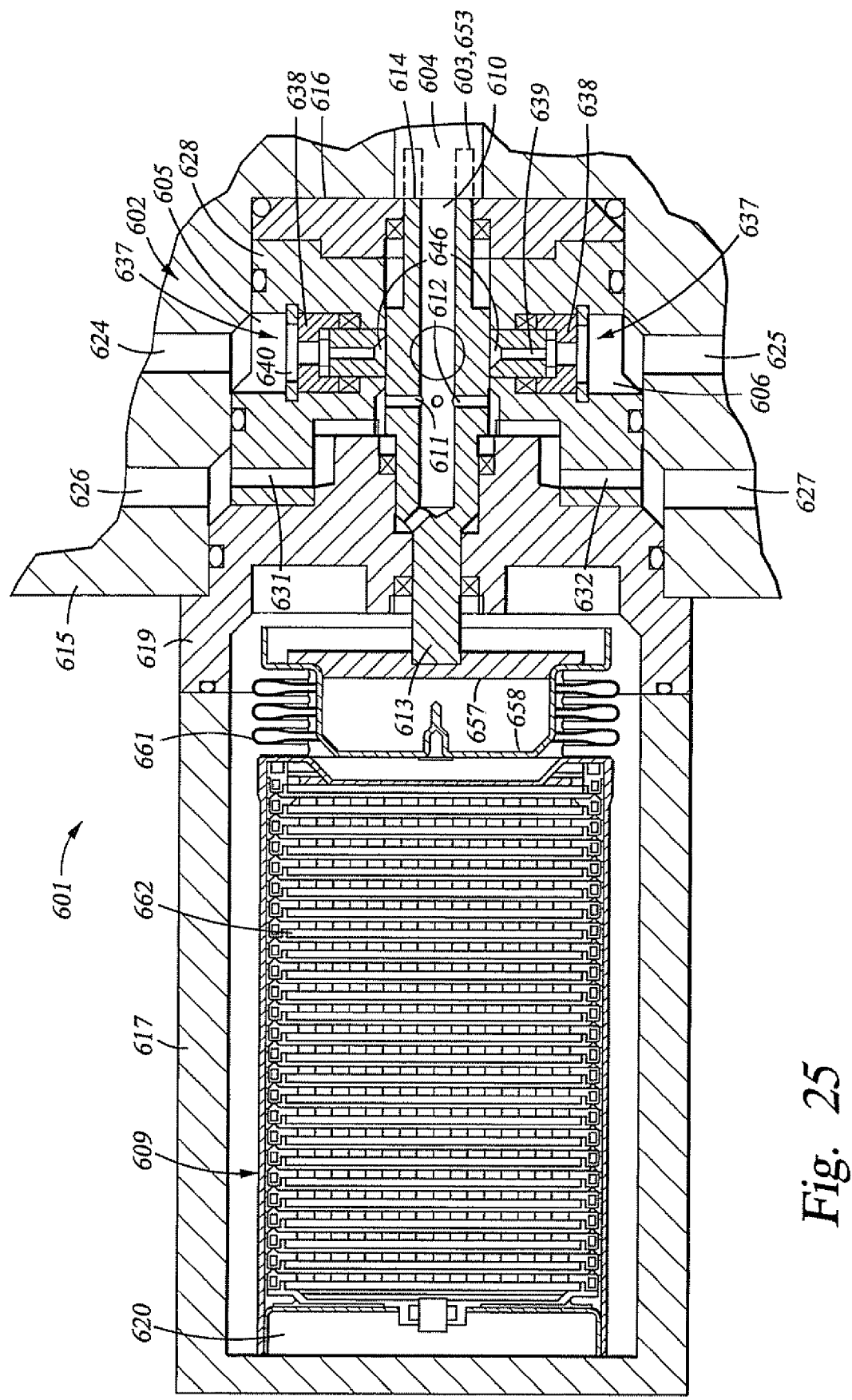
FIG. 25 shows a longitudinal section through a specific embodiment of a valve system in accordance with embodiments of the invention, having a valve and associated electrochemical actuator.

Referring now to FIG. 25, there is shown another electrical device 46, namely a longitudinal section through a specific embodiment of a valve system 601 as described in U.S. patent application Ser. No. 10/467,112 filed Oct. 30, 2001 and entitled Valve System, which claims the benefit of PCT/EP01/12550 filed Oct. 30, 2001, which claims priority from DE 20012168.4, filed Feb. 8, 2001, all of which are hereby incorporated by reference herein in their entirety. Valve system 601 comprises a valve body 602 and a longitudinal slide 603 disposed within a valve holding recess 616 of a valve block 615. An electrochemical actuator 609 is associated with longitudinal slide 603 of the valve system 601.

Electrochemical actuator 609 has a gas generator 662, that generates a gas, and, in particular, hydrogen, when an electric charge is supplied via corresponding feed lines. The electric charge is supplied by connecting lines to subsea voltage source 102. The electric supply may be either DC or AC voltage, preferably DC voltage. The generated gas generates an over-pressure in the interior of the gas generator 662 and a discharge element 658 of the actuator may be displaced in the direction of the valve block 615 via this over-pressure. The discharge element 658 is connected with the gas generator 662 via a bellows element 661.

The discharge element 658 is releasably connected with a holding plate 657 at the end of the discharge element turned away from the gas generator 662. The longitudinal slide 603 is releasably attached to the middle of the holding plate 657 and is movably mounted in the housing cover 619. A connecting end 613 of the longitudinal slide 603 projects into the interior 620 of the housing 617 and there is attached to the holding plate 657. The longitudinal slide 603 extends from its connecting end 613 up to its inlet end 614 that is associated with the feed line 604 in a bottom of the valve holding recess 616.

Valve block 615 has inlet channels 624, 625 and outlet channels 626, 627. Fluid communication between longitudinal bore 610 and inlet channels 624, 625 and outlet channels 626, 627 is controlled by the linear position of longitudinal slide 603. In FIG. 25 the longitudinal slide 603 is shown in its outlet position, in which the feed line 604 is in fluid communication with outlet channels 626, 627 via longitudinal bore 610 and connecting lines 611, 612 of slide 603 and channels 631, 632 of central body 628.

The longitudinal slide 603 is moved to a fluid feed position 653 (see the dashed line representation in FIG. 25) by the electrochemical actuator 609. In the fluid feed position 653, connecting lines 611 and 612 of longitudinal slide 603 align with annular channel 646 of throttle element 637. Throttle element 637 comprises a throttle component 638 having a middle bore 639 and a guide body 640. Throttle element 637 provide fluid communication between feed line 604 and inlet channels 625, 626 via connecting lines 611, 612.

Hydrogen is generated in the electrochemical actuator 609 by means of an electric charge. The discharge element 658 is discharged with the holding plate 657 in the direction of the feed line 604 by means of the corresponding over-pressure. Analogously, there is a displacement of the longitudinal slide 603 into the fluid feed position 653. A connection is made in the latter between feed line 604 via longitudinal bore 610 and connecting line 611, 612 to the inlets 605, 606 and via the latter to the inlet channels 624, 625. Hydraulic fluid is fed to the actuation device in this fluid feed position 653.

Figure 26:
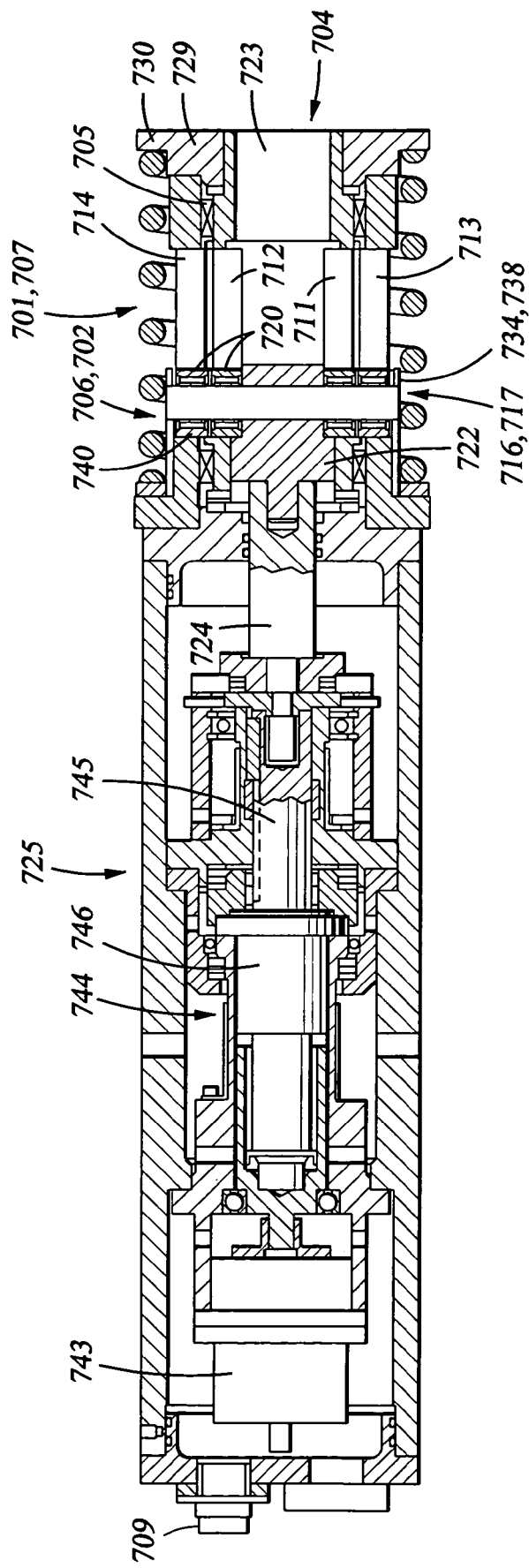
FIG. 26 shows a longitudinal sectional view through a rotary adjusting device in accordance with embodiments of the invention, which is removably connected to an actuator device.

Referring now to FIG. 26, another electric device 46 is shown, namely a longitudinal sectional view through a rotary adjusting device 701 as described in U.S. patent application Ser. No. 10/415,511, filed Oct. 30, 2001 and entitled Rotating Regulating Device which claims the benefit of PCT/EP01/12554 filed Oct. 30, 2001, which claims the benefit of DE 200 18 548.9 filed Oct. 30, 2000, all of which are hereby incorporated by reference herein in their entirety. The rotary adjusting device 701 is designed as an installed module 707 and flange mounted to an actuator device 725. Actuator device 725 comprises at least one electromotor 743 that drives a ball screw 744, with a ball nut 746 that can be turned by the electromotor 743. Turning the ball nut 746 causes a recirculating ball spindle 745 of the ball screw 744 to be repositioned in the longitudinal direction of the actuator device 725. An operating element 724 which is connected to the recirculating ball spindle 745 is repositioned accordingly, and thus likewise a feed element 722 of the rotary adjusting device 701. The electric motor 743 may be powered by either DC or AC voltage, preferably DC voltage. A connecting line 186 may extend to connector 709, which is connected to motor 743.

The feed element 722 is mounted in a longitudinal bore 723 of a rotary sleeve 704 of the rotary adjusting device 701 in such a way that it can be shifted. The rotary sleeve 704 is rotatably mounted in the interior of a bearing sleeve 705 that is removably attached to the actuator device 725. The rotary sleeve 704 is mounted so that it can rotate but cannot shift axially relative to the bearing sleeve 705.

To translate the linear motion of the operating element 724 into a rotary motion of the rotary sleeve 704 relative to the bearing sleeve 705, a transmission 706 is positioned between the two as an activating device 702. The transmission 706 comprises the feed element 722, a meshing pin 717 as meshing element 716, ball or roller bearings 720, and guide slots 711, 712 in the rotary sleeve 704 as well as guide slots 713, 714 in the bearing sleeve 705.

Figure 27:
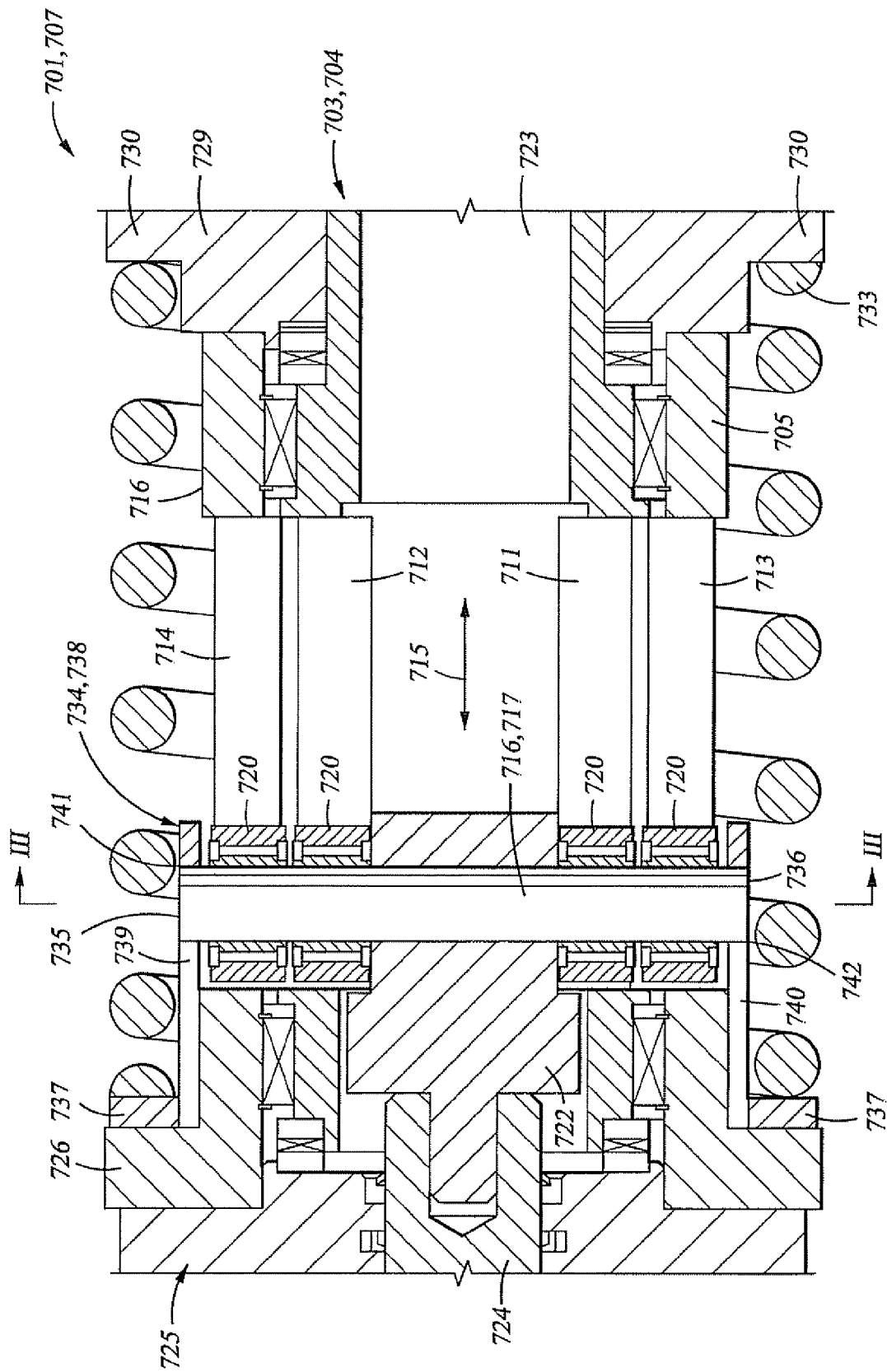
FIG. 27 shows an enlarged illustration of the exemplary implementation of the rotary adjusting device in accordance with embodiments of the invention as shown in FIG. 26.

As shown in FIG. 27, guide slots 713, 714 of the bearing sleeve 705 run in a straight line in the longitudinal direction 715, whereas the guide slots 711, 712 in the bearing sleeve 705 run diagonally to the longitudinal direction 715 and in particular in a spiral pattern. The meshing pin 717 engages longitudinal slots 739, 740 of a spring bearing sleeve 734 with its outermost ends 735, 736. These longitudinal slots are open in the direction of the ring flange 726 of the bearing sleeve 705. In the area of the ring flange 726 the spring bearing sleeve 734 also has a terminating flange 737, which is in contact with the ring flange 726 when the spring bearing sleeve 734 is in the end position 738 shown in FIG. 26. Between the terminating flange 737 and the ring flange 730 of the closing ring 729 there is a compression spring as spring element 733. This applies pressure to the activating device 702 of the rotary adjusting device 701 counter to the adjustment direction of the operating element 724.

Moving the feed element 722 in the direction of the closing ring 729 by means of the operating element 724 of the actuator device 725 causes the meshing pin 717, as the meshing element 716, to move along the guide slots 711, 724 to their ends which are toward the closing ring 729. At the same time the meshing pin 717 moves along the linear guide slots 713, 714 of the bearing sleeve 705, which is firmly connected to the actuator device 725. Because of the spiral form of the other guide slots 711, 712 of the rotary sleeve 704, when the meshing pin 717 is moved along the guide slots 713, 714 and because the meshing pin 717 at the same time engages the guide slots 711, 712, the rotary sleeve 704 is rotated by a corresponding angle. The angle of rotation then comes from the oblique path of the guide slots 711, 712 relative to the guide slots 713, 714.

To support a return of the adjusting element 703 into the end position of the spring bearing sleeve 734 shown in FIGS. 25 and 27, there is a compression spring 733 between the ring flange 730 of the closing ring 729 and the terminating flange 737 of the spring bearing sleeve 734. The spring bearing sleeve 734 is carried along when the meshing pin 717 is moved in the direction of the closing ring 729; the ends 735, 736 of the meshing pin are in contact with ends 741, 742 of the longitudinal slots 739, 740 which are formed in the spring bearing sleeve 734.

Figure 28:
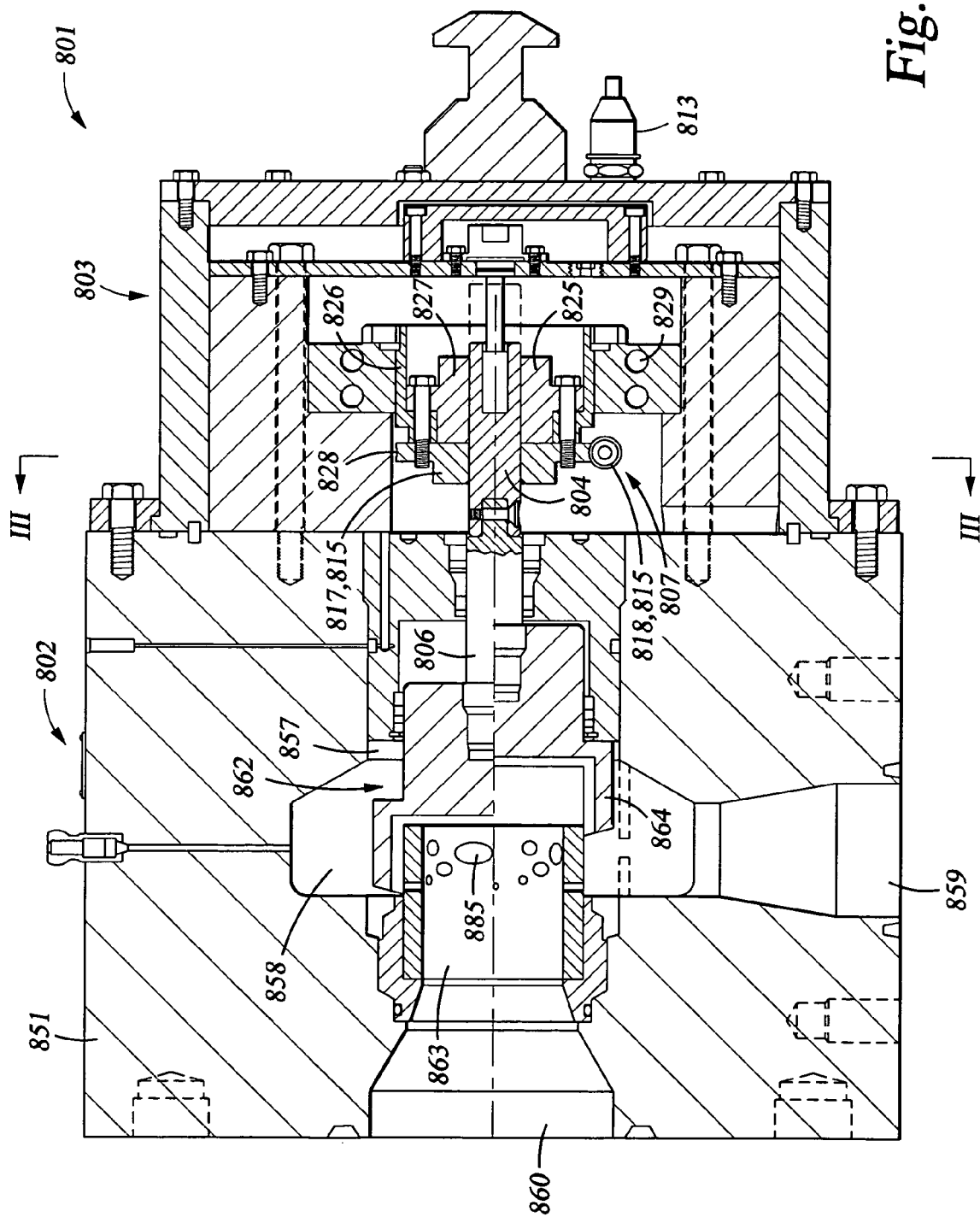
FIG. 28 shows a longitudinal section of an actuating device according to embodiments of the invention comprising a throttle device from the side of a fluid inlet.

Referring now to FIG. 28, there is shown another electrical device 46 namely an actuating device 801 in accordance with U.S. patent application Ser. No. 10/415,418, filed Sep. 4, 2003 and entitled Actuating Device, which claims the benefit of PCT/EP01/12549 filed Oct. 30, 2001, which claims the priority of DE 200 18 563.2 filed Oct. 30, 2000, all of which are hereby incorporated by reference herein in their entirety. Actuating device 801 is shown enclosed in a device housing 803 that is connected to a throttle device 802 including a throttle housing 851 having a fluid inlet 859 and fluid outlet 860. Electrical connector 813 connects actuating device 801 to the remotely disposed control and actuation assembly 80 by means of electrical connecting lines 186 for supplying power to electric motors 508, 509 powered by either DC or AC voltage, preferably DC voltage.

Throttle device 802 further comprises a throttle space 858 that is located between the fluid inlet 859 and the fluid outlet 860 and contains a passage sleeve 863 having a number of passage openings 885 therethrough. Opposite the fluid outlet 860 extends a throttle element bore 857 in the throttle housing 851, in which a throttle element 862 is mounted so as to be displaceable in an axial direction. Throttle element 862 includes throttle sleeve 864 that is axially disposable between a position covering passage opening 885 and a position not covering passage openings, so as to control the flow of fluid between fluid inlet 859 and fluid outlet 860. The axial displacement of throttle element 862 is controlled by actuating element 806.

Actuating element 806 is connected to a turning spindle 804 that is displaced by rotating a thread nut 825 in which the turning spindle is rotatably mounted as recirculating ball screw or recirculating roller spindle. The turning spindle 804 and the thread nut 825 (ball nut or roller nut) form a part of a transmission device 807, via which the actuating element 806 is functionally connected for adjustment purposes.

Figure 29:
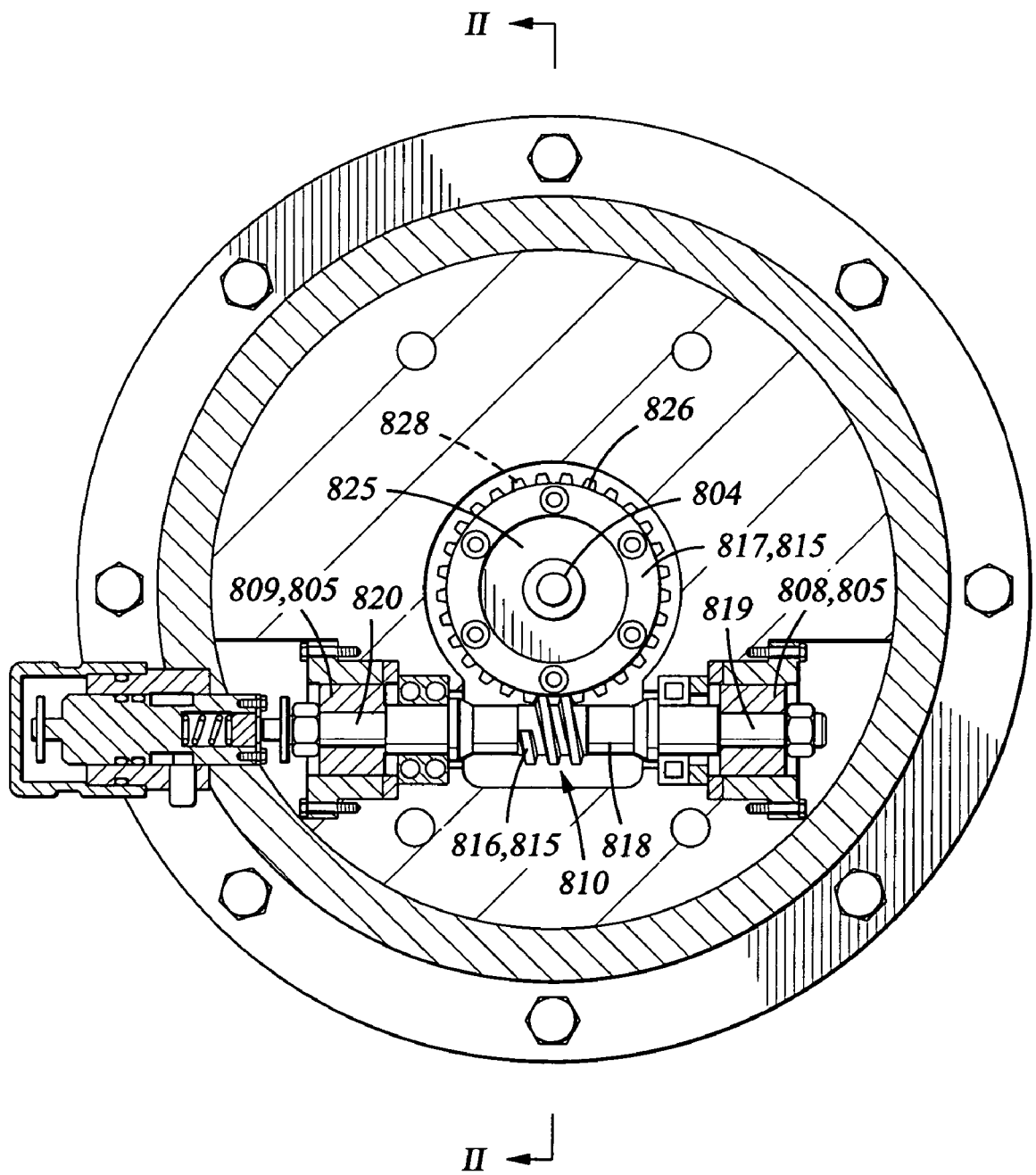
FIG. 29 shows a section along line III-III from FIG. 31.

The thread nut 825 is held in a bearing sleeve 826 in manner secured against rotation and is rotatable via the axial bearing 829. At one end 827 of the thread nut 825 facing the actuating element 806, an outer toothing 828 is arranged, which is formed by a worm gear 817 forms part of a worm gear pair 815 and engages with its toothing 828 a corresponding outer toothing of a worm 816 as additional part of the worm gear pair 815 (also see FIG. 29).

The worm gear 817 in the exemplary embodiment according to the invention is formed by a globoid worm wheel, the outer toothing of which is engaged by a corresponding outer toothing of a cylindrical worm 816. The worm 816 is arranged as an additional part of the worm gear pair 815 on a worm shaft 818. The worm 816 and the worm gear 817 form a transmission unit 810 as part of the transmission device 807 whereby such transmission unit 810 forms a self-locking transmission unit. By means of its two shaft ends 819, 820 the worm shaft 818 is releasably connected with electric motors 808, 809 forming a drive device 805 of the actuating device 801. The electric motors 808, 809 are servomotors, especially direct current servomotors.

Thus, the actuating device 801 comprises an electric drive device formed by two servomotors 808, 809. Such servomotors 808, 809 are remotely controllable via corresponding connecting lines and their control devices 811, 812. When actuating one motor or both motors in synchronous operation, such motors drive the worm shaft 818 and thus the worm 816. Such worm 816 is engaged with the appertaining worm gear 817. The worm and the worm gear form a self-locking worm gear pair being locked at least oppositely to the feed direction of the turning spindle 804 in the direction of the throttle device. The self-locking state of the worm gear pair can only be released by applying a release torque from the servomotors 808, 809.

Especially in interaction with the roller thread as additional part of the transmission device 807, the worm gear pair easily results in a high gearing and allows the transmission of a high torque. The gearing can be selected, according to desire, by correspondingly selecting the worm, worm gear, thread nut and turning spindle. When the thread nut 825 directly connected with the worm gear in a manner secured against rotation is rotated, the turning spindle 804 is correspondingly extended in the direction of the actuating device or is retracted in the opposite direction. Connected with the turning spindle 804 is the actuating element 806 at the free end of which a corresponding throttle element is disposed. The actuating element with the throttle element engage the throttle housing adjacent to the actuating device 801, where they serve to vary the fluid passage between the fluid inlet and the fluid outlet.

Figure 30:
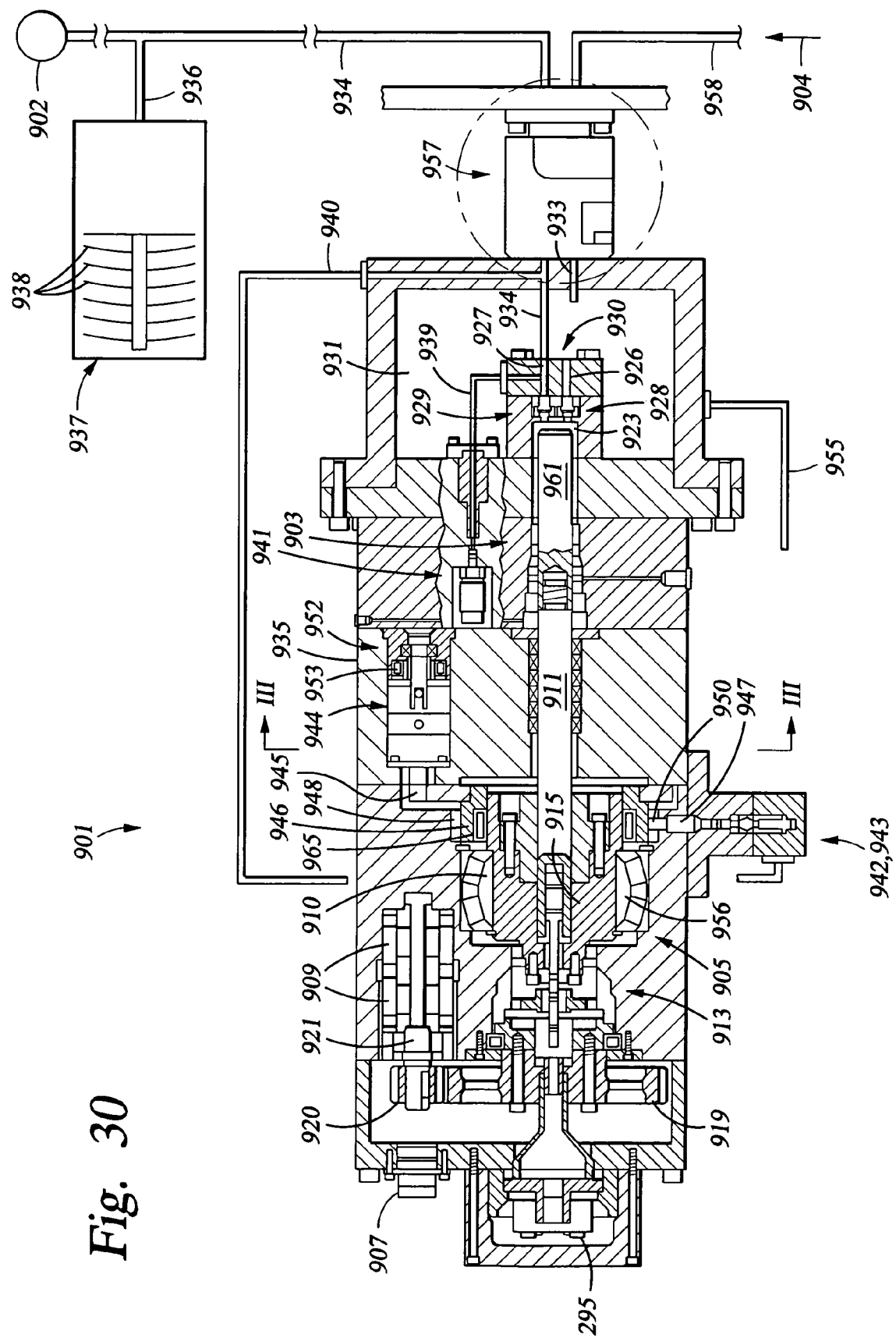
FIG. 30 is a longitudinal section through an embodiment of a pump device.

Referring now to FIG. 30, there is shown still another electrical device 46 namely an actuating device for a subsea valve in accordance with German patent application No. DE 203 11 033 filed Jul. 17, 2003 and entitled Pump Device, hereby incorporated herein by reference. In FIG. 30 a longitudinal section through one embodiment of an inventive pump device 901 is illustrated. Pump device 901 includes electrically operated driving device 905, which is made up of a rotatable but axially non-movable mounted spindle nut 910 and an axially movable, but non-rotating threaded spindle 911. Spindle nut 010 is fixed to rotary socket 915 that is rotatably mounted inside a pump housing 935 by means of a set of angular roller bearings.

The rotary socket 915 is connected to a harmonic transmission 913 that is driven by gear 919. Gear 919 engages gear 920 that is rigidly arranged on a drive shaft 921 that is turned by two electric motors 909 in the form of a synchronous or asynchronous motors. The electric motors 909 may be powered by either DC or AC voltage, preferably DC voltage. Operating motors 909 turn gear 920, which engages and rotates gear 919 and rotary socket 915 through harmonic transmission 913. The rotation of rotary socket 915 also rotates spindle nut 910, which causes axial translation of threaded spindle 911. Position sensor 295 may monitor the axial position of threaded spindle 911. A connector 907 connects the electric motors 909 with connecting lines 186 extending to a subsea power source 102.

The threaded spindle 911 is detachably connected to piston 961, which is mounted so as to be able to move axially within piston space 923 of piston cylinder unit 903. Piston space 923 has a cylinder base plate 930, in which an intake hole 926 and a discharge hole 927 are formed substantially parallel to one another. A non-return valve 928, which is spring-biased in the direction of the intake hole 926 is arranged on the side of the piston space 923 in front of the intake hole 926, similarly a non-return valve 929 which is spring-biased in the direction of the piston 961 is arranged on the side of the piston space 923 in front of the discharge hole 927.

If piston 961 moves to the left, the non-return valve 928 is opened by corresponding negative pressure in the piston space 923 and hydraulic fluid 904 enters the piston space 923 through the intake hole 926. If piston 961 moves to the right, the hydraulic fluid present in the piston space 923 is forced through the open non-return valve 929 into the discharge hole 927.

The intake hole 926 leads to a buffer tank 931, which substantially surrounds the cylinder base plate 930 and serves to store hydraulic fluid, which can be fed through a supply line 933. The supply line 933 may be connected to a hydraulic fluid supply line 958 by a snap-coupling mechanism 957. This snap-coupling mechanism 957 likewise serves to connect a discharge pipe 934, which extends from the discharge hole 927 through the buffer tank 931, and which is then led further in the direction of the valve 902.

The discharge pipe 934 has at least one branch feeder pipe 936 on its section running between the snap-coupling mechanism 957 and the valve 902, to which an accumulator 937 as pressure storage means for hydraulic fluid is attached. In the case of one embodiment this accumulator contains a number of Belleville springs 938, which are stacked in parallel and/or in series. The accumulator 937 works as pressure storage means due to the arrangement of the Belleville springs 938. By suitable dimensioning of the accumulator, valve and actual pump this can operate maintenance-free over a long period whereby due to the provision of the accumulator the pump can be intermittently operated.

As an example, assume a required pressure of approximately one kbar for valve 902. Pump device 901 is operable to generate a fluid pressure of 1.4 kbar. Therefore, accumulator 937 maintains hydraulic fluid at approximately 1.4 kbar. Thus, pump device 901 does not need to be operated until the pressure loss in the accumulator amounts to more than approximately 0.4 kbar. Only when the pressure drops to a value of less than 1.0 kbar will the pump begin to work again and recharge the accumulator.

In some embodiments, a safety relief valve 942 e.g., a subsurface safety valve, is provided to prevent pressure within pump device 901 from exceeding a pre-set limit. In the vicinity of the buffer tank 931 and/or the cylinder base plate 930 a first branch pipe 939 and a second branch pipe 940 branch off from the discharge pipe 934 and/or the discharge hole 927. The first branch pipe 939 extends as far as a pressure switch 941, which, depending on the pressure of the hydraulic fluid, transmits an electrical signal to an actuator 944. Actuator 944, as for example a step motor, has a drive shaft, at one end of which a pinion 945 is arranged, that engages with a cam disk 946, which is rotatably mounted by means of roller bearings 965 on an outer periphery 956 of the rotary socket 915. The cam disk 946 has gearing assigned to the pinion 945 as well as at least one control cam 948 with a control tappet 947 of a safety relief valve 942.

The safety relief valve 942 is designed as mechanically controllable non-return valve 943. Safety relief valve 942 is opened by control tappet 947 if roller 950 runs onto the control cam 948. Opening valve 942 allows fluid communication between second branch pipe 940 and return line 955, which leads to buffer tank 931. As a result no discharge to the environment takes place and equally there is no corresponding contamination or also feedback to a far away place as for example from the sea bed to the sea surface.

A reverse rotation device 952, such as a clockwork-similar coil or spiral spring 953, is assigned to the actuator 944. The reverse rotation device 952 is arranged such that in the event of failure of the actuator 944 and with the safety valve 942 open, the cam disk 946 is automatically turned back by the tension of the coil/spiral spring so that closure of the safety valve 942 is ensured both by the spring-bias of the valve element in the direction of the closed position and also in particular by the reverse torque of the coil/spiral spring as reverse rotation device 952.

Figure 31:
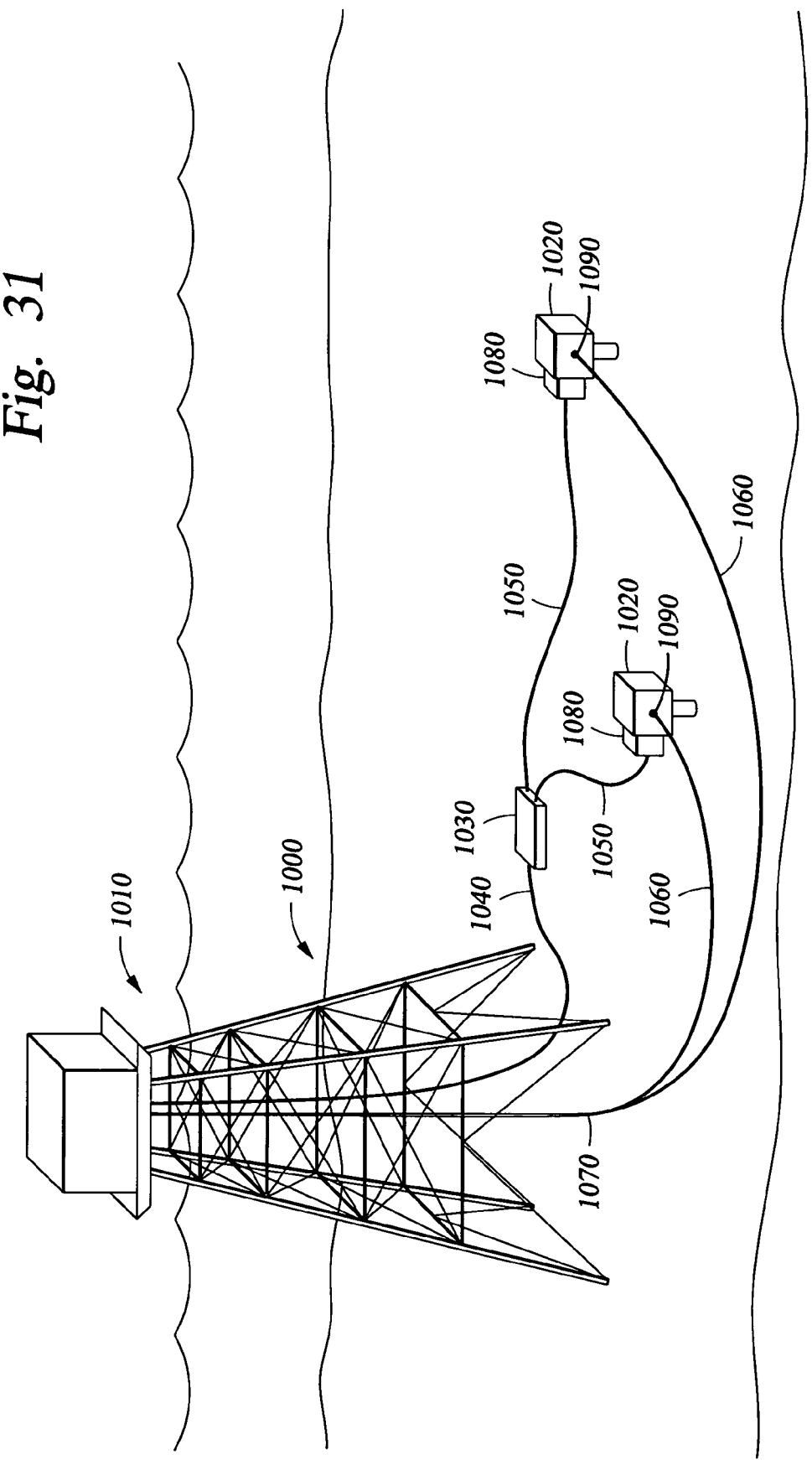
FIG. 31 shows a view of one embodiment of a subsea production system constructed in accordance with embodiments of the invention.

Referring now to FIG. 31, there is shown another embodiment of the present invention. An electrically controlled subsea production system 1000 includes a surface platform 1010 and one or more subsea trees 1020. Surface platform 1010 corresponds to the first location 42 as shown and described in reference to FIG. 1(c) and subsea trees 1020 correspond to the remote location 50 as shown and described in reference to FIG. 1(c). Subsea trees 1020 include electric control pods 1080 connected via electrical conductors 1050 from a subsea electrical distribution skid 1030 that is electrically coupled to surface platform 1010 via electrical control umbilical 1040, e.g., umbilical 68. Subsea trees 1020 also include production outlets 1090 that send production fluids through conduits 1060 and production riser 1070 to surface platform 1010. Subsea trees 1020 are preferably operated with only electrical control inputs from surface platform 1010 operating electrical devices 46, such as actuators, on the trees but may also include hydraulic and electro-hydraulic control systems when desired.

Figure 32:
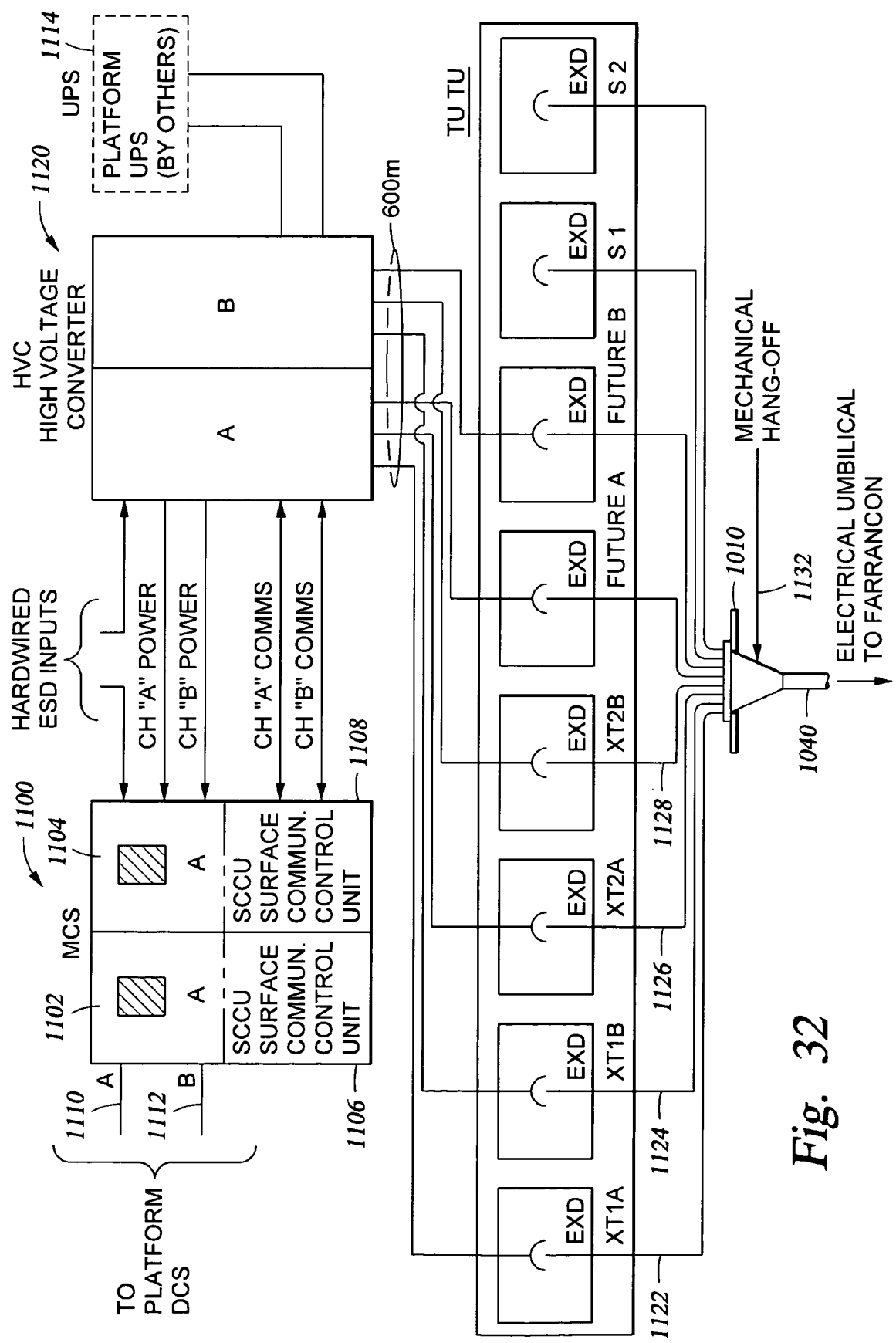
FIG. 32 is a schematic representation of one embodiment of the surface electrical equipment of the subsea production system of FIG. 31.

Referring now to FIG. 32, a schematic representation of some of the surface mounted components of production system 1000 are shown. Master control station 1100 includes a channel A 1102 and channel B 1104, each generated by a surface communication control unit 1106, 1108, respectively. Master control station 1100 communicates through connections 1110 and 1112, e.g. controller 76, with the platform control system and through hardwired and optically isolated interfaces with a high voltage converter 1120, e.g., converter 72. High voltage converter 1120 draws dual three-phase electrical power from platform uninterruptible power supply 1114, e.g., 78, and supplies isolated DC supply power to at least four conductors 1122, 1124, 1126, and 1128 within an electrical umbilical 1040, e.g., umbilical 68. Umbilical 1040 is connected to a mechanical hang off 1132 disposed on platform 1010.

Electrical umbilical 1040 carries electrical power and communication from platform 1010 to electrical distribution skid 1030. Umbilical 1040 may comprise at least eight high voltage coaxial cables that are manufactured in one continuous length.

Figure 33:
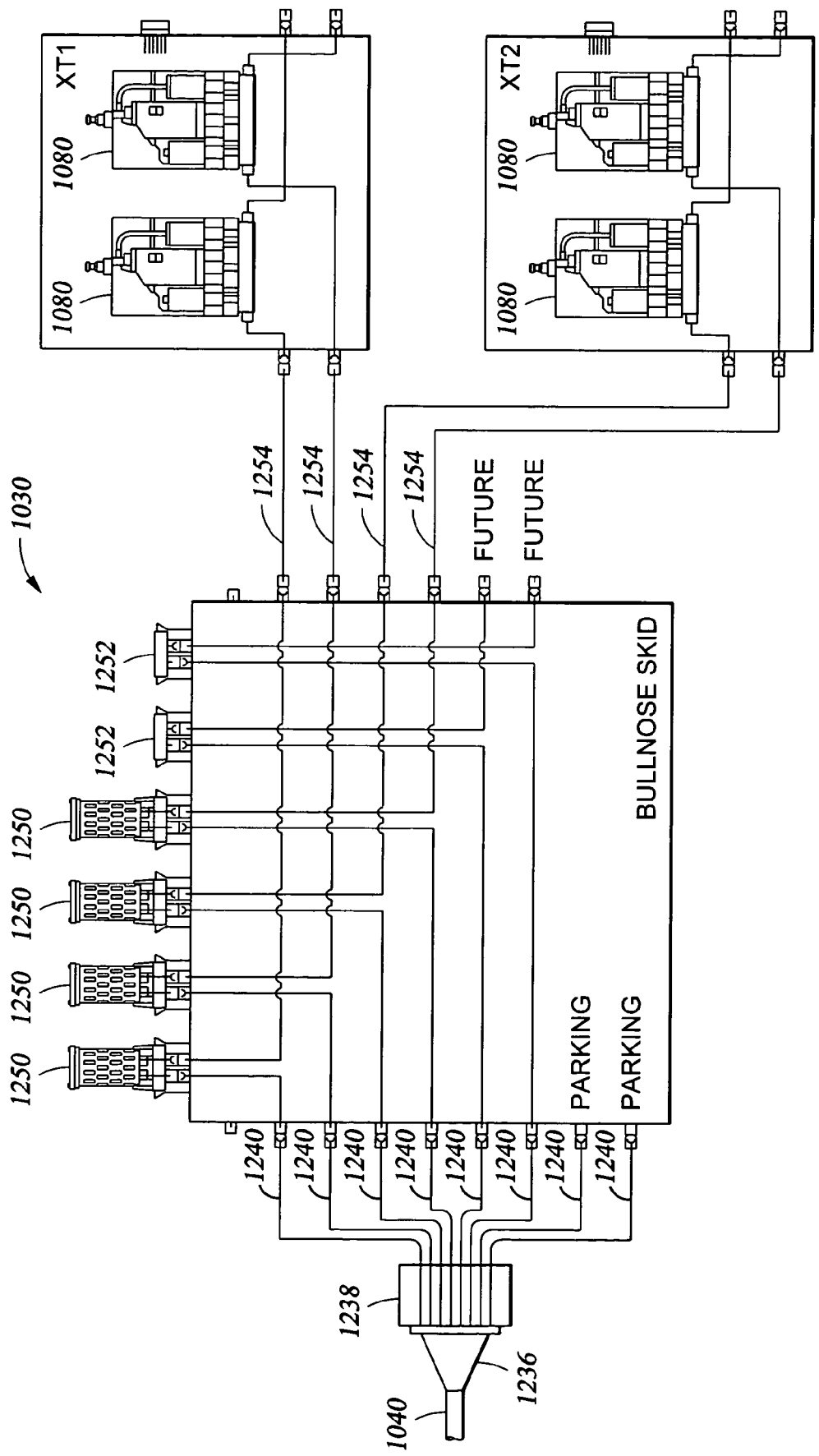
FIG. 33 is a schematic representation of one embodiment of the subsea electrical equipment of the subsea production system of FIG. 31.

Referring now to FIG. 33, umbilical 1040 terminates in connector 1236 that interfaces with electrical umbilical termination 1238. Electrical umbilical termination 1238 includes a plurality of pig-tail conductors 1240 that connect each of the electrical conductors in umbilical 1040 with electrical distribution skid 1030.

Electrical distribution skid 1030 comprises a plurality of high voltage converters (bullnoses) 1250, e.g., converter 86 with converter components 122, to convert the high voltage (3,000 to 6,000 VDC) supply from the surface down to 300 VDC to power subsea trees 1020 and to decouple the communications from the DC power. Bullnoses 1250 are preferably a modular construction sized to accommodate sufficient electronic units to step down the power and work to precisely control the voltage supplied to the subsea trees 1020 by diverting surplus power. A bullnose 1250 is provided for each electrical conduit from umbilical 1040. Mounting bases 1252 for additional bullnoses may also be provided for expansion.

Pig-tail conductors 1240 provide inputs to bullnoses 1250, which convert the high voltage from umbilical 1040 to lower voltage current. This lower voltage current is then passed along electrical jumpers 1254 to electric control pods 1080 mounted on subsea trees 1020. Electrical jumpers 1254 from the electrical distribution skid 1030 carry the 300 VDC supply for the subsea trees 1020 and a screened communications cable to provide instructions to control pods 1080. The ends of each electrical jumper 1254 are terminated with a multi-pin ROV wet mate connector.

Electric control pods 1080 serve two functions. Firstly, it controls the various functions on the subsea tree, and secondly, it acquires data from the tree and the subsea instrumentation for transmission to the surface. Control pods 1080 are preferably lightweight units of a universal design and are configured to serve the functional requirements of subsea trees 1020. Control pods 1080 are preferably tree mounted and can be installed and retrieved using standard ROV's or remotely operated running tool. Electrical connections between the control pods 1080 and subsea trees 1020 are made remotely using wet-mate electrical connectors through a pod mounting base.

A subsea electronic module is housed within each control pod 1080, e.g. controller 112, and is used to effect all electronic communication and to monitor internal and external pod field sensors. The subsea electronic module also controls the operation of the actuated valves on subsea tree 1020 upon receipt of a command signal from master control station 1100 (see FIG. 32).

Figure 34:
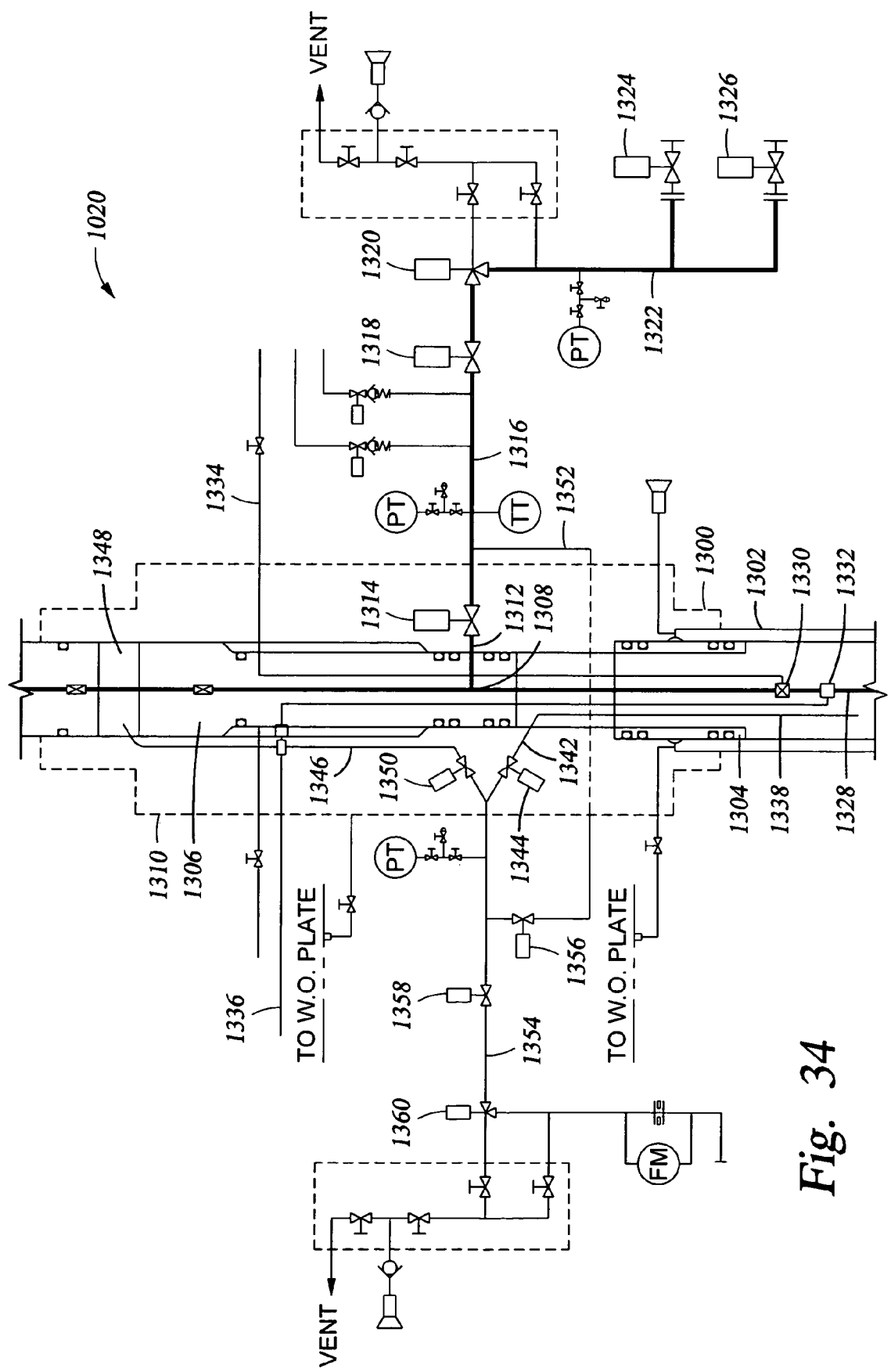
FIG. 34 is a schematic representation of one embodiment of the subsea flow control equipment of the subsea production system of FIG. 31.

FIG. 34 shows a schematic view of a subsea tree assembly 1020 including a tree 1310 landed on wellhead connector 1300 of subsea wellhead 1302. The tree may be a spool tree, dual bore tree or other type of tree having subsea devices. Tree 1310 is a spool tree. A sealing sleeve 1304 is shown extending between wellhead 1302 and a counterbore in the lower end of the tree 1310. Tubing hanger 1306 is supported within tree 1310 and has a lateral production port 1308 aligned with a lateral production port 1312 in tree 1310, the flow through which is controlled by production master valve 1314. An external flow line 1316 is shown extending from production master valve 1314 to a production wing valve 1318 and a production choke valve 1320. Line 1322 extends from flow line 1316 and connects to a production isolation valve 1324 and a test isolation valve 1326. Flow through flow line 1316 connects to production outlets 1090 (see FIG. 31).

The tubing hanger 1306 suspends tubing 1328 down through wellhead 1302 and into the cased borehole. A surface controlled subsea safety valve 1330 and a downhole pressure and temperature transducer 1332 are disposed in the lower end of production tubing 1328. A control line 1334 extends through the spool tree 1310 and out the side of tubing hanger 1306 to control the downhole safety valve 1330. Likewise, an electrical line 1336 extends downhole to the pressure and temperature transducer 1332 to transmit signals from the transducer. The downhole safety valve 1330 is preferably electrically controlled as previously described.

An annulus passageway 1338 extends from the production tubing annulus and into a annulus passageway 1342 in the body of spool tree 1310. An annulus master valve 1344 controls flow through annulus passageway 1342. Workover passageway 1346 communicates with the annulus passageway 1342 and extends upwardly through the wall of spool tree 1310 to an opening in the interior wall of the spool tree 1310 to provide communication with the spool tree bore 1348 above tubing hanger 1306. A workover valve 1350 controls flow through the workover passageway 1346. A cross over line 1352 communicates between passageway 1354 flow line 1316. A cross over valve 1356 controls the flow therethrough.

An annulus wing valve 1358 and a gas lift choke valve 1360 are disposed in passageway 1354.

In the preferred embodiments, each of the valves used in subsea tree assembly 1020 utilize electrical actuators that are powered and controlled by master control station 1100 via electrical umbilical 1040 and electric control pods 1080. The motors used by the electrical devices 46 are preferably powered by DC voltage. By eliminating hydraulically actuated valves, control and operation of subsea tree assembly 1020 is all electrically controlled. In summary, the electric system offers many advantages, such as quick response, elimination of hydraulic fluid, no dumping of fluid to sea (environmentally friendly), and the ability to perform real time diagnostics on the actuators, valves, and chokes. At the surface, the requirement for a hydraulic power unit is eliminated and the surface equipment can be packaged more compactly.

It is preferred that the subsea wellhead assembly include a subsea tree having all electrically actuated actuators. It is further preferred that the electrically actuated actuators have DC motors whereby the subsea DC voltage source supplies DC voltage to the DC motors. The subsea DC voltage source receives a high DC voltage from a voltage supply and control assembly at the surface via an umbilical and a plurality of subsea voltage converters convert the high DC voltage to a low DC voltage for supplying the electrically actuated actuators. Preferably all actuators disposed on the tree are electrically actuated actuators.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the present inventive concept, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

The invention claimed is:

1. A power distribution system for supplying power from an AC voltage source at a first location to a plurality of electrical devices at a remote location, the power distribution system comprising:

a plurality of AC/DC voltage converters at the first location having an input side of each AC/DC voltage converter connected to the AC source and having an output side of each AC/DC voltage converter connected to an electrical conductor that extends from the first location to the remote location and couples to the electrical devices, and a plurality of DC voltage converters for disposal at the remote location, each having an input side connected to the electrical conductor and an output side connected to the electrical devices for providing a converted DC or AC voltage to the electrical device, wherein the plurality of DC voltage converters are controlled independently to provide the converted DC or AC voltage based on demand from the electrical devices, wherein each electrical device selectively opens and closes a fluid line using the converted DC or AC voltage and without hydraulics.

2. A system for supplying power from an AC voltage source at a first location to an electrical device at a remote location, the system comprising:

a plurality of AC/DC voltage converters disposed at the first location, each having an input side connected to the AC voltage source and an output side connected to an electrical conductor extending to the remote location;

a plurality of DC/DC voltage converters for disposal at the remote location having inputs connected to the electrical conductor and outputs connected to the electrical device;

the plurality of DC/DC voltage converters receiving a high DC voltage from the plurality of AC/DC voltage converters via the electrical conductor and converting the high DC voltage to a lower DC voltage without a cooling mechanism that is needed when an amount of DC/DC converters less than the plurality of DC/DC converters are implemented to convert the high DC voltage to the lower DC voltage; and an input side of each DC/DC voltage converter having a resistive load to dissipate power when the electrical device is not consuming power.

3. A system for supplying power from an AC voltage source at a sea surface to a subsea location, the system comprising:

a plurality of AC/DC voltage converters disposed at the sea surface, each having an input side connected to the AC voltage source and an output side connected to an electrical conductor extending to the subsea location;

a subsea electrical device;

a plurality of DC voltage converters disposed at the subsea location, each having an input side connected to the electrical conductor and an output side connected to the subsea electrical device; and an input side of each DC voltage converter including a resistive load to dissipate power when the subsea electrical device is not consuming power.

4. The power distribution system of claim 1 wherein the electrical conductor comprises a conductor that supports up to 10 kV.

5. A power distribution system for supplying power from an AC voltage source at a first location to an electrical device at a remote location, the power distribution system comprising:

a plurality of AC/DC voltage converters disposed at the first location, each having an input side connected to the AC voltage source and an output side connected to an electrical conductor extending to the remote location;

a plurality of DC/DC voltage converters for disposal at the remote location having inputs connected to the electrical conductor and outputs connected to the electrical device;

the plurality of DC/DC voltage converters receiving a high DC voltage from the plurality of AC/DC voltage converters via the electrical conductor and converting the high DC voltage to a lower DC voltage; and an input side of each DC/DC voltage converter having a resistive load to dissipate power when the electrical device is not consuming power.

6. A system, comprising:

a subsea tree having a plurality of electric actuators, each electric actuator selectively moves a closure member;

a hydraulic-free umbilical that transfers direct-current (DC) power to the subsea tree to operate the electric actuators; and a plurality of DC converters in situ with the subsea tree and coupled to the electric actuators, wherein the DC converters are independently controlled to convert DC power received from the umbilical based on the number of electric actuators demanding power, wherein a position of at least one electric actuator is monitored.

\* \* \* \* \*

UNITED STATES PATENT AND TRADEMARK OFFICE
CERTIFICATE OF CORRECTION

PATENT NO.       : 7,615,893 B2  
APPLICATION NO. : 10/836559  
DATED            : November 10, 2009  
INVENTOR(S)     : Biester et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 297 days.

Signed and Sealed this

Fourteenth Day of December, 2010

David J. Kappos  
*Director of the United States Patent and Trademark Office*